United States Patent
Williams et al.

(10) Patent No.: US 12,001,343 B1
(45) Date of Patent: Jun. 4, 2024

(54) SELECTIVE DISTRIBUTION OF TRANSLATION ENTRY INVALIDATION REQUESTS IN A MULTITHREADED DATA PROCESSING SYSTEM

(71) Applicant: International Business Machines Corporation, Armonk, NY (US)

(72) Inventors: Derek E. Williams, Round Rock, TX (US); Florian Auernhammer, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 53 days.

(21) Appl. No.: 18/091,706

(22) Filed: Dec. 30, 2022

(51) Int. Cl.
*G06F 12/1045* (2016.01)
*G06F 12/0808* (2016.01)
*G06F 13/16* (2006.01)
*G06F 13/24* (2006.01)

(52) U.S. Cl.
CPC ...... *G06F 12/1045* (2013.01); *G06F 12/0808* (2013.01); *G06F 13/1673* (2013.01); *G06F 13/24* (2013.01)

(58) Field of Classification Search
None
See application file for complete search history.

(56) References Cited

U.S. PATENT DOCUMENTS

| | | | | |
|---|---|---|---|---|
| 6,105,113 A * | 8/2000 | Schimmel | ........... | G06F 12/1027 711/146 |
| 7,073,043 B2 * | 7/2006 | Arimilli | ............ | G06F 12/1027 711/146 |
| 7,162,608 B2 * | 1/2007 | Bethard | ............. | G06F 12/1027 711/207 |
| 8,364,933 B2 | 1/2013 | Herrenschmidt | | |
| 8,412,911 B2 * | 4/2013 | Grohoski | ............. | G06F 9/3885 711/143 |
| 9,772,845 B2 * | 9/2017 | Yap | ...................... | H04L 9/0643 |
| 10,372,622 B2 | 8/2019 | Chandran | | |

(Continued)

OTHER PUBLICATIONS

"Method and Apparatus for Handling Self Modifying Code in Dynamic Binary Translated Simulators," IPCOM000245170D, Feb. 16, 2016, p. 7, IP.com.

(Continued)

*Primary Examiner* — Elias Mamo
(74) *Attorney, Agent, or Firm* — Brian F. Russell; Edward Wixted

(57) ABSTRACT

A data processing system includes a plurality of processing nodes communicatively coupled to a system fabric. Each of the processing nodes includes a respective plurality of processor cores. Logical partition (LPAR) information for each of a plurality of LPARs is maintained in a register set in each of the processor cores, where the LPAR information indicates, for each of the LPARs, which of the processing nodes may hold an address translation entry for each LPAR. Based on the LPAR information, a first processor core selects a broadcast scope for a multicast request on the system fabric that includes fewer than all of the plurality of processing nodes and issues the multicast request with the selected broadcast scope. The first processor core updates the LPAR information in the register set of a second processor core in another of the plurality of processing nodes via an inter-processor interrupt.

19 Claims, 30 Drawing Sheets

(56) References Cited

U.S. PATENT DOCUMENTS

| | | | |
|---|---|---|---|
| 10,628,329 B2 | 4/2020 | Deshpande | |
| 10,817,434 B2 | 10/2020 | Williams | |
| 2007/0005932 A1* | 1/2007 | Covelli | G06F 12/1027 |
| | | | 711/207 |
| 2016/0140051 A1* | 5/2016 | Kessler | G06F 3/0604 |
| | | | 711/119 |
| 2017/0371789 A1 | 12/2017 | Blaner | |

OTHER PUBLICATIONS

"Per-Thread Valid Bits for Multithreaded Effective to Real Address Translation (ERATs)," IPCOM000022179D, Mar. 1, 2004, 2 pages, IP.com.
"Scalable Multiprocessor Invalidation Mechanism," IPCOM000018735D, Aug. 4, 2003, 2 pages, IP.com.
"Trace-Core Processors," IPCOM000199882D, Sep. 20, 2010, 17 pages, IP.com.
Critchley, T., "High Availability IT Services," 2015, 527 pages, CRC Press, Taylor & Francis Group, Boca Raton, FL, US.
Radcliffe, R., "DevOps for the Mainframe," 2012, 27 pages, IBM Corporation.
IBM: List of IBM Patents or Patent Applications Treated as Related. Filed Herewith. 2 pages.

* cited by examiner

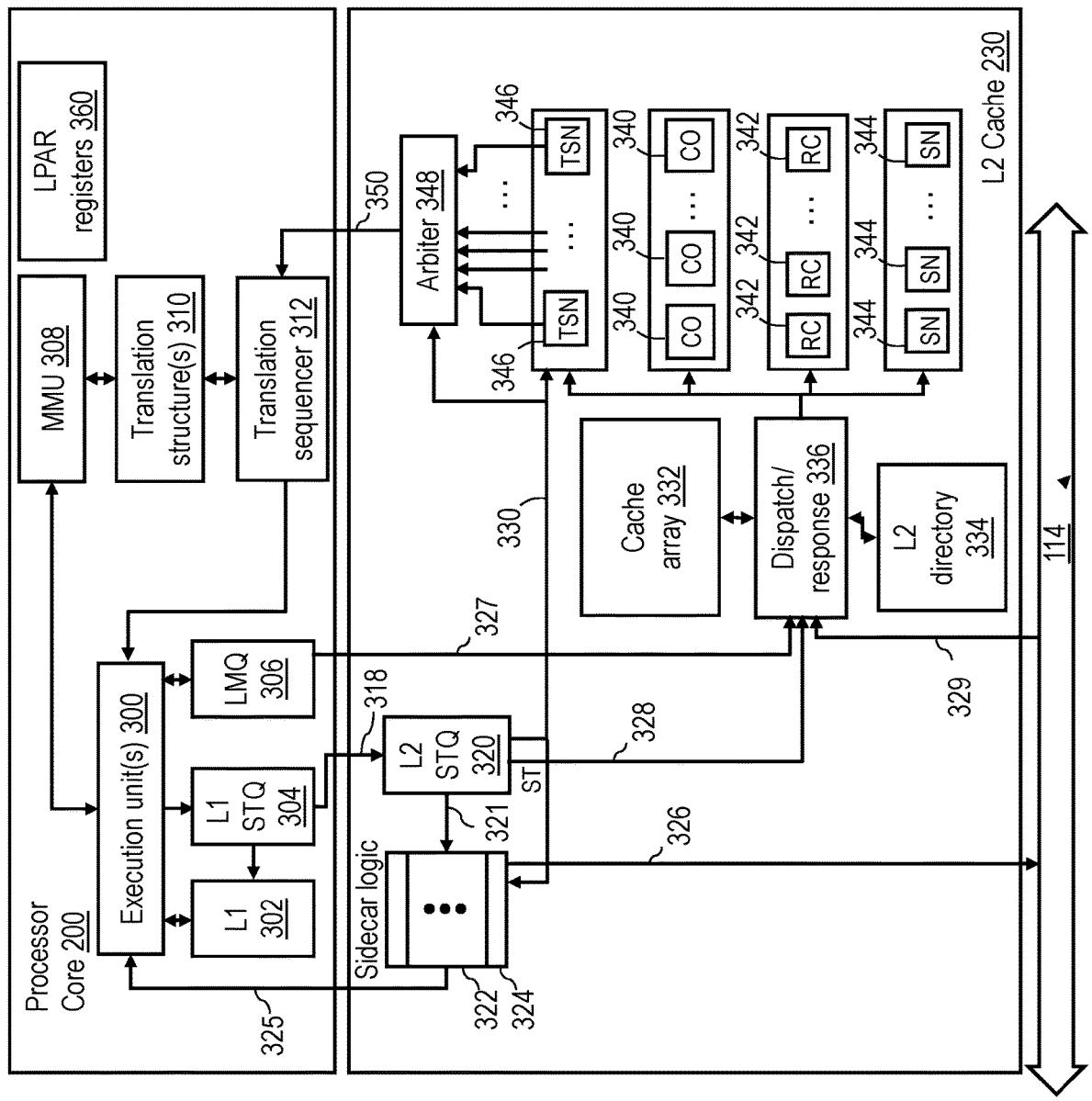

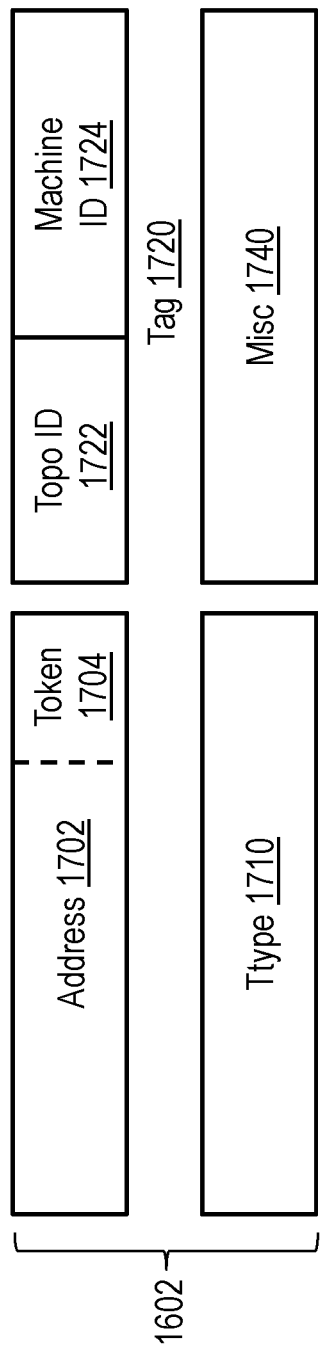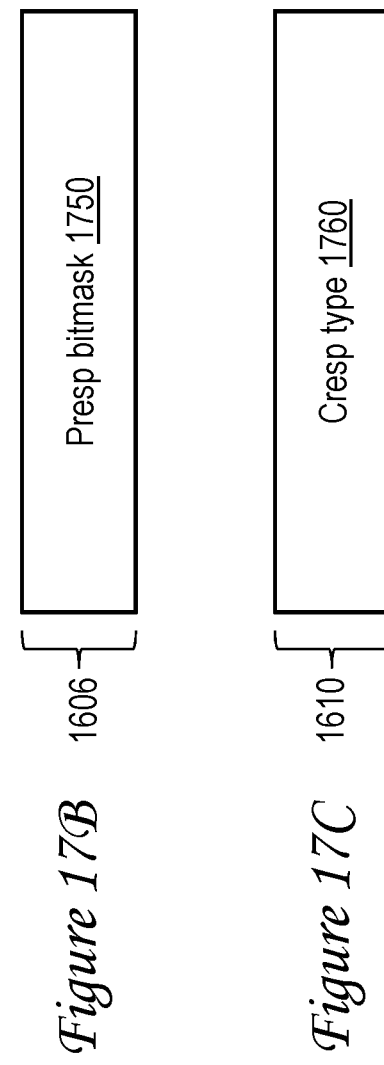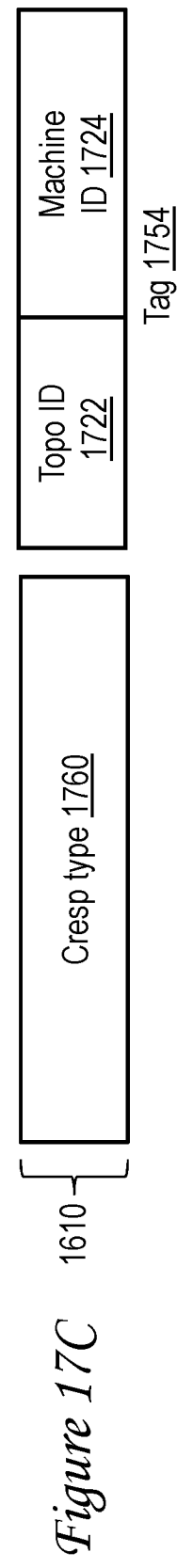
Figure 17A
Figure 17B
Figure 17C

SELECTIVE DISTRIBUTION OF TRANSLATION ENTRY INVALIDATION REQUESTS IN A MULTITHREADED DATA PROCESSING SYSTEM

BACKGROUND OF THE INVENTION

The present invention relates generally to data processing and, in particular, to selective distribution of multicast requests, such as translation entry invalidation requests, in a multithreaded data processing system.

A conventional multiprocessor (MP) computer system comprises multiple processing units (which can each include one or more processor cores and their various cache memories), input/output (I/O) devices, and data storage, which can include both system memory (which can be volatile or nonvolatile) and nonvolatile mass storage. In order to provide enough addresses for memory-mapped I/O operations and the data and instructions utilized by operating system and application software, MP computer systems typically reference an effective address space that includes a much larger number of effective addresses than the number of physical storage locations in the memory mapped I/O devices and system memory. Therefore, to perform memory-mapped I/O or to access system memory, a processor core within a computer system that utilizes effective addressing is required to translate an effective address into a real address assigned to a particular I/O device or a physical storage location within system memory.

In the POWER™ RISC architecture, the effective address space is partitioned into a number of uniformly-sized memory pages, where each page has a respective associated address descriptor called a page table entry (PTE). The PTE corresponding to a particular memory page contains the base effective address of the memory page as well as the associated base real address of the page frame, thereby enabling a processor core to translate any effective address within the memory page into a real address in system memory. The PTEs, which are created in system memory by the operating system and/or hypervisor software, are collected in a page frame table.

In order to expedite the translation of effective addresses to real addresses during the processing of memory-mapped I/O and memory access instructions (hereinafter, together referred to simply as "memory referent instructions"), a conventional processor core often employs, among other translation structures, a cache referred to as a translation lookaside buffer (TLB) to buffer recently accessed PTEs within the processor core. Of course, as data are moved into and out of physical storage locations in system memory (e.g., in response to the invocation of a new process or a context switch), the entries in the TLB must be updated to reflect the presence of the new data, and the TLB entries associated with data removed from system memory (e.g., paged out to nonvolatile mass storage) must be invalidated. In many conventional processors such as the POWER™ line of processors available from IBM Corporation, the invalidation of TLB entries is the responsibility of software and is accomplished through the execution of an explicit TLB invalidate entry instruction (e.g., TLBIE in the POWER™ instruction set architecture (ISA)).

In MP computer systems, the invalidation of a PTE cached in the TLB of one processor core is complicated by the fact that each other processor core has its own respective TLB, which may also cache a copy of the target PTE. In order to maintain a consistent view of system memory across all the processor cores, the invalidation of a PTE in one processor core requires the invalidation of the same PTE, if present, within the TLBs of all other processor cores. In many conventional MP computer systems, the invalidation of a PTE in all processor cores in the system is accomplished by the execution of a TLB invalidate entry instruction within an initiating processor core and the broadcast of a TLB invalidate entry request from the initiating processor core to each other processor core in the system. The TLB invalidate entry instruction (or instructions, if multiple PTEs are to be invalidated) may be followed in the instruction sequence of the initiating processor core by one or more synchronization instructions that guarantee that the TLB entry invalidation has been performed by all processor cores.

The present disclosure recognizes that the broadcast of a TLB invalidate entry request to all processor cores in a data processing system is a high latency operation that, in many cases, distributes the TLBE invalidate entry request to one or more processor cores that are not caching any address translation that is required to be invalidated by the TLBIE invalidate entry request. The present disclosure therefore appreciates that it would be useful and desirable to provide an improved technique for selectively distributing a TLB invalidate entry request in a data processing system that limits the scope of distribution to less than the entire data processing system, and preferably, to only those portions of the data processing system that may be caching the address translation to be invalidated by the TLB invalidate entry request.

BRIEF SUMMARY

According to one embodiment, a data processing system includes a plurality of processing nodes communicatively coupled to a system fabric. Each of the processing nodes includes a respective plurality of processor cores. Logical partition (LPAR) information for each of a plurality of LPARs is maintained in a register set in each of the processor cores, where the LPAR information indicates, for each of the LPARs, which of the processing nodes may hold an address translation entry for each LPAR. Based on the LPAR information, a first processor core selects a broadcast scope for a multicast request on the system fabric that includes fewer than all of the plurality of processing nodes and issues the multicast request with the selected broadcast scope. The first processor core updates the LPAR information in the register set of a second processor core in another of the plurality of processing nodes via an inter-processor interrupt.

The disclosed embodiments can be realized as a method, an integrated circuit, a data processing system, and/or a design structure.

BRIEF DESCRIPTION OF THE SEVERAL VIEWS OF THE DRAWINGS

FIG. 3 is a detailed block diagram of a processor core and lower level cache memory in accordance with one embodiment;

FIGS. 17A-17C illustrates an exemplary formats of a request, a partial response, and a combined response of operation on the system fabric of data processing system in accordance with one embodiment;

FIG. 24 is an exemplary instruction sequence for enabling and disabling logical partitions (LPARs) in accordance with one embodiment;

DETAILED DESCRIPTION

Figure 1:
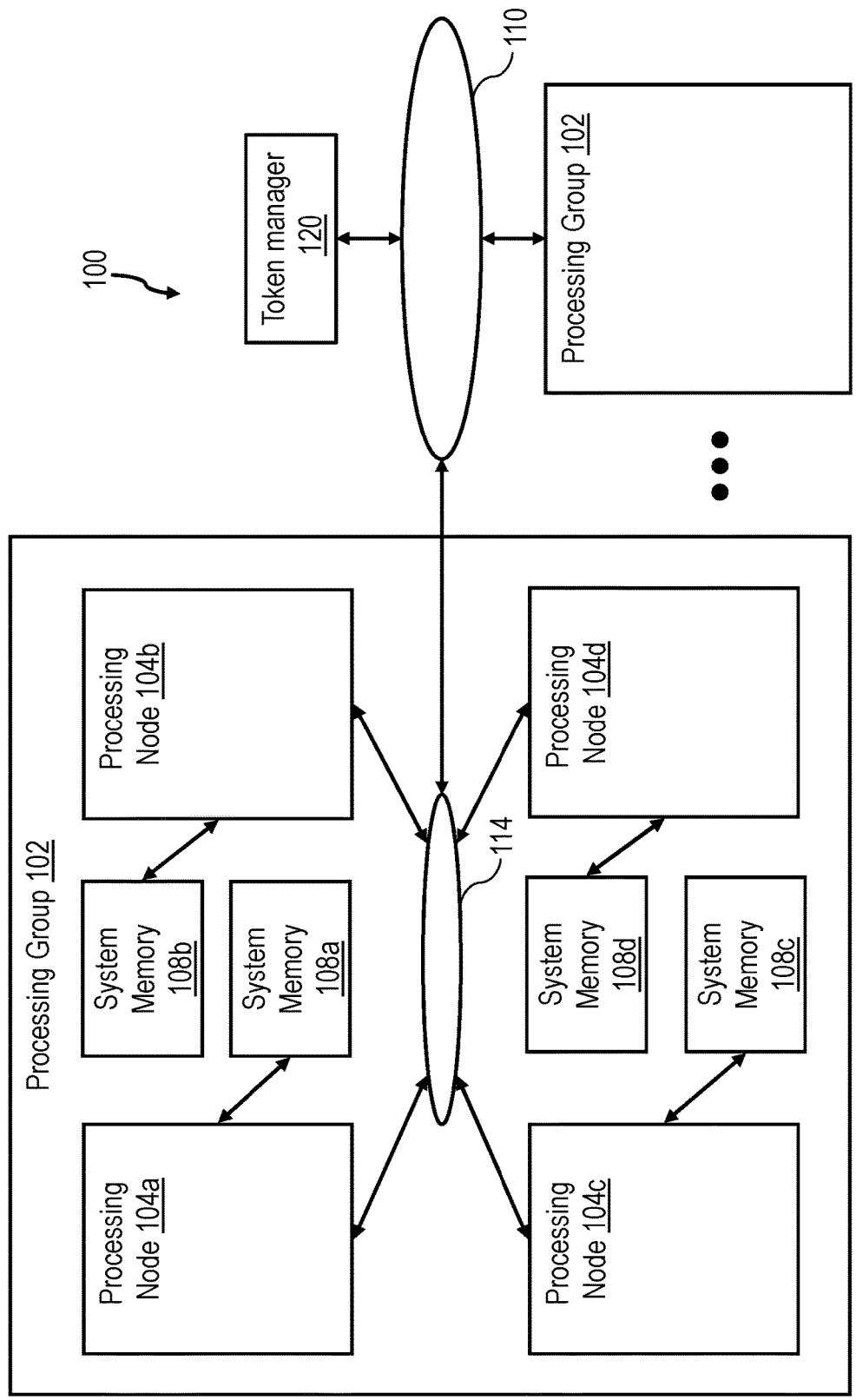
FIG. 1 is a high-level block diagram of an exemplary data processing system in accordance with one embodiment.

With reference now to the figures, wherein like reference numerals refer to like and corresponding parts throughout, and in particular with reference to FIG. 1, there is illustrated a high-level block diagram depicting an exemplary data processing system 100 in accordance with one embodiment. In the depicted embodiment, data processing system 100 is a cache-coherent symmetric multiprocessor (SMP) data processing system including multiple processing nodes 104 for processing data and instructions. Each processing node 104 can be realized, for example, as a multi-chip module (MCM), as a set of chiplets on an interconnect substrate, or as a respective integrated circuit.

As further illustrated in FIG. 1, multiple processing nodes 104 can be coupled for communication to each other by a local interconnect 114, which may be implemented, for example, as a bused interconnect, a switched interconnect, or a hybrid interconnect. The local interconnects 114 of multiple processing groups 102 can, in turn, be coupled to a system interconnect 110, which, like local interconnect 114, may be implemented as a bused interconnect, a switched interconnect, or a hybrid interconnect. Local interconnects 114 and system interconnect 110 together form a system fabric for conveying address, data, and control information between processing nodes 104.

As described below in greater detail with reference to FIG. 2, processing nodes 104 each include a memory controller 106 coupled to local interconnect 114 to provide an interface to a respective system memory 108. Data and instructions residing in system memories 108 can generally be accessed, cached and modified by a processor core in any processing node 104 within data processing system 100. System memories 108 thus form the lowest level of memory storage in the distributed shared memory system of data processing system 100. In alternative embodiments, one or more memory controllers 106 (and system memories 108) can be coupled to system interconnect 110 rather than a local interconnect 114.

FIG. 1 further illustrates that data processing system 100 includes at least one token manager 120 coupled to the system fabric. As discussed further below with reference to FIGS. 18-21, token manager 120 can be utilized to grant tokens to requesting processing nodes 104 to facilitate distribution of certain types of multicast requests via the system fabric while avoiding the development of livelocks. In some examples, data processing system 100 may include a single token manager 120, which may conveniently be coupled to system interconnect 110.

Those skilled in the art will appreciate that SMP data processing system 100 of FIG. 1 can include many additional non-illustrated components, such as interconnect bridges, non-volatile storage, ports for connection to networks or attached devices, etc. Because such additional components are not necessary for an understanding of the described embodiments, they are not illustrated in FIG. 1 or discussed further herein. It should also be understood, however, that the enhancements described herein are applicable to data processing systems of diverse architectures and are in no way limited to the generalized data processing system architecture illustrated in FIG. 1.

Figure 2:
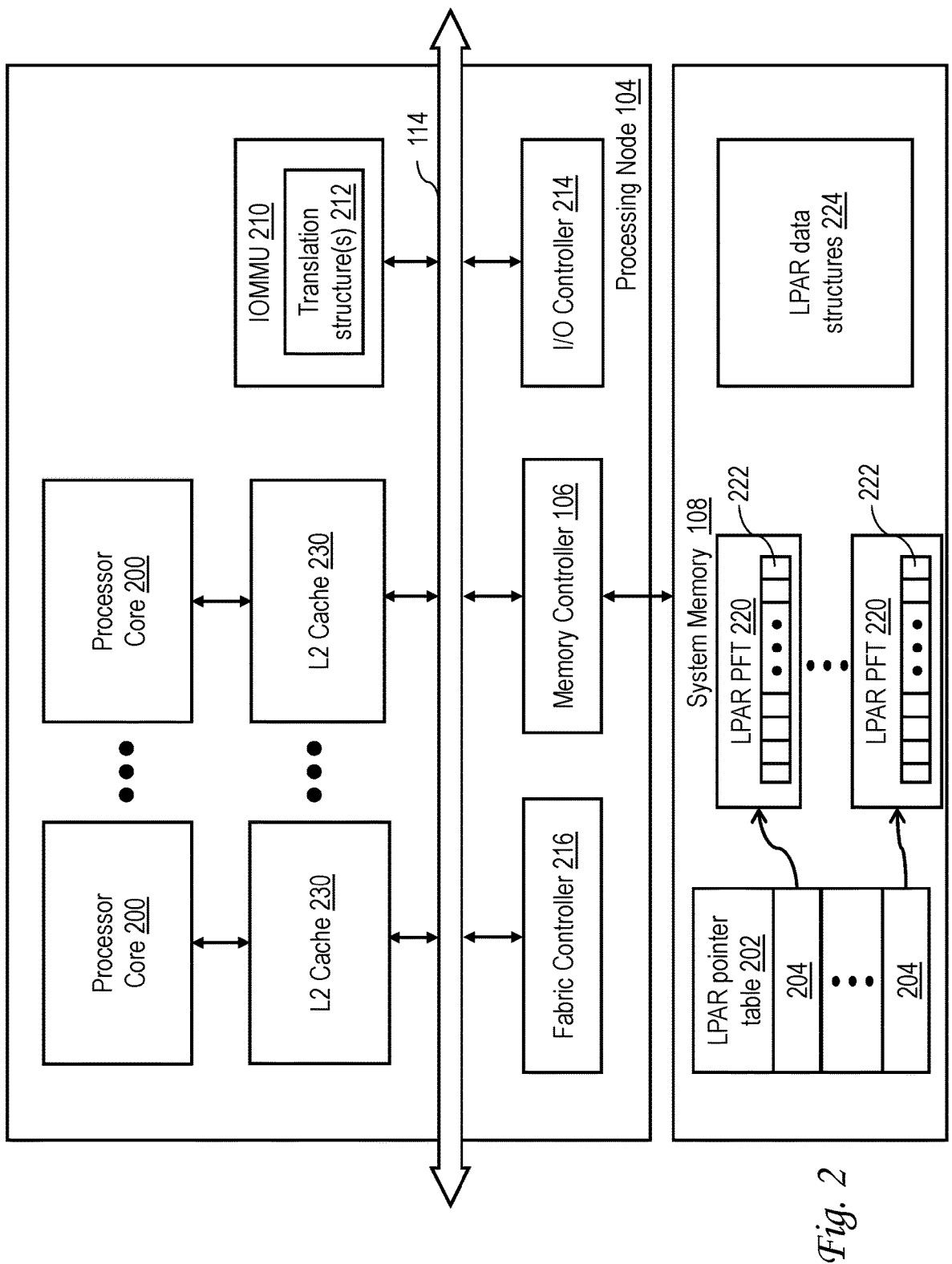
FIG. 2 is a more detailed block diagram of an exemplary processing node in accordance with one embodiment.

Referring now to FIG. 2, there is depicted a more detailed block diagram of an exemplary processing node 104 in accordance with one embodiment. In the depicted embodiment, each processing node 104 is an integrated circuit including one or more processor cores 200 for processing instructions and data. In a preferred embodiment, each processor core 200 supports simultaneous multithreading (SMT) and thus is capable of independently executing multiple hardware threads of execution simultaneously.

The operation of each processor core 200 is supported by a multi-level memory hierarchy having at its lowest level a shared system memory 108 accessed via an integrated memory controller 106. At its upper levels, the multi-level memory hierarchy includes one or more levels of cache memory, which in the illustrative embodiment include a store-through level one (L1) cache 302 (see FIG. 3) within and private to each processor core 200, and a respective store-in level two (L2) cache 230 for each processor core 200. Although the illustrated cache hierarchies includes only two levels of cache, those skilled in the art will appreciate that alternative embodiments may include additional levels (L3, L4, etc.) of on-chip or off-chip, private or shared, in-line or lookaside cache, which may be fully inclusive, partially inclusive, or non-inclusive of the contents the upper levels of cache.

As illustrated, shared system memory 108 stores a logical partition (LPAR) pointer table 202 including multiple entries 204, each corresponding to a respective LPAR ID that may be assigned to one or more hardware threads of the processor cores 200 of data processing system 100. Each entry 204 in LPAR pointer table 202 stores a pointer to the base real address of a LPAR page frame table (PFT) 220 for translating addresses of the associated LPAR. Each LPAR PFT 220, in turn, contains a plurality of page table entries (PTEs) 222 for performing effective-to-real address translation to enable access to physical storage locations in system memory 108. Thus, with the depicted address translation facilities, each LPAR executing within data processing system 100 can implement its own set of effective-to-real address translations. Shared system memory 108 additionally stores a set of LPAR data structures 224, which as described in greater detail below with reference to FIG. 26 can be utilized to limit the scopes of broadcast of multicast requests, such as translation entry invalidation requests, based on LPAR information to only a subset of processing node 104 in data processing system 100.

Each processing node 104 further includes an integrated and distributed fabric controller 216 responsible for controlling the flow of operations on the system fabric comprising local interconnect 114 and system interconnect 110 and for implementing the coherency communication required to implement the selected cache coherency protocol. Processing node 104 further includes an integrated I/O (input/output) controller 214 supporting the attachment of one or more I/O devices (not depicted). Processing node 104 also includes an I/O memory management unit (IOMMU) 210 that provides effective-to-real address translations for I/O devices coupled to I/O controller 214. To support address translation, IOMMU 210 may include one or more translation structures 212 for buffering PTEs 222 or address translation data derived from PTEs retrieved from LPAR PFTs 220.

With reference now to FIG. 3, there is illustrated a more detailed block diagram of an exemplary embodiment of a processor core 200 and its affiliated L2 cache 230 in accordance with one embodiment.

In the illustrated embodiment, processor core 200 includes one or more execution unit(s) 300, which execute instructions from multiple simultaneous hardware threads of execution. The instructions can include, for example, arithmetic instructions, logical instructions, and memory referent instructions, as well as translation entry invalidation instructions (hereinafter referred to by the POWER™ ISA mnemonic TLBIE (Translation Lookaside Buffer Invalidate Entry)) and associated synchronization instructions. Execution unit(s) 300 can generally execute instructions of a hardware thread in any order as long as data dependencies and explicit orderings mandated by synchronization instructions are observed. Processor core 200 includes a LPAR register set 360, which includes a plurality of LPAR registers 360 each corresponding to a respective one of multiple simultaneous hardware threads of processor core 200 and recording, among other things, the LPAR identifier (LPID) of the LPAR, if any, being executed by the corresponding hardware thread. An exemplary embodiment of LPAR register set 360 is described below with reference to FIG. 25.

Processor core 200 additionally includes a memory management unit (MMU) 308 responsible for translating target effective addresses determined by the execution of memory referent instructions in execution unit(s) 300 into real addresses. MMU 308 performs effective-to-real address translation by reference to one or more translation structure(s) 310, such as a translation lookaside buffer (TLB), block address table (BAT), segment lookaside buffers (SLBs), etc. The number and type of these translation structures varies between implementations and architectures. If present, the TLB reduces the latency associated with effective-to-real address translation by caching PTEs 222 retrieved from page frame table 220. A translation sequencer 312 associated with translation structure(s) 310 handles invalidation of effective-to-real translation entries held within translation structure(s) 310 and manages such invalidations relative to memory-referent instructions in-flight in processor core 200.

Processor core 200 additionally includes various storage facilities shared by the multiple hardware threads supported by processor core 200. The storage facilities shared by the multiple hardware threads include an L1 store queue (L1 STQ) 304 that temporarily buffers store and synchronization requests generated by execution of corresponding store and synchronization instructions by execution unit(s) 300. Because L1 cache 302 is a store-through cache, meaning that coherence is fully determined at a lower level of cache hierarchy (e.g., at L2 cache 230), requests flow through L1 STQ 304 and then pass via bus 318 to L2 cache 230 for processing. The storage facilities of processor core 200 shared by the multiple hardware threads additionally include a load miss queue (LMQ) 306 that temporarily buffers load requests that miss in L1 cache 302. Because such load requests have not yet been satisfied, they are subject to hitting the wrong memory page if the address translation entry utilized to obtain the target real addresses of the load requests are invalidated before the load requests are satisfied. Consequently, if a PTE or other translation entry is to be invalidated, any load requests in LMQ 306 that depends on that translation entry has to be drained from LMQ 306 and be satisfied before the effective address translated by the relevant translation entry can be reassigned.

Still referring to FIG. 3, L2 cache 230 includes a cache array 332 and a L2 directory 334 of the contents of cache array 332. Assuming cache array 332 and L2 directory 334 are set associative as is conventional, storage locations in system memories 108 are mapped to particular congruence classes within cache array 332 utilizing predetermined index bits within the system memory (real) addresses. The particular memory blocks stored within the cache lines of cache array 332 are recorded in L2 directory 334, which contains one directory entry for each cache line. While not expressly depicted in FIG. 3, it will be understood by those skilled in the art that each directory entry in cache directory 334 includes various fields, for example, a tag field that identifies the real address of the memory block held in the corresponding cache line of cache array 332, a state field that indicates the coherency state of the cache line, an LRU (Least Recently Used) field indicating a replacement order for the cache line with respect to other cache lines in the same congruence class, and inclusivity bits indicating whether the memory block is held in the associated L1 cache 302.

L2 cache 230 additionally includes a L2 STQ 320 that receives storage-modifying requests and synchronization requests from L1 STQ 304 via interface 321 and buffers such requests. It should be noted that L2 STQ 320 is a unified store queue that buffers requests for all hardware threads of the affiliated processor core 200. Consequently, all of the threads' store requests, TLBIE requests and associated synchronization requests flows through L2 STQ 320. Although in most embodiments L2 STQ 320 includes multiple entries, L2 STQ 320 is required to function in a deadlock-free manner regardless of depth (i.e., even if implemented as a single entry queue). To this end, L2 STQ 320 is coupled by an interface 321 to associated sidecar logic 322, which includes one request-buffering entry (referred to herein as a "sidecar") 324 per simultaneous hardware thread supported by the affiliated processor core 200. As such, the number of sidecars 324 is unrelated to the number of entries in L2 STQ 320. As described further herein, use of sidecars 324 allows potentially deadlocking requests to be removed from L2 STQ 320 so that no deadlocks occur during invalidation of a translation entry.

L2 cache 230 further includes dispatch/response logic 336 that receives local load and store requests initiated by the affiliated processor core 200 via buses 327 and 328, respectively, and remote requests snooped on local interconnect 114 via bus 329. Such requests, including local and remote load requests, store requests, TLBIE requests, and associated synchronization requests, are processed by dispatch/response logic 336 and then dispatched to the appropriate state machines for servicing.

In the illustrated embodiment, the state machines implemented within L2 cache 230 to service requests include multiple Read-Claim (RC) machines 342, which independently and concurrently service load (LD) and store (ST) requests received from the affiliated processor core 200. In order to service remote memory access requests originating from processor cores 200 other than the affiliated processor core 200, L2 cache 230 also includes multiple snoop (SN) machines 344. Each snoop machine 344 can independently and concurrently handle a remote memory access request snooped from local interconnect 114. As will be appreciated, the servicing of memory access requests by RC machines 342 may require the replacement or invalidation of memory blocks within cache array 332 (and L1 cache 302). Accordingly, L2 cache 230 also includes CO (castout) machines 340 that manage the removal and writeback of memory blocks from cache array 332.

In the depicted embodiment, L2 cache 230 additionally includes multiple translation snoop (TSN) machines 346, which are utilized to service TLBIE requests and associated synchronization requests. It should be appreciated that in some embodiments, TSN machines 346 can be implemented in another sub-unit of a processing node 104, for example, a non-cacheable unit (NCU) (not illustrated) that handles non-cacheable memory access operations. In at least one embodiment, the same number of TSN machines 346 is implemented at each L2 cache 230 in order to simplify implementation of a consensus protocol (as discussed further herein) that coordinates processing of multiple concurrent TLBIE requests within data processing system 100.

TSN machines 346 are coupled to a bus 330 and to an arbiter 348 that selects requests being handled by TSN machines 346 for transmission to translation sequencer 312 in processor core 200 via bus 350. In at least some embodiments, bus 350 is implemented as a unified bus that transmits not only requests of TSN machines 346, but also returns data from the L2 cache 230 to processor core 200, as well as other operations. It should be noted that translation sequencer 312 must accept requests from arbiter 348 in a non-blocking fashion in order to avoid deadlock.

Figure 16:
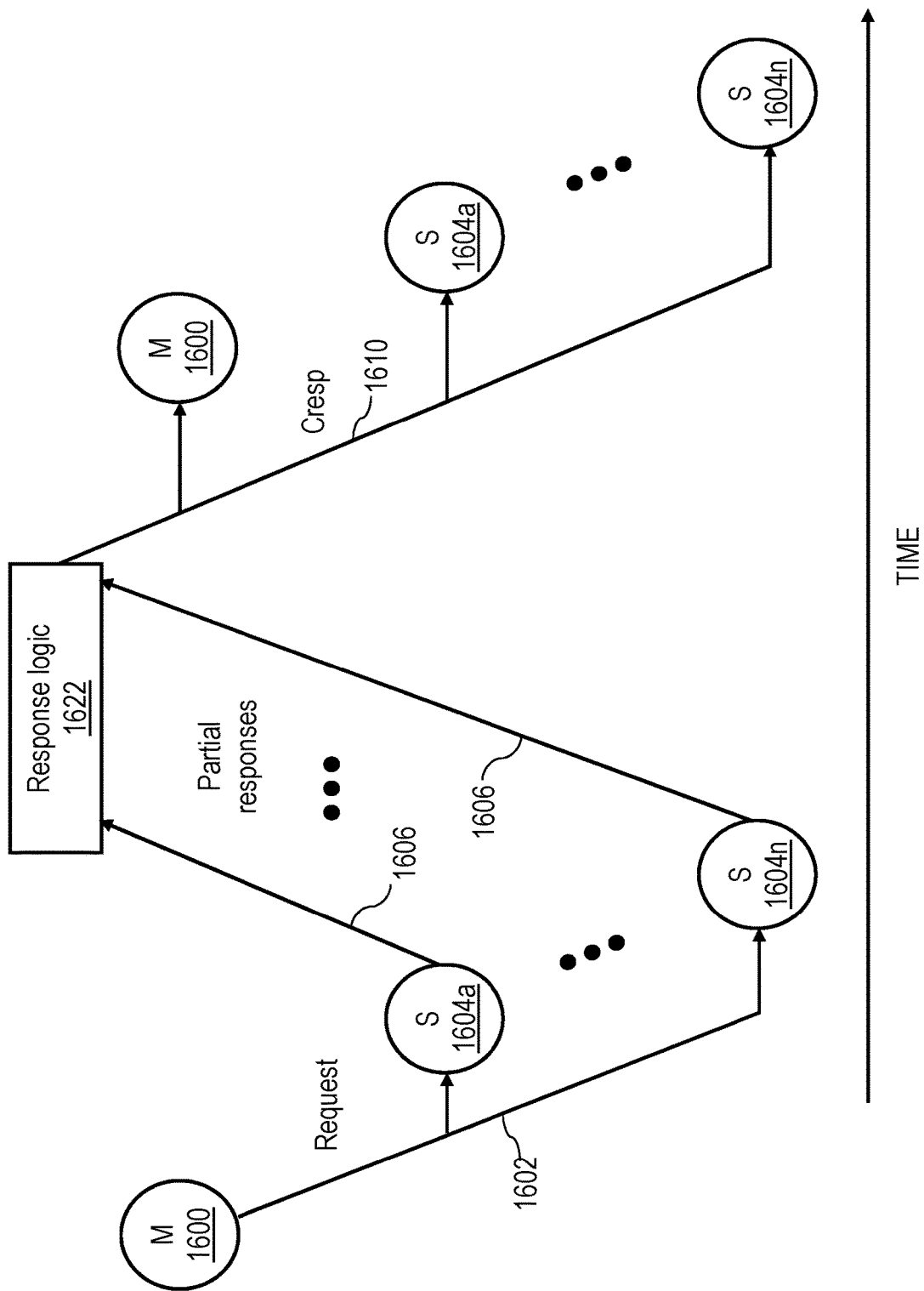
FIG. 16 is a space-time diagram of an interconnect operation on the system fabric of the data processing system of FIG. 1 in accordance with one embodiment.

Referring now to FIG. 16, there is depicted a time-space diagram of an exemplary interconnect operation on the system fabric of data processing system 100 of FIG. 1. The interconnect operation begins when a master 1600 (e.g., a sidecar 324, RC machine 342, or CO machine 340 of an L2 cache 230, a master within an I/O controller 214, a master within an unillustrated non-cacheable unit (NCU), etc.) issues a request 1602 on the system fabric.

In the example illustrated in FIG. 17A, a request 1602 can include an address field 1702 for specifying a target real address to be accessed, a transaction type (ttype) field 1710 for specifying the type of access to be made, a tag field (tag) 1720 for identifying the master 1600 initiating request 1602, and a miscellaneous field 1740 for specifying additional request information. In the depicted example, tag field 1720 includes a topographical identifier (ID) 1722 uniquely identifying the master's physical location within data processing system 100 and a machine ID 1724 identifying which state machine (e.g., CO machine 340, RC machine 342, sidecar 324, etc.) is the master.

Common types of requests 1602 include those set forth below in Table I.

TABLE I

| Request | Description |
| --- | --- |
| READ | Requests a copy of the image of a memory block for query purposes |
| RWITM (Read-With-Intent-To-Modify) | Requests a unique copy of the image of a memory block with the intent to update (modify) it and requires destruction of other copies, if any |
| DCLAIM (Data Claim) | Requests authority to promote an existing query-only copy of memory block to a unique copy with the intent to update (modify) it and requires destruction of other copies, if any |
| DCBZ (Data Cache Block Zero) | Requests authority to create a new unique copy of a memory block without regard to its present state and subsequently modify its contents; requires destruction of other copies, if any |
| CASTOUT | Copies the image of a memory block from a higher level of memory to a lower level of memory in preparation for the destruction of the higher level copy |
| WRITE | Requests authority to create a new unique copy of a memory block without regard to its present state and immediately copy the image of the memory block from a higher level memory to a lower level memory in preparation for the destruction of the higher level copy |
| PARTIAL WRITE | Requests authority to create a new unique copy of a partial memory block without regard to its present state and immediately copy the image of the partial memory block from a higher level memory to a lower level memory in preparation for the destruction of the higher level copy |
| TLBI_CIO | Requests invalidation of copies of translation entries cached in translation structures of processor cores and IOMMUs |
| TLBIE_C | Requests invalidation of copies of translation entries cached in translation structures of processor cores only (i.e., not IOMMUs) |
| TLBIE_IOMMU | Requests invalidation of translation entries for a specified LPAR held in translation structures of a particular IOMMU |

As shown in FIG. 16, request 1602 is received by snoopers 1604a-1604n (e.g., token manager 120, L2 caches 230, IOMMUs 210, memory controllers 106, etc.) distributed throughout data processing system 100. Snoopers 1604 that receive and process requests 1602 may each provide a respective partial response (Presp) 1606 representing the response of at least that snooper 1604 to request 1602. A memory controller 106 may determine the partial response 1606 to provide based, for example, upon whether the memory controller 106 is responsible for the request address and whether it has resources available to service the request. An L2 cache 230 may determine its partial response 1606 based on, for example, the availability of a snoop machine 344 to handle the request, the availability of its L2 directory 334, and/or the coherency state associated with the target real address in L2 directory 334.

FIG. 17B depicts a format of an exemplary Presp 1606. In this example, Presp 1606 includes at least a Presp bitmask 1750 communicating the snooper's individual response (e.g., Null, Retry, etc.) to the request 1602.

Returning to FIG. 16, the partial responses 1606 of snoopers 1604a-1604n are logically combined either in stages or all at once by one or more instances of response logic 1622 to determine a systemwide combined response (Cresp) 1610 to request 1602. In one embodiment, which is assumed hereinafter, the instance of response logic 1622 responsible for generating Cresp 1610 is located in the processing node 104 containing the master 1600 that issued request 1602. Response logic 1622 provides Cresp 1610 to master 1600 and snoopers 1604 via the interconnect fabric to indicate the systemwide coherence response (e.g., success, failure, retry, etc.) to request 1602. If Cresp 1610 indicates success of request 1602, Cresp 1610 may indicate, for example, a data source for a target memory block of request 1602, a coherence state in which the requested memory block is to be cached by master 1600 (or other caches), and whether "cleanup" operations invalidating the requested memory block in one or more caches are required.

In response to receipt of Cresp 1610, one or more of master 1600 and snoopers 1604 may perform one or more additional actions in order to service request 1602. These additional actions may include supplying data to master 1600, invalidating or otherwise updating the coherence state of data cached in one or more L2 caches 230, performing castout operations, writing back data to a system memory 108, etc. If required by request 1602, a requested or target memory block may be transmitted to or from master 1600 before or after the generation of Cresp 1610 by response logic 1622.

FIG. 17C illustrates an exemplary format for a Cresp 1610. In this example, Cresp 1610 includes a Cresp type field 1760 indicating the systemwide coherence response (e.g., success, failure, retry, etc.) for the corresponding request 1602 and a tag field (tag) 1754 corresponding to that of the original request 1602, thus enabling the master 1600 to match request 1602 with the associated Cresp 1610.

Figures 4A, 4B:
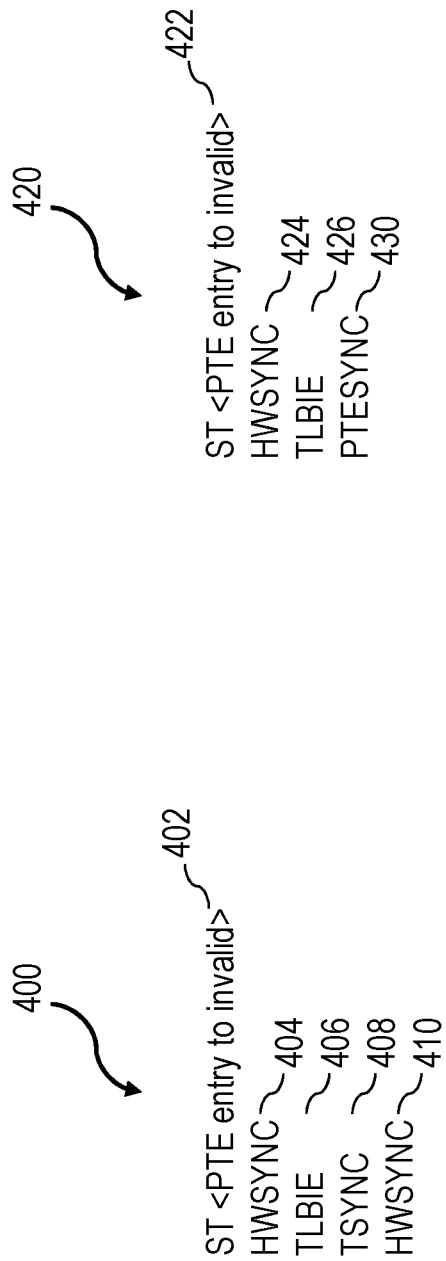
FIG. 4A is a first exemplary translation entry invalidation instruction sequence in accordance with one embodiment.
FIG. 4B is a second exemplary translation entry invalidation instruction sequence in accordance with one embodiment.

Referring now to FIG. 4A, there is depicted a first exemplary translation entry invalidation instruction sequence 400 that may be executed by a processor core 200 of data processing system 100 in accordance with one embodiment. The purpose of instruction sequence 400 is to: (a) disable a translation entry (e.g., PTE 222) in page frame table 220 so that the translation entry does not get reloaded by any MMU 308 of data processing system 100, (b) invalidate any copy of the translation entry (or other translation entry that translates the same effective address as the translation entry) cached by any processor core 200 in data processing system 100, and (c) drain all the outstanding memory access requests that depend on the old translation entry before the effective address is re-assigned. If the translation were updated before the store requests that depend on the old translation entry drain, the store requests may corrupt the memory page identified by old translation entry. Similarly, if load requests that depend on the old translation entry and that miss L1 cache 302 were not satisfied before the translation is reassigned, the load requests would read data from a different memory page than intended and thus observe data not intended to be visible to the load requests.

Instruction sequence 400, which may be preceded and followed by any arbitrary number of instructions, begins with one or more store (ST) instructions 402. Each store instruction 402, when executed, causes a store request to be generated that, when propagated to the relevant system memory 108, marks a target PTE 222 in page frame table 220 as invalid. Once the store request has marked the PTE 222 as invalid in page frame table 220, MMUs 308 will no longer load the invalidated translation from page frame table 220.

Following the one or more store instructions 402 in instruction sequence 400 is a heavy weight synchronization (i.e., HWSYNC) instruction 404, which is a barrier that ensures that the following TLBIE instruction 406 doesn't get reordered by processor core 200 such that it executes in advance of any of store instruction(s) 402. Thus, HWSYNC instruction 404 ensures that if a processor core 200 reloads a PTE 222 from page frame table 220 after TLBIE instruction 406 invalidates cached copies of the PTE 222, the processor core 200 is guaranteed to have observed the invalidation due to a store instruction 402 and therefore will not use or re-load the target PTE 222 into translation structure(s) 310 until the effective address translated by the target PTE 222 is re-assigned and set to valid.

Following HWSYNC instruction 404 in instruction sequence 400 is at least one TLBIE instruction 406, which when executed generates a corresponding TLBIE request that invalidates any translation entries translating the target effective address of the TLBIE request in all translation structures 310 throughout data processing system 100. The one or more TLBIE instructions 406 are followed in instruction sequence 400 by a translation synchronization (i.e., TSYNC) instruction 408 that ensures that, prior to execution of the thread proceeding to succeeding instructions, the TLBIE request generated by execution of TLBIE instruction 406 has finished invalidating all translations of the target effective address in all translation structures 310 throughout data processing system 100 and all prior memory access requests depending on the now-invalidated translation have drained.

Instruction sequence 400 ends with a second HWSYNC instruction 410 that enforces a barrier that prevents any memory referent instructions following HWSYNC instruction 410 in program order from executing until TSYNC instruction 406 has completed its processing. In this manner, any younger memory referent instruction requiring translation of the target effective address of the TLBIE request will receive a new translation rather than the old translation invalidated by TLBIE request. It should be noted that HWSYNC instruction 410 does not have any function directly pertaining to invalidation of the target PTE 222 in page frame table, the invalidation of translation entries in translation structures 310, or draining of memory referent instructions that depend on the old translation.

Figure 11:
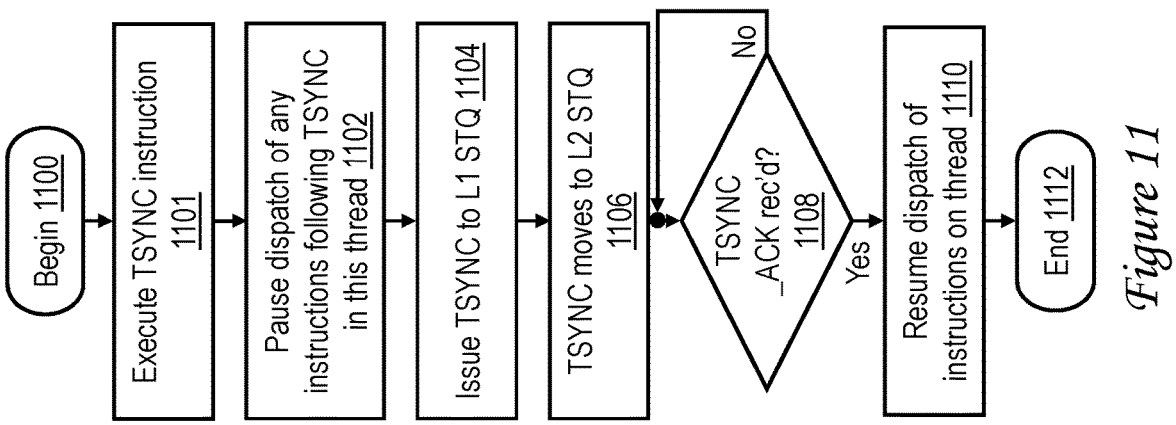
FIG. 11 is a high-level logical flowchart of an exemplary method by which a processor core processes a translation synchronization instruction in accordance with one embodiment.
Figure 12:
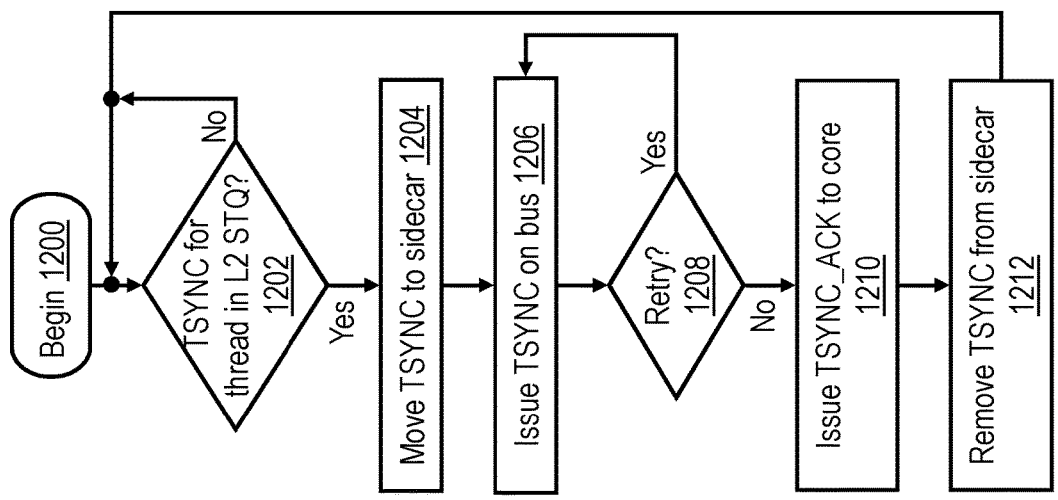
FIG. 12 is a high-level logical flowchart of an exemplary method by which sidecar logic of a processing unit processes a translation synchronization request in accordance with one embodiment.

To promote understanding of the inventions disclosed herein, the progression of a TLBIE instruction 406 and the TLBIE request generated therefrom are described from inception to completion with reference to FIGS. 5-10. FIGS. 11 and 12 additionally depict the progression of TSYNC instruction 408 and its corresponding TSYNC request, which ensure that the invalidation requested by the TLBIE request has completed on all snooping processor cores 200.

Figure 5:
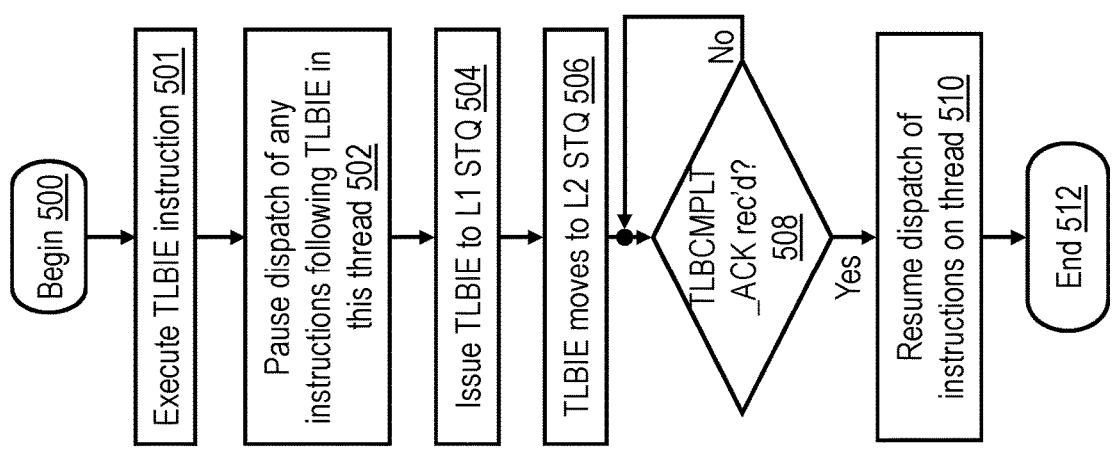
FIG. 5 is a high-level logical flowchart of an exemplary method by which a processor core of a multiprocessor data processing system processes a translation entry invalidation instruction in accordance with one embodiment.

Referring first to FIG. 5, there is illustrated a high-level logical flowchart of an exemplary method by which an initiating processor core 200 of a multiprocessor data processing system 100 processes a translation entry invalidation (e.g., TLBIE) instruction in accordance with one embodiment. The illustrated process represents the processing performed in a single hardware thread, meaning that multiple of these processes can be performed concurrently (i.e., in parallel) on a single processor core 200, and further, that multiple of these processes can be performed concurrently on various different processing cores 200 throughout data processing system 100. As a result, multiple different address translation entries buffered in the various processor cores 200 of data processing system 100 can be invalidated by different initiating hardware threads in a concurrent manner.

The illustrated process begins at block 500 and then proceeds to block 501, which illustrates execution of a TLBIE instruction 406 in an instruction sequence 400 by execution unit(s) 300 of a processor core 200. Execution of TLBIE instruction 406 determines a target effective address for which all translation entries buffered in translation structure(s) 310 throughout data processing system 100 are to be invalidated. In response to execution of TLBIE instruction 406, processor core 200 pauses the dispatch of any additional instructions in the initiating hardware thread because in the exemplary embodiment of FIG. 3 sidecar logic 322 includes only a single sidecar 324 per thread, meaning that at most one TLBIE request per thread can be active at a time. In other embodiments having multiple sidecars 324 per thread, multiple concurrently active TLBIE requests per thread can be supported.

At block 504, a TLBIE request corresponding to TLBIE instruction 406 is generated and issued to L1 STQ 304. The TLBIE request may include, for example, a transaction type indicating the type of the request (i.e., TLBIE), the effective address for which cached translations are to be invalidated, and an indication of the initiating processor core 200 and hardware thread that issued the TLBIE request. Processing of requests in L1 STQ 304 progresses, and the TLBIE request eventually moves from L1 STQ 304 to L2 STQ 320 via bus 318 as indicated at block 506. The process then proceeds to block 508, which illustrates that the initiating processor core 200 continues to refrain from dispatching instructions within the initiating hardware thread until it receives a TLBCMPLT_ACK signal from the storage subsystem via bus 325, indicating that processing of the TLBIE request by the initiating processor core 200 is complete. (Generation of the TLBCMPLT_ACK signal is described below with reference to block 1010 of FIG. 10.) It should also be noted that because dispatch of instructions within the initiating thread is paused, there can be no contention for the sidecar 324 of the initiating thread by a TSYNC request corresponding to TSYNC instruction 408, as, for any given thread, only one of the two types of requests can be present in L2 STQ 320 and sidecar logic 322 at a time.

In response to a determination at block 508 that a TLBCMPLT_ACK signal has been received, the process proceeds from block 508 to block 510, which illustrates processor core 200 resuming dispatch of instructions in the initiating thread; thus, release of the thread at block 510 allows processing of TSYNC instruction 408 (which is the next instruction in instruction sequence 400) to begin as described below with reference to FIG. 11. Thereafter, the process of FIG. 5 ends at block 512.

Figure 6:
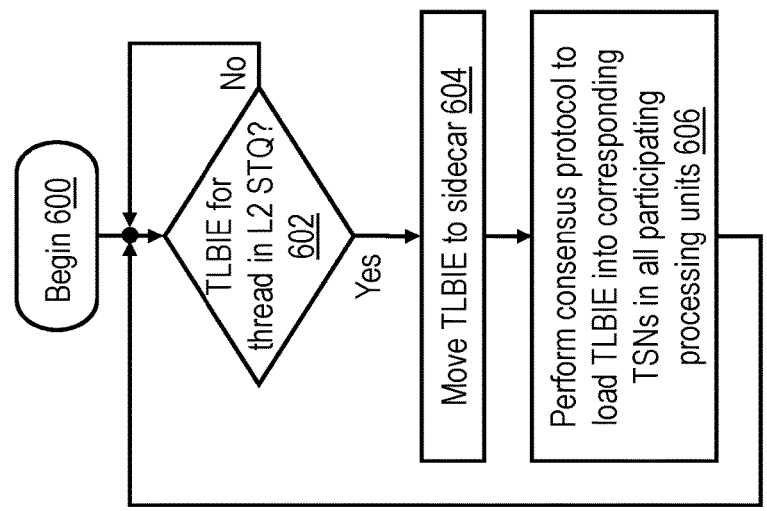
FIG. 6 is a high-level logical flowchart of an exemplary method by which sidecar logic of a processing unit processes a translation entry invalidation request in accordance with one embodiment.

Referring now to FIG. 6, there is depicted a high-level logical flowchart of an exemplary method by which sidecar logic 322 of an L2 cache 230 processes a translation entry invalidation (e.g., TLBIE) request of a hardware thread of the affiliated processor core 200 in accordance with one embodiment. The process of FIG. 6 is performed on a per-thread basis.

The process of FIG. 6 begins at block 600 and then proceeds to block 602, which illustrates sidecar logic 322 determining whether or not a TLBIE request of a hardware thread of the affiliated processor core 200 has been loaded into L2 STQ 320. If not, the process iterates at block 602. However, in response to a determination that a TLBIE of a hardware thread of the affiliated processor core 200 has been loaded into L2 STQ 320, sidecar logic 322 removes the TLBIE request from L2 STQ 320 and moves the TLBIE request via interface 321 into the sidecar 324 corresponding to the initiating thread (block 604). Removal of the TLBIE request from L2 STQ 320 ensures that no deadlock occurs due to inability of L2 STQ 320 to receive incoming requests from the associated processor core 200 and enables such requests to flow through L2 STQ 320.

At block 606, sidecar 324 participates in a consensus protocol (which may be conventional) via interface 326 and local interconnect 114 to ensure that each relevant snooper receives its TLBIE request. In addition, the consensus protocol ensures that the various snoopers only take action to service the TLBIE request once all of the relevant snoopers have received the TLBIE request. An example of the operation of the consensus protocol is described below with reference to FIGS. 19-21. Following block 606, the process returns to block 602, which has been described.

Figure 7:
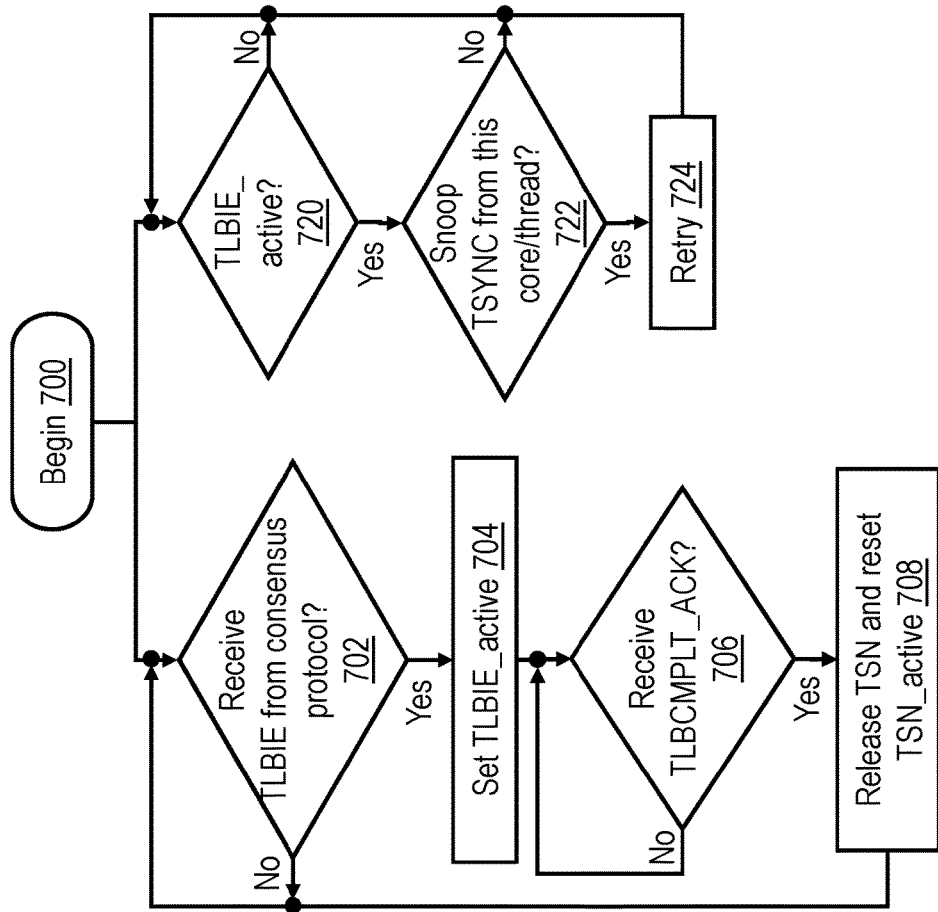
FIG. 7 is a high-level logical flowchart of an exemplary method by which a snooper of a processing unit handles translation entry invalidation requests and translation synchronization requests in accordance with one embodiment.

With reference now to FIG. 7, there is illustrated a high-level logical flowchart of an exemplary method by which TSN machines 346 processes TLBIE requests and TSYNC requests in accordance with one embodiment. The illustrated process is independently and concurrently performed for each TSN machine 346.

The process begins at block 700 and then proceeds to blocks 702 and 720. Block 702 and succeeding block 704 illustrate that in response to notification of receipt of a TLBIE request via the consensus protocol a TSN machine 346 buffers the TLBIE request and assumes a TLBIE_active state. The TLBIE request, which is broadcast over the system fabric 110, 114 to the L2 cache 230 of the initiating processor core 200 and those of all other processor cores 200 of data processing system 100 at block 606 of FIG. 6, is received by an L2 cache 230 via bus 329, processed by dispatch/response logic 336 and then assigned to the TSN machine 346. The TSN machine 346 assuming the TLBIE_active state informs the associated arbiter 348 that a TLBIE request is ready to be processed, as described further below with reference to block 802 of FIG. 8.

Block 706 illustrates TSN machine 346 remaining in the TLBIE_active state until processing of the TLBIE request by the associated processor core 200 (i.e., invalidation of the relevant translation entries in translation structure(s) 310 and draining of relevant memory referent requests from processor core 200) is completed, as indicated by receipt of a TLBCMPLT_ACK signal via bus 330. In response to receipt of the TLBCMPLT_ACK signal, the TLBIE_active state is reset, and the TSN machine 346 is released for reallocation (block 708). Thereafter, the process of FIG. 7 returns from block 708 to block 702, which has been described.

Referring now to blocks 720-724, a TSN machine 346 determines at block 720 if it is in the TLBIE_active state established at block 704. If not, the process iterates at block 720. If, however, the TSN machine 346 is in the TLBIE_active state established at block 704, the TSN machine 346 monitors to determine if a TSYNC request for the initiating hardware thread of its TLBIE request has been detected (block 722). If no TSYNC request is detected, the process continues to iterate at blocks 720-722. However, in response to a detection of a TSYNC request of the initiating hardware thread of its TLBIE request while TSN machine 346 is in the TLBIE_active state, TSN machine 346 provides a Retry coherence response via the system fabric 110, 114, as indicated at block 724. As discussed below with reference to block 1208 of FIG. 12, a Retry coherence response by any TSN machine 346 handling the TLBIE request for the initiating hardware thread forces the TSYNC request to be reissued by the source L2 cache 230 and prevents the initiating hardware thread from progressing to HWSYNC instruction 410 until the TSYNC request completes without a Retry coherence response. The TSYNC request completes without a Retry coherence response when all processor cores 200 other than the initiating processor core 200 have completed their processing of the TLBIE request. (The TSYNC request is not issued by the initiating processor core 200 until it has completed processing the TLBIE request due to the dispatch of instructions being paused for processing of the TLBIE request, as discussed above with reference to block 508 of FIG. 5.)

Figure 8:
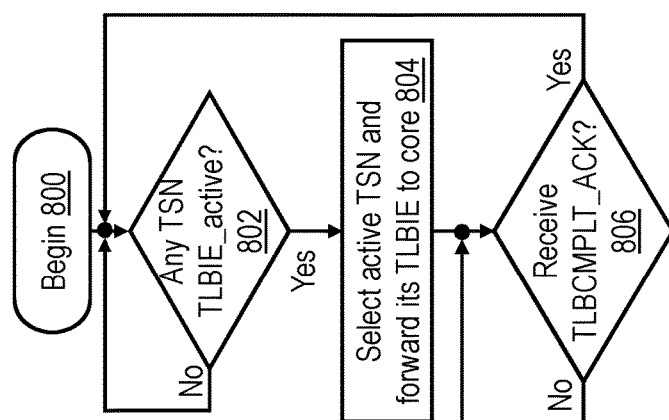
FIG. 8 is a high-level logical flowchart of an exemplary method by which an arbiter of a processing unit processes a translation entry invalidation request in accordance with one embodiment.

Referring now to FIG. 8, there is a high-level logical flowchart of an exemplary method by which an arbiter 348 of the L2 cache 230 processes a TLBIE request in accordance with one embodiment. The process begins at block 800 and then proceeds to block 802, which illustrates arbiter 348 determining whether or not any of its TSN machines 346 is in the TLBIE_active state. If not, the process of FIG. 8 iterates at block 802. However, in response to determining that one or more of its TSN machines 346 is in the TLBIE_active state, arbiter 348 selects one of the TSN machines 346 in the TLBIE_active state that has not been previously had its TLBIE request forwarded and transmits its TLBIE request via bus 350 to the translation sequencer 312 of the affiliated processor core 200 (block 804). To avoid deadlock, translation sequencer 312 is configured to accept TLBIE requests within a fixed time and not arbitrarily delay accepting a TLBIE request.

The process proceeds from block 804 to block 806, which depicts arbiter 348 awaiting receipt of a TLBCMPLT_ACK message indicating that the affiliated processor core 200 has, in response to the TLBIE request, invalidated the relevant translation entry or entries in translation structure(s) 310 and drained the relevant memory referent requests that may have had their target addresses translated by the invalidated translation entries. Thus, at block 806, arbiter 348 is awaiting a TLBCMPLT_ACK message like both the initiating thread (block 508) and a TSN machine 346 in each of the L2 caches 230 (block 706). In response to receipt of a TLBCMPLT_ACK message at block 806, the process returns to block 802, which has been described. It should be noted that by the time the process returns to block 802, the previously selected TSN machine 346 will not still be in the TLBIE_active state for the already processed TLBIE request because the TLBIE_active state will have been reset as illustrated at blocks 706-708 before the process returns to block 802.

The process of FIG. 8 (and blocks 802 and 806 in particular) ensures that only one TLBIE request is being processed by the processor core 200 at a time. The serial processing of TLBIE requests by the processor core 200 eliminates the need to tag TLBCMPLT_ACK messages to associate them with TLBIE requests and simplifies instruction marking mechanisms, as discussed below with reference to FIG. 9. Those skilled in the art will recognize, however, that in other embodiments the processor core 200 can be configured to service multiple TLBIE requests concurrently with some additional complexity.

Figure 9:
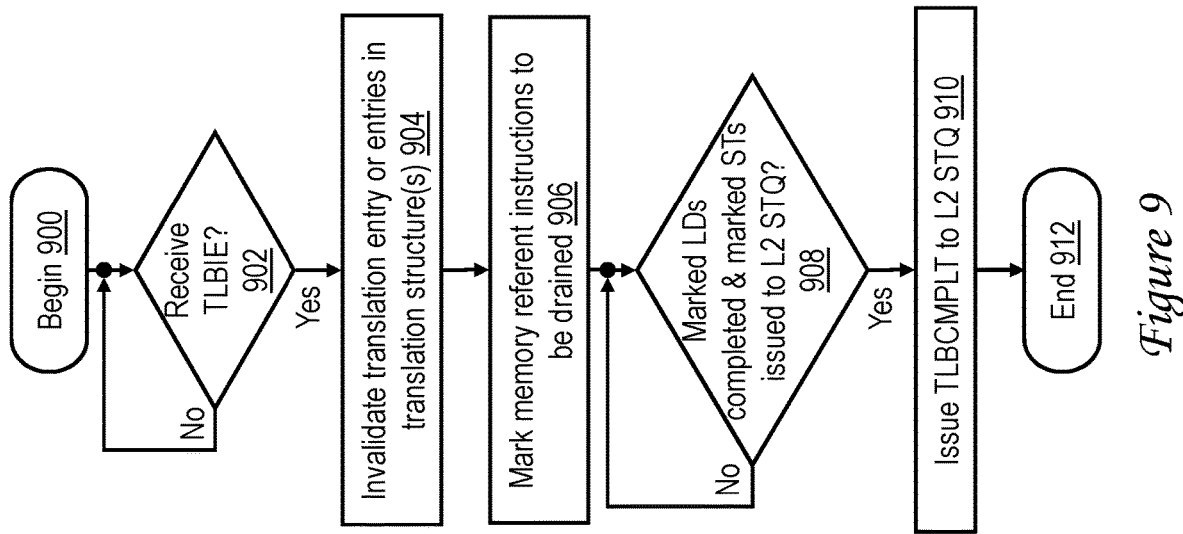
FIG. 9 is a high-level logical flowchart of an exemplary method by which a translation sequencer of a processor core processes a translation entry invalidation request in accordance with one embodiment.

With reference now to FIG. 9, there is illustrated a high-level logical flowchart of an exemplary method by which a translation sequencer 312 of an initiating or snooping processor core 200 processes a TLBIE request in accordance with one embodiment. The process shown in FIG. 9 begins at block 900 and then proceeds to block 902, which illustrates translation sequencer 312 awaiting receipt of a TLBIE request forward by arbiter 348 as described above with reference to block 804 of FIG. 8. In response to receipt of a TLBIE request, translation sequencer 312 invalidates one or more translation entries (e.g., PTEs or other translation entries) in translation structure(s) 310 that translate the target effective address of TLBIE request (block 904). In addition, at block 906, translation sequencer 312 marks all memory referent requests that are to be drained from the processor core 200.

In a less precise embodiment, at block 906 translation sequencer 312 marks all memory referent requests of all hardware threads in processor core 200 that have had their target addresses translated under the assumption that any of such memory referent requests may have had its target address translated by a translation entry or entries invalidated by the TLBIE request received at block 902. Thus, in this embodiment, the marked memory reference requests would include all store requests in L1 STQ 304 and all load requests in LMQ 306. This embodiment advantageously eliminates the need to implement comparators for all entries of L1 STQ 304 and LMQ 306, but can lead to higher latency due to long drain times.

A more precise embodiment implements comparators for all entries of L1 STQ 304 and LMQ 306. In this embodiment, each comparator compares a subset of effective address bits that are specified by the TLBIE request (and that are not translated by MMU 308) with corresponding real address bits of the target real address specified in the associated entry of L1 STQ 304 or LMQ 306. Only the memory referent requests for which the comparators detect a match are marked by translation sequencer 312. Thus, this more precise embodiment reduces the number of marked memory access requests at the expense of additional comparators.

In some implementations of the less precise and more precise marking embodiments, the marking applied by translation sequencer 312 is applied only to requests within processor core 200 and persists only until the marked requests drain from processor core 200. In such implementations, L2 cache 230 may revert to pessimistically assuming all store requests in flight in L2 cache 230 could have had their addresses translated by a translation entry invalidated by the TLBIE request and force all such store requests to be drained prior to processing store requests utilizing a new translation of the target effective address of the TLBIE request. In other implementations, the more precise marking applied by translation sequencer 312 can extend to store requests in flight in L2 cache 230 as well.

The process of FIG. 9 proceeds from block 906 to block 908, which illustrates translation sequencer 312 waiting for the requests marked at block 906 to drain from processor core 200. In particular, translation sequencer 312 waits until all load requests marked at block 906 have had their requested data returned to processor core 200 and all store requests marked at block 906 have been issued to L2 STQ 320. In response to all marked requests draining from processor core 200, translation sequencer 312 inserts a TLBCMPLT request into L2 STQ 320 to indicate that servicing of the TLBIE request by translation sequencer 312 is complete (block 910). Thereafter, the process of FIG. 9 ends at block 912.

Figure 10:
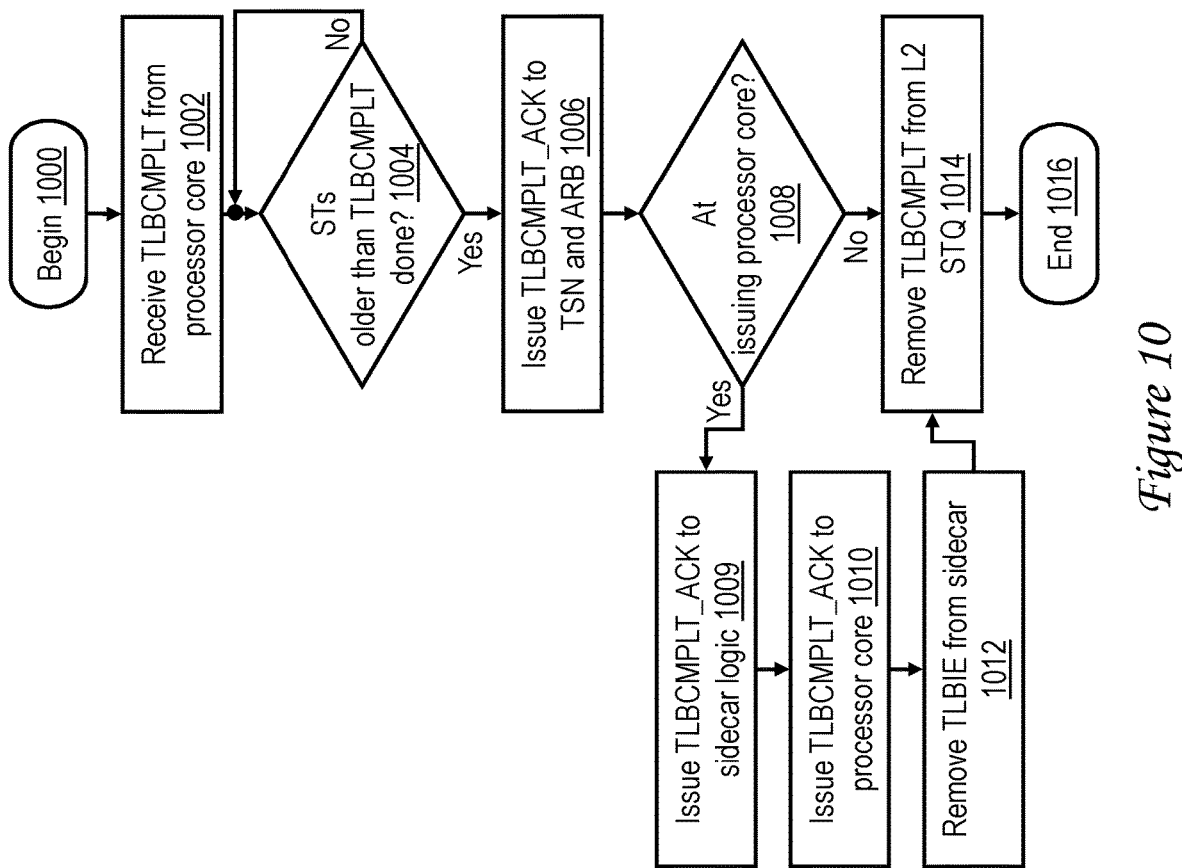
FIG. 10 is a high-level logical flowchart of an exemplary method by which a store queue of a processing unit processes a translation invalidation complete request in accordance with one embodiment.

Referring now to FIG. 10, there is depicted a high-level logical flowchart of an exemplary method by which an L2 STQ 320 processes a TLBCMPLT request in accordance with one embodiment. The process of FIG. 10 begins at block 1000 and then proceeds to block 1002, which illustrates L2 STQ 320 receiving and enqueuing in one of its entries a TLBCMPLT request issued by its associated processor core 200 as described above with reference to block 910 of FIG. 9. At illustrated at block 1004, following receipt of the TLBCMPLT request L2 STQ 320 waits until all older store requests of all hardware threads drain from L2 STQ 320. Once all of the older store requests have drained from L2 STQ 320, the process proceeds from block 1004 to block 1006, which illustrates L2 STQ 320 transmitting a TLBCM-PLT_ACK signal via bus 330 to TSN machine 346 that issued the TLBIE request and to arbiter 348, which as noted above with reference to blocks 706 and 806 are awaiting confirmation of completion of processing of the TLBIE request.

At block 1008, L2 STQ 320 determines whether or not the affiliated processor core 200 is the initiating processor core of the TLBIE request whose completion is signaled by the TLBCMPLT request, for example, by examining the thread-identifying information in the TLBCMPLT request. If not (meaning that the process is being performed at an L2 cache 230 associated with a snooping processing core 200), processing of the TLIBIE request is complete, and L2 STQ 320 removes the TLBCMPLT request from L2 STQ 320 (block 1014). Thereafter, the process ends at block 1016.

If, on the other hand, L2 cache 230 determines at block 1008 that its affiliated processor core 200 is the initiating processor core 200 of a TLBIE request buffered in sidecar logic 322, the process proceeds from block 1008 to block 1009, which illustrates L2 STQ 320 issuing the TLBCM-PLT_ACK signal to sidecar logic 322 via bus 330. In response to receipt of the TLBCMPLT_ACK signal, sidecar logic 322 issues a TLBCMPLT_ACK signal to the affiliated processor core 200 via bus 325. As noted above with reference to block 508 of FIG. 5, receipt of the TLBCM-PLT_ACK signal frees the initiating thread of processor core 200 to resume dispatch of new instructions (i.e., TSYNC instruction 408, whose behavior is explained with reference to FIG. 11). The relevant sidecar 324 then removes the completed TLBIE request (block 1012), and the process passes to blocks 1014 and 1016, which have been described.

With reference now to FIG. 11, there is illustrated a high-level logical flowchart of an exemplary method by which a processor core 200 processes a translation synchronization (e.g., TSYNC) instruction in accordance with one embodiment.

The illustrated process begins at block 1100 and then proceeds to block 1101, which illustrates execution of a TSYNC instruction 408 in an instruction sequence 400 by execution unit(s) 300 of a processor core 200. In response to execution of TSYNC instruction 408, processor core 200 pauses the dispatch of any following instructions in the hardware thread (block 1102). As noted above, dispatch is paused because in the exemplary embodiment of FIG. 3 sidecar logic 322 includes only a single sidecar 324 per hardware thread of the processor core 200, meaning that at most one TLBIE or TSYNC request per thread can be active at a time.

At block 1104, a TSYNC request corresponding to TSYNC instruction 408 is generated and issued to L1 STQ 304. The TSYNC request may include, for example, a transaction type indicating the type of the request (i.e., TSYNC) and an indication of the initiating processor core 200 and hardware thread that issued the TSYNC request. Processing of requests in L1 STQ 304 progresses, and the TSYNC request eventually moves from L1 STQ 304 to L2 STQ 320 via bus 318 as indicated at block 1106. The process then proceeds to block 1108, which illustrates that the initiating processor core 200 continues to refrain from dispatching instructions within the initiating hardware thread until it receives a TSYNC_ACK signal from the storage subsystem via bus 325, indicating that processing of the TSYNC request by the initiating processor core 200 is complete. (Generation of the TSYNC_ACK signal is described below with reference to block 1210 of FIG. 12.) It should again be noted that because dispatch of instructions within the initiating thread is paused, there can be no contention for the sidecar 324 of the initiating hardware thread by another TLBIE request, as, for any given thread, only one of the two types of requests can be present in L2 STQ 320 and sidecar logic 322 at a time.

In response to a determination at block 1108 that a TSYNC_ACK signal has been received, the process proceeds to block 1110, which illustrates processor core 200 resuming dispatch of instructions in the initiating thread; thus, release of the thread at block 1110 allows processing of HWSYNC instruction 410 (which is the next instruction in instruction sequence 400) to begin. Thereafter, the process of FIG. 11 ends at block 1112.

Referring now to FIG. 12, there is depicted a high-level logical flowchart of an exemplary method by which sidecar logic 324 processes a TSYNC request in accordance with one embodiment. The process begins at block 1200 and then proceeds to block 1202, which depicts sidecar logic 324 monitoring for notification via interface 321 that a TSYNC request has been enqueued in L2 STQ 320. In response to receipt of notification via interface 321 that a TSYNC request has been enqueued in L2 STQ 320, sidecar logic 322 moves the TSYNC request via interface 321 to the sidecar 324 of the initiating hardware thread (block 1204). In response to receiving the TSYNC request, the sidecar 324 issues the TSYNC request on system fabric 110, 114 via interface 326 (block 1206) and then monitors the coherence response to the TSYNC request to determine whether or not any TSN machine 346 provided a Retry coherence response as previously described with respect to block 724 of FIG. 7 (block 1208). As noted above, a TSN machine 346 provides a Retry coherence response if the TSN machine is still in the TLBIE_active state and waiting for its snooping processor core 200 to complete processing of the preceding TLBIE request of the same initiating processor core 200 and hardware thread. It can be noted that by the time a TSYNC request is issued, the issuing processing unit's TSN machine 346 will no longer be in the TLBIE_active state and will not issue a Retry coherence response because the TLBCMPLT_ACK signal resets the issuing processor core's TSN machine 346 to an inactive state at block 1006 before the TLBCMPLT_ACK is issued to the initiating processor core 200 at block 1010. Receipt of the TLBCMPLT_ACK signal by the processor core 200 causes the initiating processor core 200 to resume dispatching instructions after the TLBIE instruction 406 and thus execute TSYNC instruction 408 to generate the TSYNC request. However, the initiating processor core 200 may complete processing the TLBIE request long before the snooping processing cores 200 have completed their translation entry invalidations and drained the memory referent instructions marked as dependent or possibly dependent on the invalidated translation entries. Consequently, the TSYNC request ensures that the invalidation of the translation entries and draining of the memory referent instructions dependent on the invalidated translation entries at the snooping processing cores 200 is complete before the initiating processor core 200 executes HWSYNC instruction 410.

Once the all the snooping processor cores 200 have completed their processing of the TLBIE request, eventually the TSYNC request will complete without a Retry coherence response. In response to the TSYNC request completing without a Retry coherence response at block 1208, the sidecar 324 issues a TSYNC_ACK signal to the initiating processor core 200 via bus 325 (block 1210). As described above with reference to block 1108, in response to receipt of the TSYNC_ACK signal the initiating processor core 200 executes HWSYNC instruction 410, which completes the initiating thread's ordering requirements with respect to younger memory referent instructions. Following block 1210, the sidecar 324 removes the TSYNC request (block 1212), and the process returns to block 1202, which has been described.

Having now described instruction sequence 400 of FIG. 4A and the associated processing in detail with reference to FIGS. 5-12, reference is now made to FIG. 4B, which illustrates an alternative code sequence 420 that reduces the number of instructions, and in particular, synchronization instructions, in the translation invalidation sequence. As shown, instruction sequence 420 includes one or more store instructions 422 to invalidate PTEs 222 in page frame table 220, a HWSYNC instruction 424, and one or more TLBIE instructions 426 that invalidate cached translation entries for specified effective addresses in all processor cores 200. Instructions 422-426 thus correspond to instructions 402-406 of instruction sequence 400 of FIG. 4A. Instruction sequence 420 additionally includes a PTESYNC instruction 430 immediately following TLBIE instruction 426. PTESYNC instruction 430 combines the work performed by TSYNC instruction 408 and HWSYNC instruction 410 of instruction sequence 400 of FIG. 4A into a single instruction. That is, execution of PTESYNC instruction 430 generates a PTESYNC request that is broadcast to all processing nodes 104 of data processing system 100 to both ensure systemwide completion of the TLBIE request generated by TLBIE instruction 426 (as does the TSYNC request generated by execution of TSYNC instruction 408) and to enforce instruction ordering with respect to younger memory referent instructions (as does the HWSYNC request generated by execution of HWSYNC instruction 410).

Given the similarities of instruction sequence 420 and 400, processing of instruction sequence 420 is the same as that for instruction sequence 400 given in FIGS. 5-12, except for the processing related to the PTESYNC request generated by execution of PTESYNC instruction 430, which is described below with reference to FIGS. 13-15.

Figure 13:
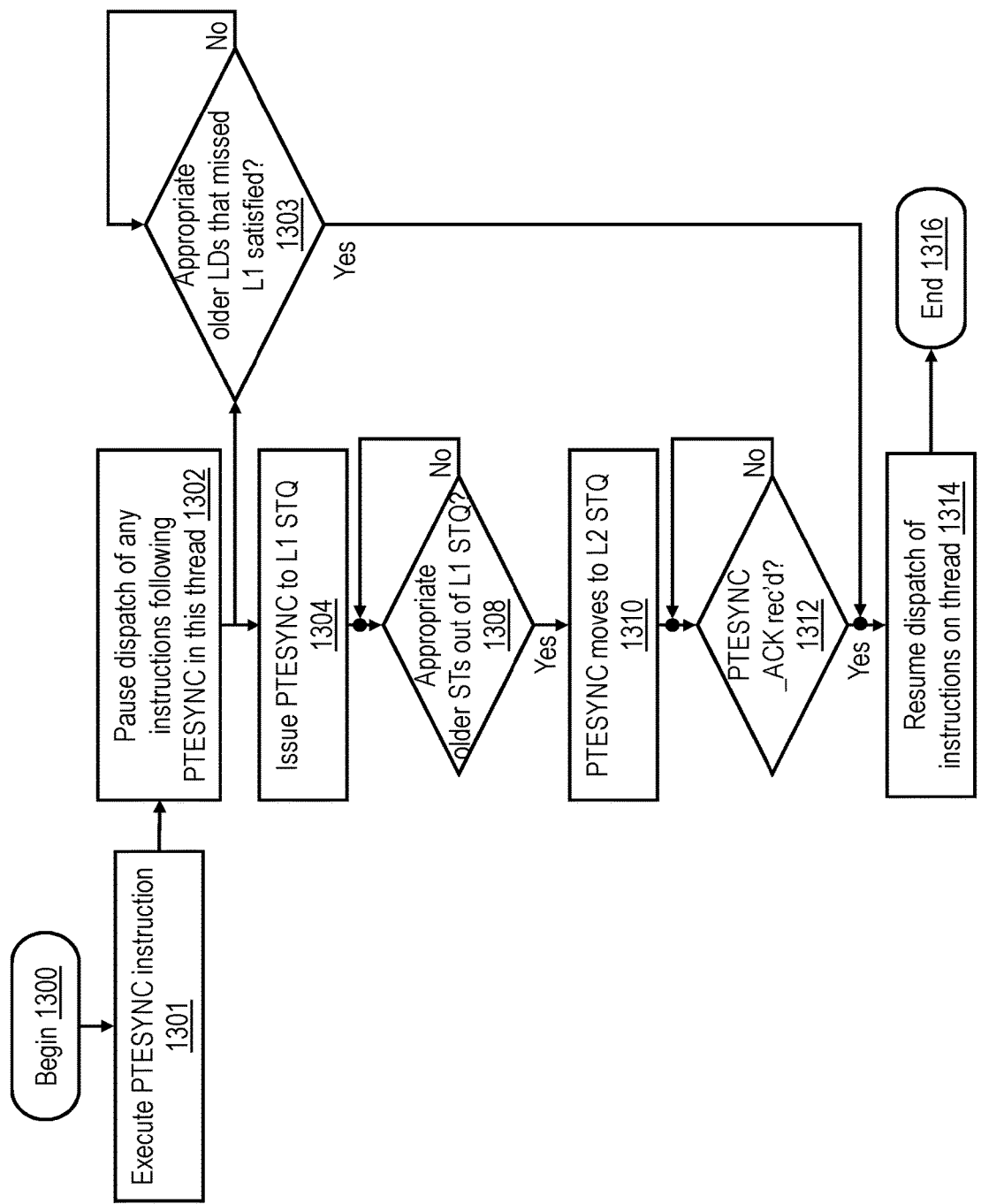
FIG. 13 is a high-level logical flowchart of an exemplary method by which a processing core processes a page table synchronization instruction in accordance with one embodiment.

With reference now to FIG. 13, there is illustrated a high-level logical flowchart of an exemplary method by which a processing core 200 processes a page table synchronization (e.g., PTESYNC) instruction 430 in accordance with one embodiment. As noted above, PTESYNC instruction 430 and the PTESYNC request generated by its execution have two functions, namely, ensuring systemwide completion of the TLBIE request(s) generated by TLBIE instruction(s) 426 and to enforce instruction ordering with respect to younger memory referent instructions.

The illustrated process begins at block 1300 and then proceeds to block 1301, which illustrates a processor core 200 generating a PTESYNC request by execution of a PTESYNC instruction 430 in an instruction sequence 420 in execution unit(s) 300. The PTESYNC request may include, for example, a transaction type indicating the type of the request (i.e., PTESYNC) and an indication of the initiating processor core 200 and hardware thread that issued the PTESYNC request. In response to execution of PTESYNC instruction 430, processor core 200 pauses the dispatch of any younger instructions in the initiating hardware thread (block 1302). As noted above, dispatch is paused because in the exemplary embodiment of FIG. 3 sidecar logic 322 includes only a single sidecar 324 per hardware thread of the processor core 200, meaning that in this embodiment at most one TLBIE or PTESYNC request per thread can be active at a time.

Following block 1302, the process of FIG. 13 proceeds in parallel to block 1303 and blocks 1304-1312. Block 1303 represents the initiating processor core 200 performing the load ordering function of the PTESYNC request by waiting for all appropriate older load requests of all hardware threads (i.e., those that would be architecturally required by a HWSYNC to receive their requested data prior to completion of processing of the HWSYNC request) to drain from LMQ 306. By waiting for these load requests to be satisfied at block 1303, it is guaranteed that the set of load requests identified at block 906 will receive data from the correct memory page (even if the target address was on the memory page being reassigned) rather than a reassigned memory page.

In parallel with block 1303, processor core 200 also issues the PTESYNC request corresponding to PTESYNC instruction 430 to L1 STQ 304 (block 1304). The process proceeds from block 1304 to block 1308, which illustrates processor core 200 performing the store ordering function of the PTESYNC request by waiting until all appropriate older store requests of all hardware threads (i.e., those that would be architecturally required by a HWSYNC to have drained from L1 STQ 304) to drain from L1 STQ 304. Once the store ordering performed at block 1308 is complete, the PTESYNC request is issued from L1 STQ 304 to L2 STQ 320 via bus 318 as indicated at block 1310.

The process then proceeds from block 1310 to block 1312, which illustrates the initiating processor core 200 monitoring to detect receipt of a PTESYNC_ACK signal from the storage subsystem via bus 325 indicating that processing of the PTESYNC request by the initiating processor core 200 is complete. (Generation of the PTESYNC_ACK signal is described below with reference to block 1410 of FIG. 14.) It should again be noted that because dispatch of instructions within the initiating hardware thread remains paused, there can be no contention for the sidecar 324 of the initiating hardware thread by another TLBIE request, as, for any given thread, only one of a TLBIE request or PTESYNC request can be present in L2 STQ 320 and sidecar logic 322 at a time.

Only in response to affirmative determinations at both of blocks 1303 and 1312, the process of FIG. 13 proceeds to block 1314, which illustrates processor core 200 resuming dispatch of instructions in the initiating thread; thus, release of the thread at block 1314 allows processing of instructions following PTESYNC instruction 430 to begin. Thereafter, the process of FIG. 13 ends at block 1316.

Figure 14:
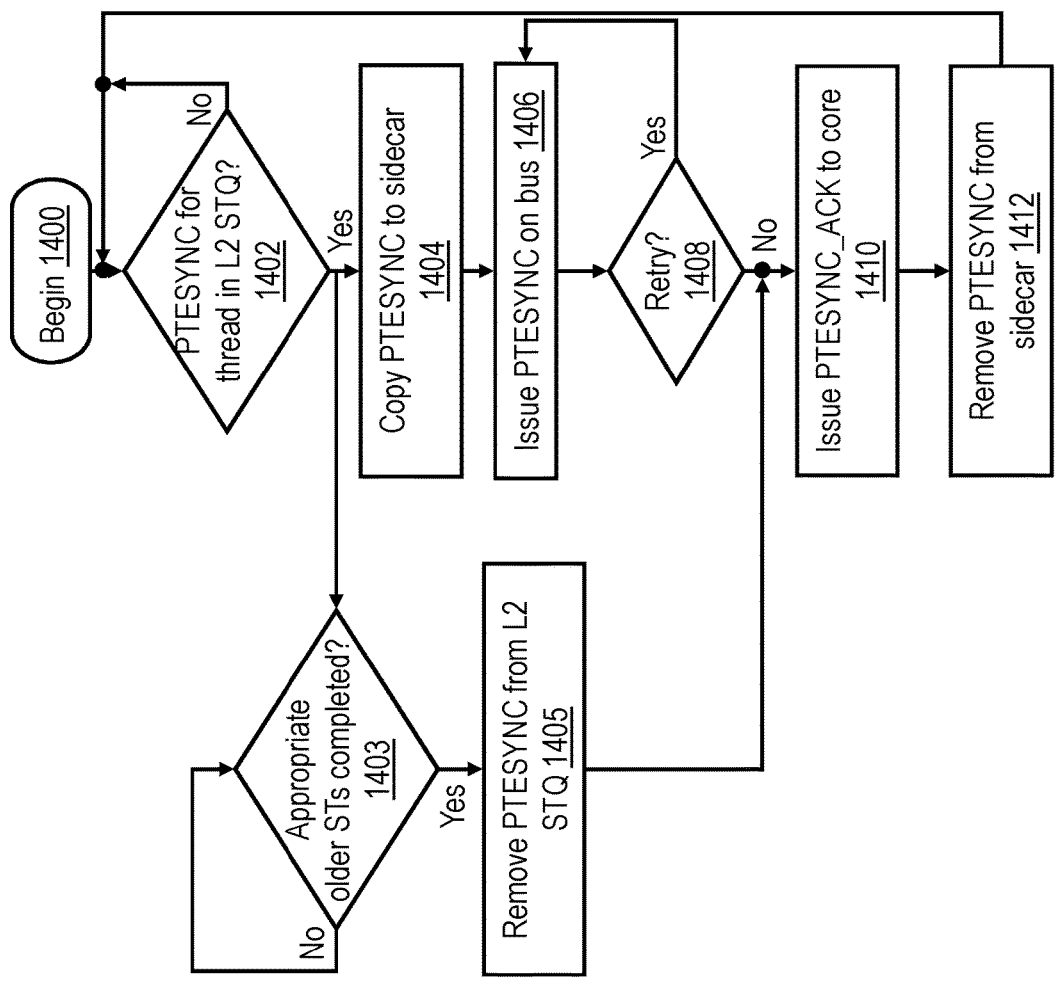
FIG. 14 is a high-level logical flowchart of an exemplary method by which a processing unit processes a page table synchronization request in accordance with one embodiment.

Referring now to FIG. 14, there is depicted a high-level logical flowchart of an exemplary method by which L2 STQ 320 and sidecar logic 322 of a processing node 104 process a PTESYNC request in accordance with one embodiment. The process of FIG. 14 begins at block 1400 and then proceeds to block 1402, which depicts L2 STQ 320 monitoring for receipt of a PTESYNC request from L1 STQ 304, as described above with reference to block 1310 of FIG. 13. In the second embodiment of FIG. 4B, in response to receipt of the PTESYNC request, L2 STQ 320 and sidecar logic 324 cooperate to perform two functions, namely, (1) store ordering for store requests within L2 STQ 320 and (2) ensuring completion of the TLBIE request at all of the other processing cores 200. In the embodiment of FIG. 14, these two functions are performed in parallel along the two paths illustrated at blocks 1403, 1405 and blocks 1404, 1406 and 1408, respectively. In alternative embodiments, these functions could instead be serialized by first performing the ordering function illustrated at blocks 1403 and 1405 and then ensuring completion of the TLBIE request at blocks 1404, 1406, and 1408. (It should be noted that attempting to serialize the ordering of these function by ensuring completion of the TLBIE request prior to performing store ordering can create a deadlock.)

Referring now to block 1403-1405, L2 STQ 320 performs store ordering for the PTESYNC request by ensuring that all appropriate older store requests within L2 STQ 320 have been drained from L2 STQ 320. The set of store requests that are ordered at block 1403 includes a first subset that may have had their target addresses translated by the translation entry invalidated by the earlier TLBIE request. This first subset corresponds to those marked at block 906. In addition, the set of store requests that are ordered at block 1403 includes a second subset that includes those architecturally defined store requests would be ordered by a HWSYNC. Once all such store requests have drained from L2 STQ 320, L2 STQ 320 removes the PTESYNC request from L2 STQ 320 (block 1405). Removal of the PTESYNC request allows store requests younger than the PTESYNC request to flow through L2 STQ 320.

Referring now to block 1404, sidecar logic 322 detects the presence of the PTESYNC request in L2 STQ 320 and copies the PTESYNC request to the appropriate sidecar 324 via interface 321 prior to removal of the PTESYNC request from L2 STQ 320 at block 1405. The process then proceeds to the loop illustrated at blocks 1406 and 1408 in which sidecar logic 322 continues to issue PTESYNC requests on system fabric 110, 114 until no processor core 200 responds with a Retry coherence response (i.e., until the preceding TLBIE request of the same processor core and hardware thread has been completed by all snooping processor cores 200).

Only in response to completion of both of the functions depicted at blocks 1403, 1405 and blocks 1404, 1406 and 1408, the process proceeds to block 1410, which illustrates sidecar logic 322 issuing a PTESYNC_ACK signal to the affiliated processor core via bus 325. Sidecar logic 322 then removes the PTESYNC request from the sidecar 324 (block 1412), and the process returns to block 1402, which has been described.

Figure 15:
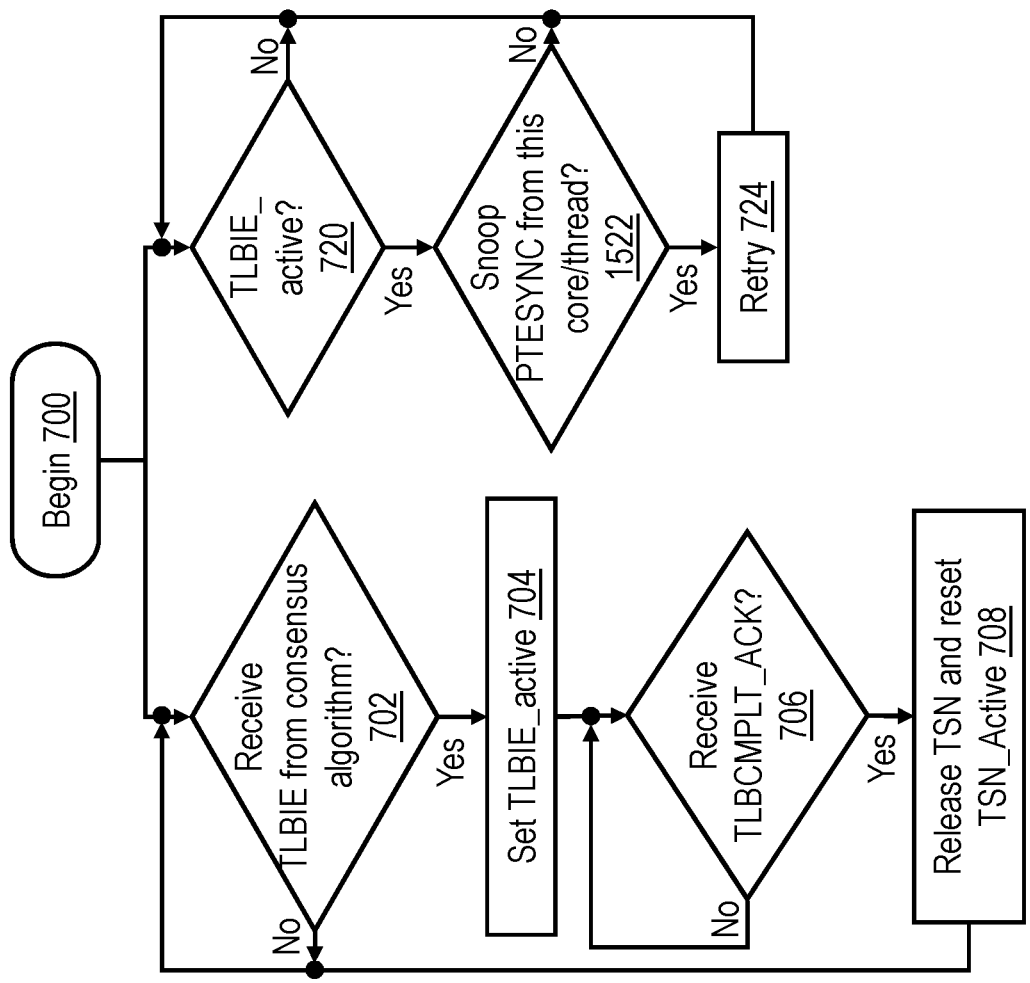
FIG. 15 is a high-level logical flowchart of an exemplary method by which snooper logic of a processing unit processes translation invalidation requests, translation invalidation complete requests, and page table synchronization requests in accordance with one embodiment.

With reference now to FIG. 15, there is a high-level logical flowchart of an exemplary method by which TSN machines 346 process TLBIE requests, TLBCMPT_ACK signals, and PTESYNC requests in accordance with one embodiment. As indicated by like reference numerals, FIG.

15 is the same as previously described FIG. 7, except for block 1522. Block 1522 illustrates that while in the TLBIE_active state established at block 704, the TSN machine 346 monitors to determine if a PTESYNC request specifying an initiating processor core and hardware thread matching its TLBIE request has been detected. If not, the process continues to iterate at the loop including blocks 720 and 1522. However, in response to a TSN machine 346 detecting a PTESYNC request specifying a processor core and initiating hardware thread matching its TLBIE request while in the TLBIE_active state, TSN machine 346 provides a Retry coherence response, as indicated at block 724. As discussed above, a Retry coherence response by any TSN machine 346 handling the TLBIE request for the initiating hardware thread forces the PTESYNC request to be retried and prevents the initiating hardware thread from executing any memory referent instructions younger than PTESYNC instruction 430 until the PTESYNC request completes without a Retry coherence response.

Figure 18:
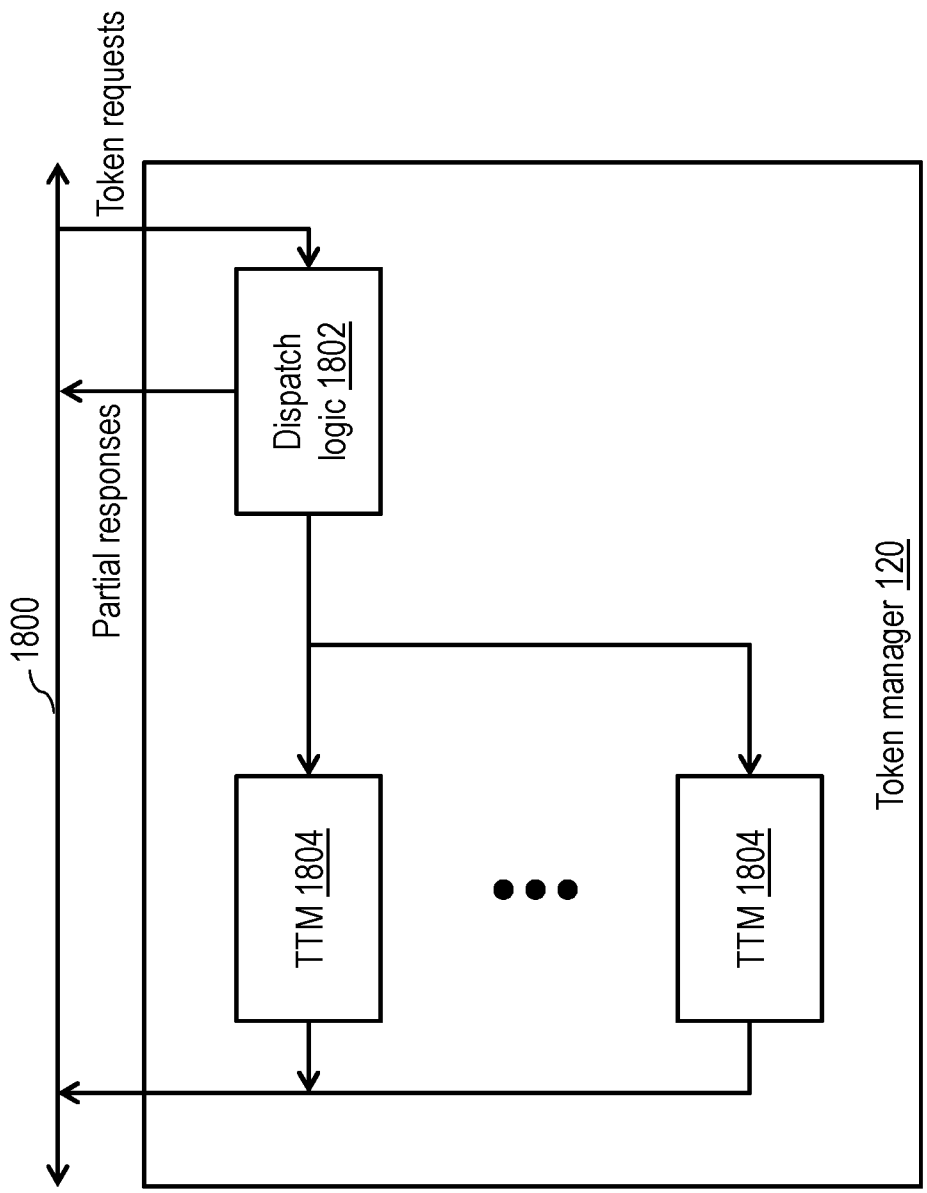
FIG. 18 is a high-level block diagram of an exemplary embodiment of a token manager in accordance with one embodiment.

Referring now to FIG. 18, there is depicted a high-level block diagram of an exemplary embodiment of a token manager 120 in accordance with one embodiment. In this example, token manager 120 includes dispatch logic 1802, which is coupled to receive requests of predetermined transaction types (ttypes) on the system fabric 1800 (which includes system interconnect 110 and local interconnects 114). In some embodiments, these requests include token requests and TLBIE requests; in other embodiments, the requests received by dispatch logic 1802 may include multicast requests of alternative or additional transaction types. Requests of other than the predetermined ttypes are ignored by dispatch logic 1802 of token manager 120.

Token manager 120 additionally includes a number of token tracking machines (TTMs) 1804, which manage the assignment of tokens to masters of multicast requests. In a preferred embodiment, each snooper relevant for a given ttype of multicast request for which tokens are assigned by token manager 120 has multiple snoop machines corresponding in number and identifier to the TTMs 1804 implemented in token manager 120. Thus, for example, token manager 120 may implement eight (8) TTMs 1804 for tracking the assignment of tokens to TLBIE requests, meaning that each IOMMU 210 and L2 cache 230 implements eight TSN machines 346 each uniquely and respectively corresponding to a respective one of TTMs 1804 and identifiable by a common machine identifier (e.g., which can be specified in token field 1704 of a multicast request 1602).

In operation, a master 1600 having a multicast request to issue on system fabric 1800 for which a token is required first issues a token request on the system fabric, as explained below in greater detail with reference to FIG. 19. In response to a successful token request, token manager 120 assigns a token for use in association with the multicast request, as discussed below in detail with reference to FIG. 20. In response to receiving the token assigned by token manager 120, the master 1600 issues the multicast request (e.g., a TLBIE request) on system fabric 1800 to a set of participating snoopers, as described below with reference to FIG. 19.

Figure 21:
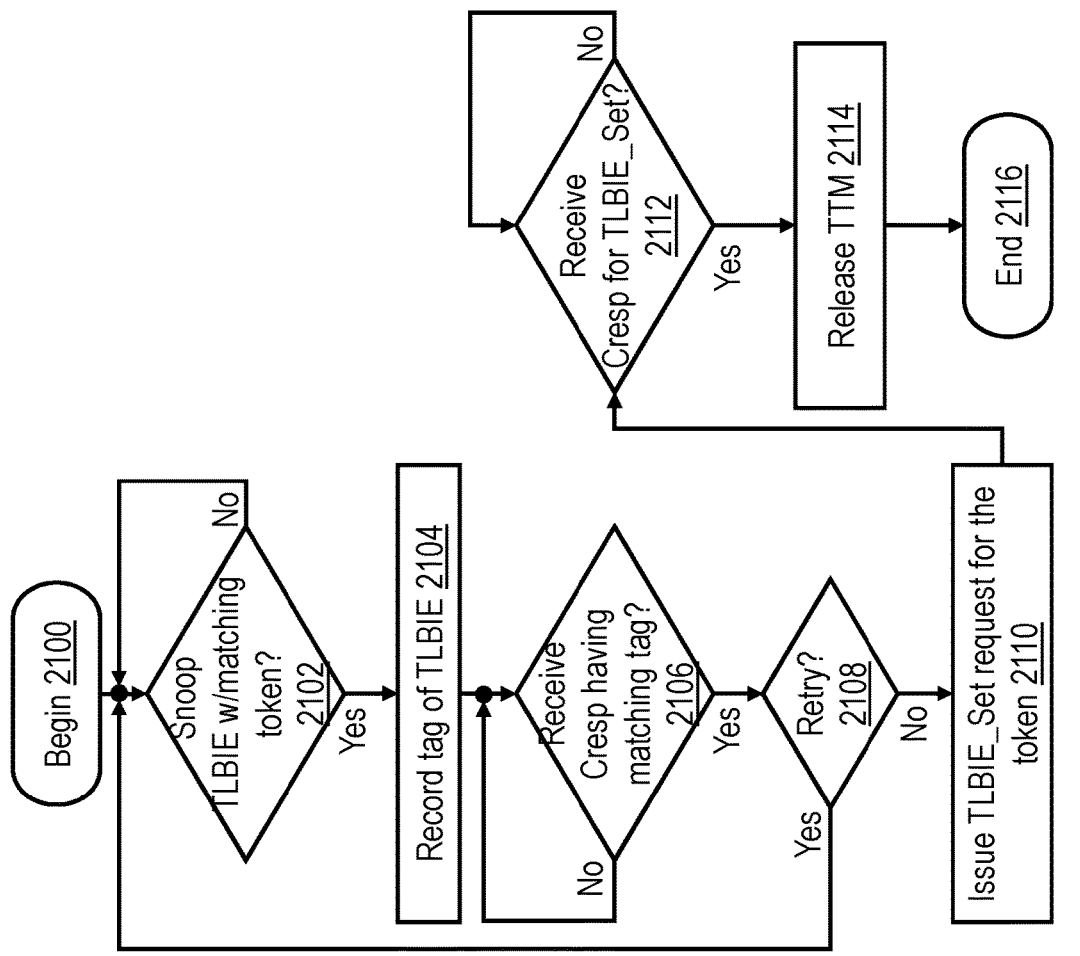
FIG. 21 is a high-level logical flowchart of an exemplary method by which a token manager instructs snoopers to process a translation entry invalidation request in accordance with one embodiment.
Figure 22:
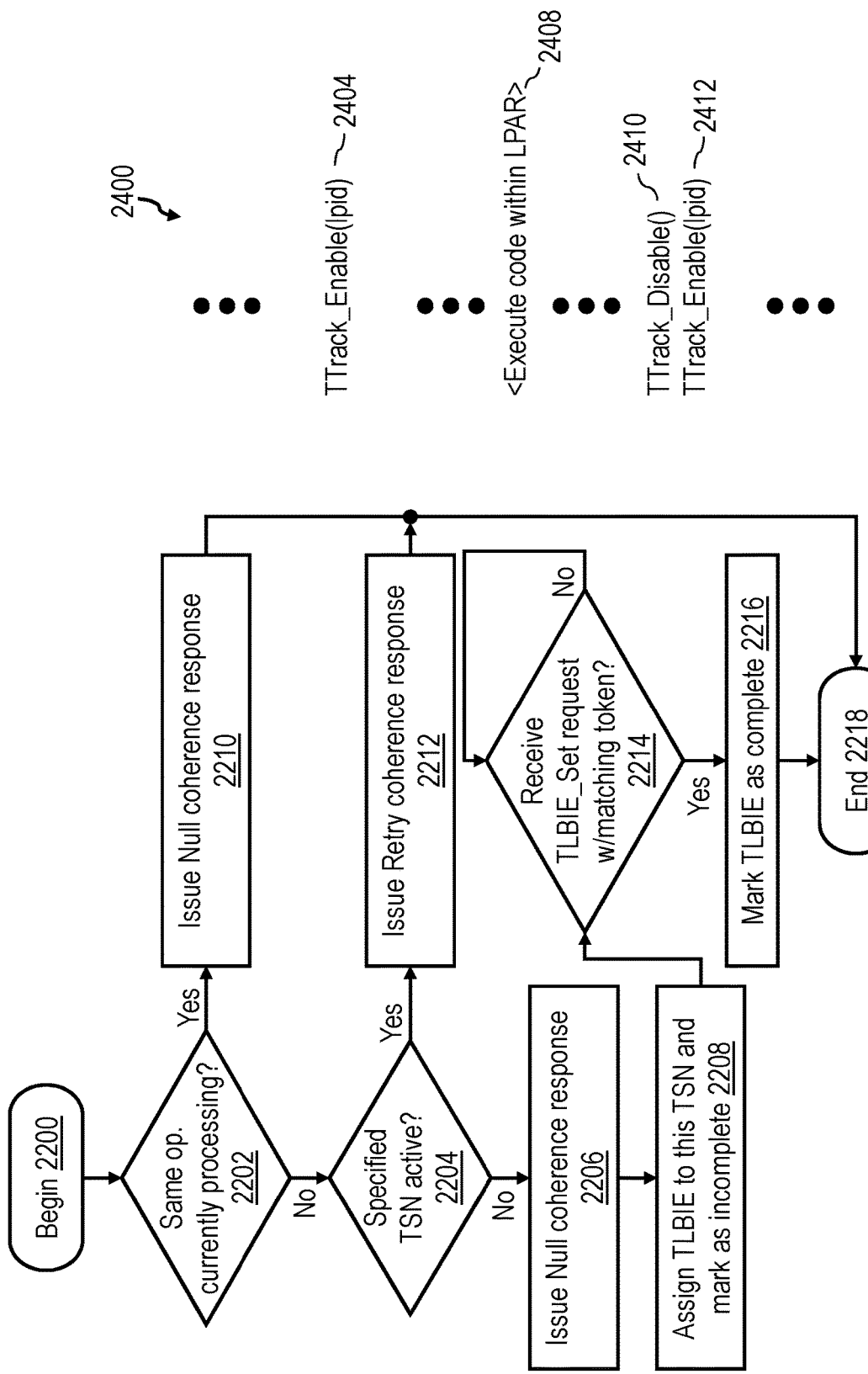
FIG. 22 is a high-level logical flowchart of an exemplary method by which a snooping processing unit receives and processes a translation entry invalidation request in accordance with one embodiment.

In response to receipt of confirmation that all participating snoopers have received the multicast request, token manager 120 initiates processing of the multicast request by all participating snoopers by issuing a TLBIE_Set request, as depicted in FIG. 21 and described below. In response to initiation of processing of the multicast request by token manager 120, token manager 120 releases the TTM 1804 allocated to track usage of the assigned token, and the participating snoopers process the multicast request, as shown in FIG. 22 and described below.

Figure 19:
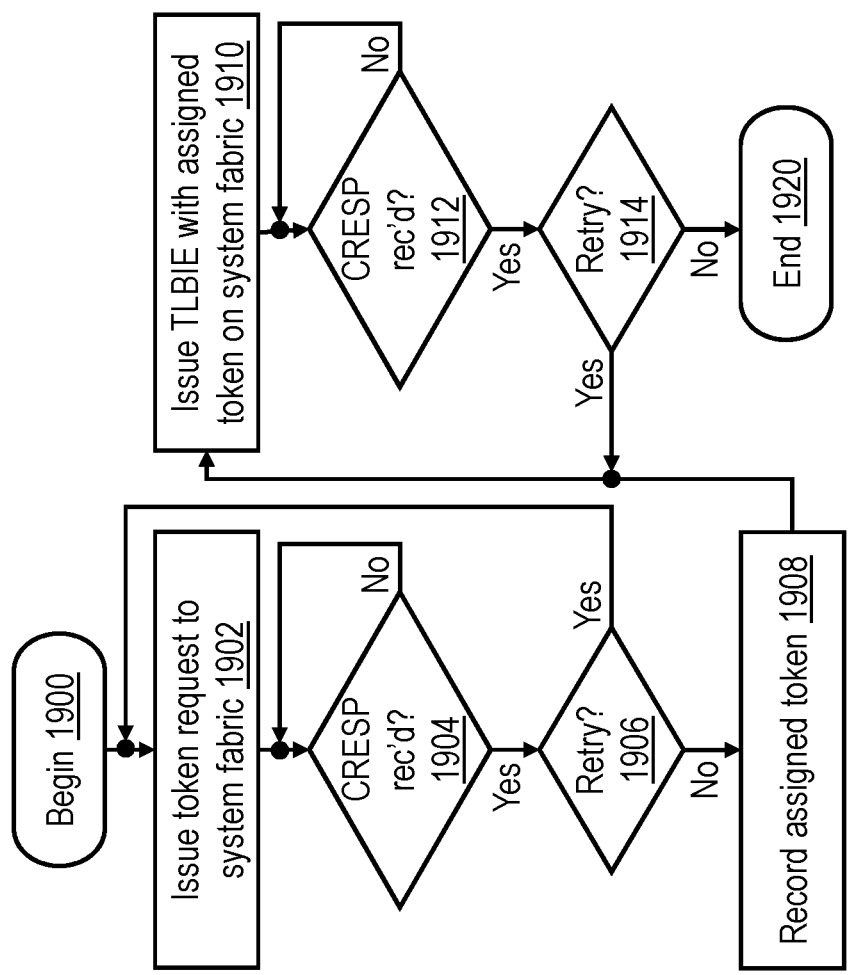
FIG. 19 is a high-level logical flowchart of an exemplary method by which an initiating processing unit issues a token request and a translation entry invalidation request in accordance with one embodiment.

With reference now to FIG. 19, there is a high-level logical flowchart of an exemplary method by which a master processing node 104 issues a token request and a translation entry invalidation (e.g., TLBIE) request in accordance with one embodiment. As noted above, the illustrated process is initiated at block 606 of FIG. 6.

The process of FIG. 19 begins at block 1900 and then proceeds to block 1902, which illustrates a sidecar 324 for a given hardware thread of a processor core 200 issuing, on system fabric 1800, a token request requesting assignment by token manager 120 of a token for a TLBIE request. The sidecar 324 then monitors for receipt of the Cresp 1610 for the token request (block 1904). In response to receipt of the Cresp 1610 for the token request, sidecar 324 determines whether or not the Cresp 1610 indicates retry (block 1906). As indicated at blocks 2004 and 2010 of FIG. 20, the Cresp 1610 will indicate retry if token manager 120 has no TTM 1804 available for handling the token request. As long as token manager 120 has a TTM 1804 available for handling the token request, Cresp 1610 will not indicate retry.

In response to a determination at block 1906 that the Cresp 1610 for the token request indicates retry, the process returns to block 1902 and following blocks, which have been described. If, however, sidecar 324 determines at block 1906 that the Cresp 1610 for the token request does not indicate retry (and thus indicates success), sidecar 324 extracts a token assigned by token manager 120 from the Cresp information field 1762 of Cresp 1610 and records the token (block 1908). The process then proceeds from block 1908 to block 1910, which depicts sidecar 324 issuing a TLBIE request (e.g., either a TLBIE_C or TLBIE_CIO request) on system fabric 1800, where the TLBIE request specifies the assigned token. For example, in the embodiment of FIG. 17A, the token can conveniently be specified in a token field 1704 implemented in the low-order bits of address field 1702, which are unused for TLBIE requests since TLBIE requests operate on logical memory pages having a minimum page size of, for example, 4 kB.

As indicated at block 1912, sidecar 324 then monitors for receipt of the Cresp 1610 for the TLBIE request issued at block 1910. In response to receipt of the Cresp 1610, the sidecar 324 determines at block 1914 whether the Cresp 1610 for the TLBIE request indicates retry. A TLBIE request will receive a Cresp 1610 indicating retry until all participating snoopers (e.g., L2 caches 230 for TLBIE_C requests and both L2 caches 230 and IOMMUs 210 for TLBIE_CIO requests) have been able to successfully allocate a state machine (i.e., TSN machine 346) to service the TLBIE request. In response to determining at block 1914 that the Cresp 1610 for the TLBIE request indicates retry, the process returns to block 1910 and following blocks, which illustrates sidecar 324 reissuing the TLBIE request on system fabric 1800. If, however, sidecar 324 determines at block 1914 that the Cresp 1610 for the TLBIE request does not indicate retry (and thus indicates success), the process of FIG. 19 ends at block 1920.

Figure 20:
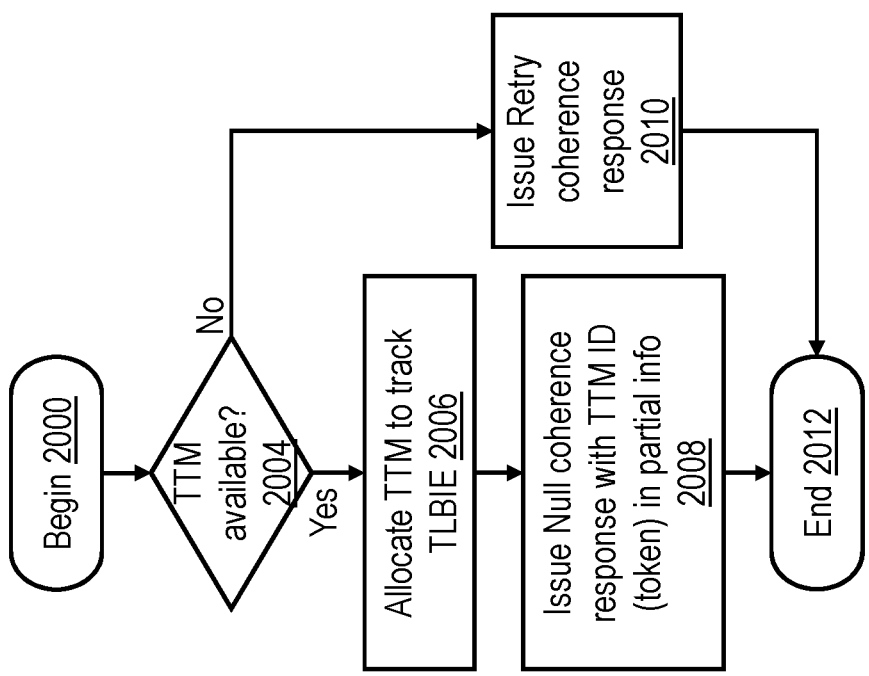
FIG. 20 is a high-level logical flowchart of an exemplary method by which a token manager responds to a token request in accordance with one embodiment.

Referring now to FIG. 20, there is depicted a high-level logical flowchart of an exemplary method by which a token manager 120 responds to a token request in accordance with one embodiment. The illustrated process is performed by token manager 120 for each token request received by token manager 120 via system fabric 1800.

The process of FIG. 20 begins at block 2000 in response to token manager 120 receiving a token request as issued on system fabric 1800 at block 1902 of FIG. 19. The process then proceeds to block 2004, which depicts dispatch logic 1802 determining whether or not a TTM 1804 is available for allocation to handle the token request. If not, dispatch logic 1802 provides a Presp indicating retry on system fabric 1800 (block 2010). The retry Presp will cause response logic 1622 to generate a Cresp indicating retry, which as discussed above with reference to block 1906 of FIG. 19 will cause the sidecar 324 to reissue the token request on system fabric 1800. If, however, dispatch logic 1802 determines at block 2004 that a TTM 1804 of token manager 120 is available for allocation to handle the token request, dispatch logic 1802 assigns the token request to an available TTM 1804, which will subsequently track a corresponding TLBIE request by the requesting sidecar 324 (block 2006). A TTM identifier (TTM ID) of the assigned TTM 1804 preferably serves as a token for the associated TLBIE request. In addition, at block 2008, dispatch logic 1802 provides a null Presp on system fabric 1800, which will allow the token request to successfully complete without a retry, as discussed above with reference to block 1906 of FIG. 19. Dispatch logic 1802 includes within the Presp information field 1752 of Presp the assigned token (which response logic 1622 preferably forwards to the requesting sidecar 324 in Cresp information field 1762). Following block 2008 or block 2010, the process of FIG. 20 ends at block 2012.

With reference now to FIG. 21, there is illustrated a high-level logical flowchart of an exemplary method by which a token manager 120 instructs participating snoopers to process a translation invalidation (e.g., TLBIE) request in accordance with one embodiment. The process of FIG. 21 begins at block 2100, for example, in response to allocation of a TTM 1804 at block 2006 of FIG. 20 and then proceeds to block 2102. Block 2102 illustrates the TTM 1804 of token manager 120 monitoring for receipt by token manager 120 of a TLBIE request specifying a token (in token field 1704) matching the TTM ID of the TTM 1804. In response to a determination at block 2102 that token manager 120 has snooped a TLBIE request specifying a token matching the TTM ID of TTM 1804, TTM 1804 records the tag 1720 of the TLBIE request (block 2104) and begins monitoring for a Cresp specifying a matching tag 1754 (block 2106). In response to receipt of a Cresp specifying a matching tag 1754, TTM 1804 determines whether or not the Cresp indicates retry in Cresp type field 1760 (block 2108). If so, TTM 1804 discards the tag recorded at block 2104, and the process returns to block 2102 and following blocks, which have been described.

If, however, TTM 1804 determines at block 2108 that the Cresp for the TLBIE request does not indicate retry (and thus indicates successful allocation of a state machine to handle the TLBIE request by each participating snooper), TTM 1804 issues on system fabric 1800 a TLBIE_Set request specifying its TTM ID (i.e., the token) in order to signal the participating snoopers to initiate processing of the TLBIE request (block 2110). Following issuance of the TLBIE_Set request, TTM 1804 monitors for receipt of the corresponding Cresp (block 2112). In response to receipt of the Cresp for the TLBIE_Set request, token manager 120 releases TTM 1804 for reallocation (block 2114), and the process of FIG. 21 ends at block 2116. It should be noted that the snooping of the TLBIE_Set request is non-blocking and therefore cannot be retried. Consequently, it is sufficient for the TTM 1804 to monitor for receipt of the Cresp of the TLBIE_Set request and need not determine the type of the Cresp.

With reference now to FIG. 22, there is illustrated a high-level logical flowchart of an exemplary method by which a participating snooper (e.g., an IOMMU 210 or L2 cache 230) receives and processes a translation entry invalidation (e.g., TLBIE) request in accordance with one embodiment. The illustrated process is performed by each participating snooper for each snooped TLBIE request.

The process of FIG. 22 begins at block 2200 in response to the participating snooper snooping a TLBIE request and then proceeds to block 2202, which illustrates the participating snooper determining whether or not the TLBIE request is the same request as one currently being processed by the state machine (e.g., TSN machine 346) identified by the token field 1704 specified in the TLBIE request. In response to an affirmative determination at block 2202, the process passes to block 2310, which depicts the participating snooper issuing a null Presp for the TLBIE request. Thereafter, the process of FIG. 22 ends at block 2218.

Returning to block 2202, in response to the participating snooper making a negative determination, the participating snooper additionally determines at block 2204 whether or not the TSN machine 346 identified by token field 1704 of the TLBIE request is currently in a TLBIE_active state, indicating that the TSN machine 346 is still working on a previous TLBIE request assigned the same token. In response to an affirmative determination at block 2204, the process passes to block 2212, which depicts the participating snooper issuing a retry Presp for the TLBIE request, which will cause a retry Cresp to be generated and the initiating sidecar 324 to reissue the TLBIE request, as described above with reference to blocks 1910-1914 of FIG. 19. Thereafter, the process of FIG. 22 ends at block 2218.

Referring again to block 2204, in response to a determination that the specified TSN machine 346 is not in a TLBIE_active state, the participating snooper issues a null Presp (block 2206), assigns the TLBIE request to the TSN machine 346 specified by the token, and marks the TLBIE request as incomplete (block 2208). The participating snooper than monitors for receipt from token manager 120 of a TLBIE_Set request (see, e.g., FIG. 21, block 2110) including the token associated with the specified TSN machine 346 (block 2214). In response to receipt of a TLBIE_Set request including the token associated with the specified TSN machine 346, the participating snooper marks the TLBIE request assigned to the specified TSN machine 346 as complete (block 2216). Marking the TLBIE request as complete initiates processing of the TLBIE request by the TSN machine 346 as described above with reference to blocks 702-704 of FIGS. 7 and 15. Thereafter, the process of FIG. 22 ends at block 2218.

In the foregoing discussion, it has been tacitly assumed that the broadcast of multicast requests that must be handled by all participating snoopers have a global or systemwide scope encompassing all processing nodes 104 of data processing system 100. This design can provide satisfactory system performance for data processing systems of smaller scale. However, as broadcast-based systems scale in size, traffic volume on the system fabric multiplies, meaning that system cost rises sharply with system scale as more bandwidth is required for communication over the system fabric. That is, a system with X processor cores, each having an average traffic volume of Y transactions, has a traffic volume of X×Y, meaning that traffic volume in broadcast-based systems scales multiplicatively rather than additively. Beyond the requirement for substantially greater interconnect bandwidth, an increase in system scale has the secondary effect of increasing request latencies. For example, the latency of a TLBIE operation is limited, in the worst case, by the latency associated with the slowest participating snooper throughout the entire data processing system providing a null Presp signifying its acceptance of a multicast TLBIE request on the system fabric.

In order to reduce traffic volume on the system fabric while still appropriately handling multicast requests such as TLBIE requests, preferred embodiments implement multiple different broadcast scopes for multicast requests. These broadcast scopes can conveniently be (but are not required to be) defined based on the boundaries between various processing nodes 104. For the purposes of the explaining exemplary operation of data processing system 100, it will hereafter be assumed that various broadcast scopes have boundaries defined by sets of one or more processing nodes 104.

Figure 23:
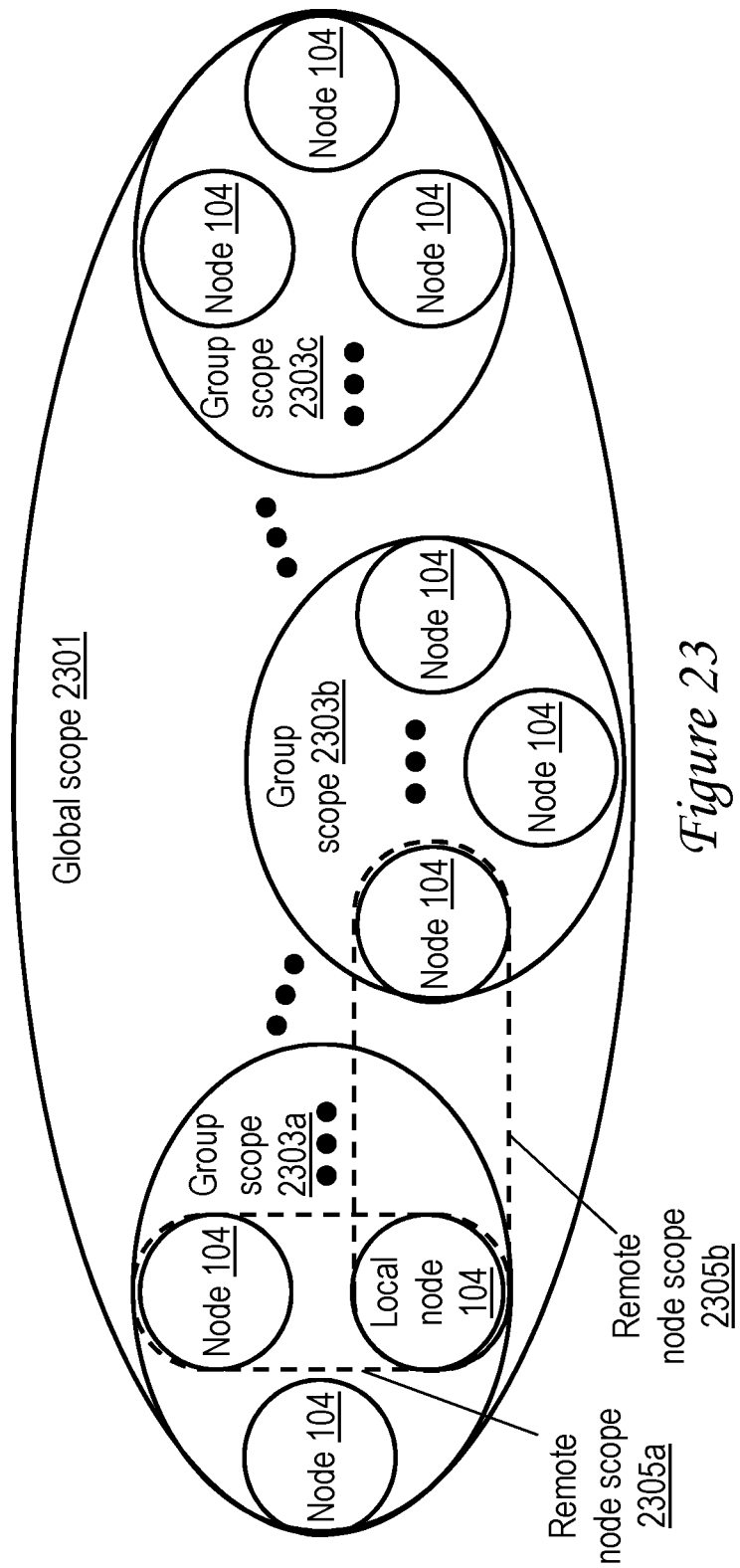
FIG. 23 is a block diagram illustrating various scopes of broadcast of a request within a data processing system in accordance with one embodiment.

As shown in FIG. 23, a basic implementation may include only two broadcast scopes: a "local" scope including only the single processing node 104 containing the initiating master and a "global" scope 2301 including all of the processing nodes 104 within data processing system 100. Of course, one or more supersets of the local scope can be defined between the local scope and the global scope. For example, FIG. 23 illustrates an embodiment in which data processing system 100 implements a plurality of processing groups 102, where an operation broadcast from a master in one processing group 102 to all processing nodes 104 within the processing group 102 defines an operation of "group" scope (e.g., one of group scopes 2303a, 2305b or 2303c). In some embodiments, the possible broadcast scopes for a multicast operation additionally include a "remote node" scope, which is defined to include the local processing node 104 containing the initiating master and one or more other remote processing nodes 104, while excluding at least one other peer processing node 104. For example, FIG. 23 depicts remote node scopes 2305a and 2305b. Those skilled in the art will appreciate that a wide variety of other broadcast scopes can be defined and implemented.

In at least some embodiments, the scope of a multicast operation can be indicated within an interconnect operation by a scope indicator (signal). Based on these scope indicators, fabric controllers 216 within processing units 104 can determine whether or not to forward operations between local interconnect 114 and system interconnect 110.

Those skilled in the art will appreciate that, in the prior art, some data processing systems have been constructed to limit the scope of broadcast of certain types of memory access requests, such as Read, RWITM, and DClaim requests, for example, based on coherence state information indicating or implying the location(s) in the data processing system where the relevant data are stored and/or cached. However, in the prior art, a data processing system generally does not provide support for restricting the scope of broadcast of multicast requests, such as TLBIE requests, to less than a global or systemwide scope because a conventional data processing system does not track the location(s) in the data processing system where LPARs execute (and may therefore have address translations buffered). Consequently, conventional techniques that rely on cache coherence state information to narrow broadcast scope cannot be applied to TLBIE requests.

The present application appreciates that it would be useful and desirable to restrict the broadcast of at least some multicast requests to less than a global or systemwide scope based on LPAR information identifying the processing node(s) relevant to the multicast requests. For example, for TLBIE requests, the LPAR information indicates the processing node(s) on which various LPARs may have established address translations, either within translation structures 212 of IOMMUs 210 or within translation structure(s) 310 of processor cores 200. By using this LPAR information to reduce the broadcast scope of TLBIE requests to only the relevant processing nodes 104, a data processing system 100 may advantageously reduce the latency of TLBIE requests by reducing the number of retries to which TLBIE requests are subject prior to achieving acceptance by all participating snoopers. Reducing the broadcast scope of TLBIE also reduces the utilization of system interconnect(s) 110, which tend to be more thinly provisioned than local interconnects 114, thus reserving the bandwidth of system interconnect(s) 110 for other traffic. Thus, in accordance with one aspect of the disclosed embodiments, TLBIE_C, TLBIE_CIO, and TLBIE_IOMMU requests as previously described, for example, in Table I and at block 606 of FIG. 6 and block 1910 of FIG. 19, are preferably broadcast by the master to only those processing nodes 104 of data processing system 100 in which the relevant LPAR may have established address translations, either within translation structures 212 of IOMMUs 210 or within translation structure(s) 310 of processor cores 200. The master selects the relevant processing nodes 104 for the broadcast of a TLBIE_C, TLBIE_CIO, or TLBIE_IOMMU request based on LPAR information maintained in the local LPAR register set 360 and in-memory LPAR data structures 224, as discussed further below with reference to FIGS. 25-26.

Referring now to FIG. 24, there is depicted an exemplary instruction sequence 2400 for enabling and disabling logical partitions (LPARs) for a given hardware thread of a processor core 200 in accordance with one embodiment. Instruction sequence 2400 can be executed in a hardware thread of a processor core 200 within any of processing units 104.

Instruction sequence 2400 includes a TTrack_Enable function call 2404 that loads LPAR register set 360 and LPAR data structures 224 with the LPAR information utilized to selectively restrict the broadcast scope of TLBIE requests for the LPAR identified by a LPID parameter of the function call. Thereafter, the processor core executes LPAR code 2408 (i.e., the workload of the LPAR) within the LPAR.

Following LPAR code 2408, instruction sequence 2400 includes a TTrack_Disable function call 2410 that disables tracking of the broadcast scope for the LPAR executing on the given hardware thread. Exemplary instruction sequence 2400 then includes another TTrack_Enable function call 2412 that loads the local LPAR register set 360 and LPAR data structures 224 with the LPAR information utilized to selectively restrict the broadcast scope of TLBIE requests for a next LPAR to be executed on the hardware thread.

Figure 25:
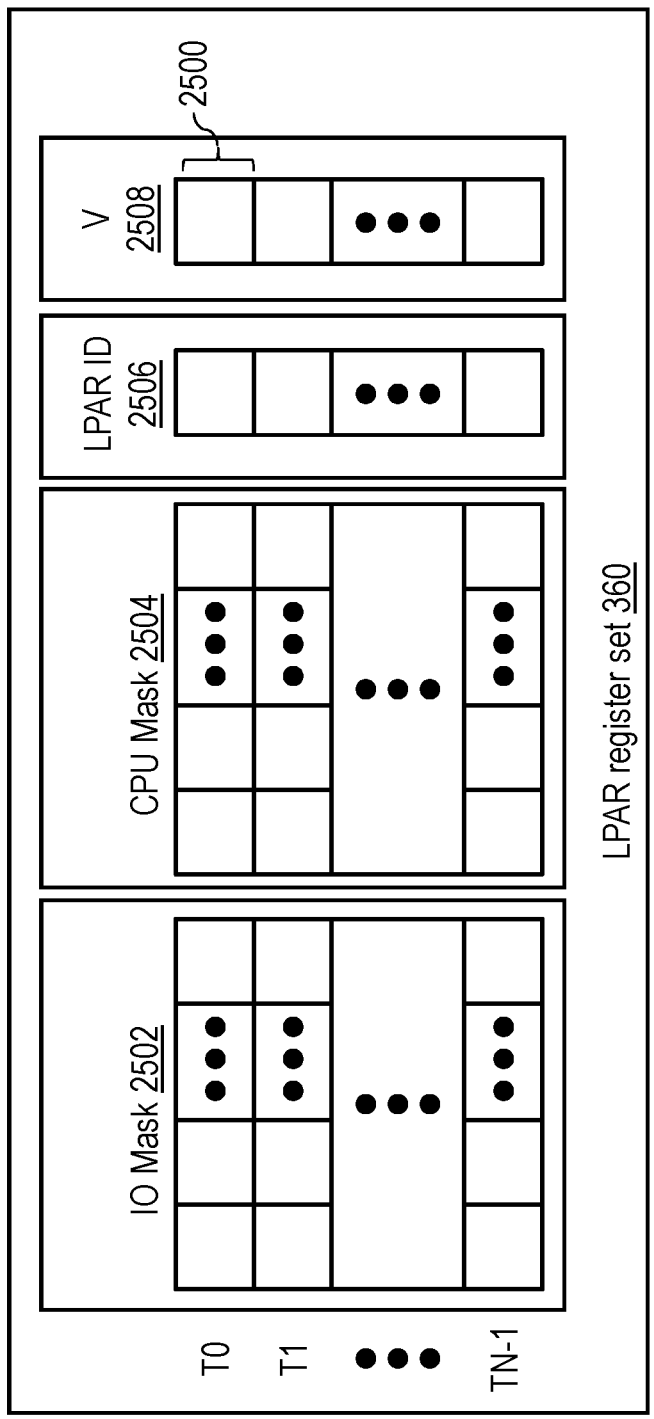
FIG. 25 illustrates exemplary LPAR registers for buffering scope information of LPARs in a processor core in accordance with one embodiment.

Referring now to FIG. 25, there is depicted an exemplary embodiment of a LPAR register set 360 in accordance with one embodiment. In this example, LPAR register set 360 includes N registers 2500, each associated with a respective one of the N simultaneous hardware threads in the associated processor core 200. Each register 2500 includes an IO mask field 2502, a CPU mask field 2504, a LPAR ID field 2506, and valid field 2508. Valid field 2508 is hereafter assumed to be a single bit, which is set (e.g., to b'1') to indicate that the contents of its register 2500 is valid and is reset (e.g., to b'0') otherwise. LPAR ID field 2506 specifies the LPID of the LPAR, if any, executing on the relevant hardware thread of the associated processor core 200. IO mask field 2502 includes a plurality of bits, where each such bit is associated with a respective one of the processing nodes 104 of data processing system 100. Each bit that is set within IO mask field 2502 thus identifies a processing node 104 containing an IOMMU 210 in which translation structure(s) 212 may store one or more translation entries for the LPAR identified by LPAR ID field 2506. CPU mask field 2504 is organized similarly to IO mask field 2502, with each bit representing a respective one of the processing nodes 104 of data processing system 100. Each bit that is set within CPU mask 2504 identifies a processing node 104 containing a processor core 200 in which translation structure(s) 310 may store one or more translation entries for the LPAR identified by LPAR ID field 2506.

Figure 26:
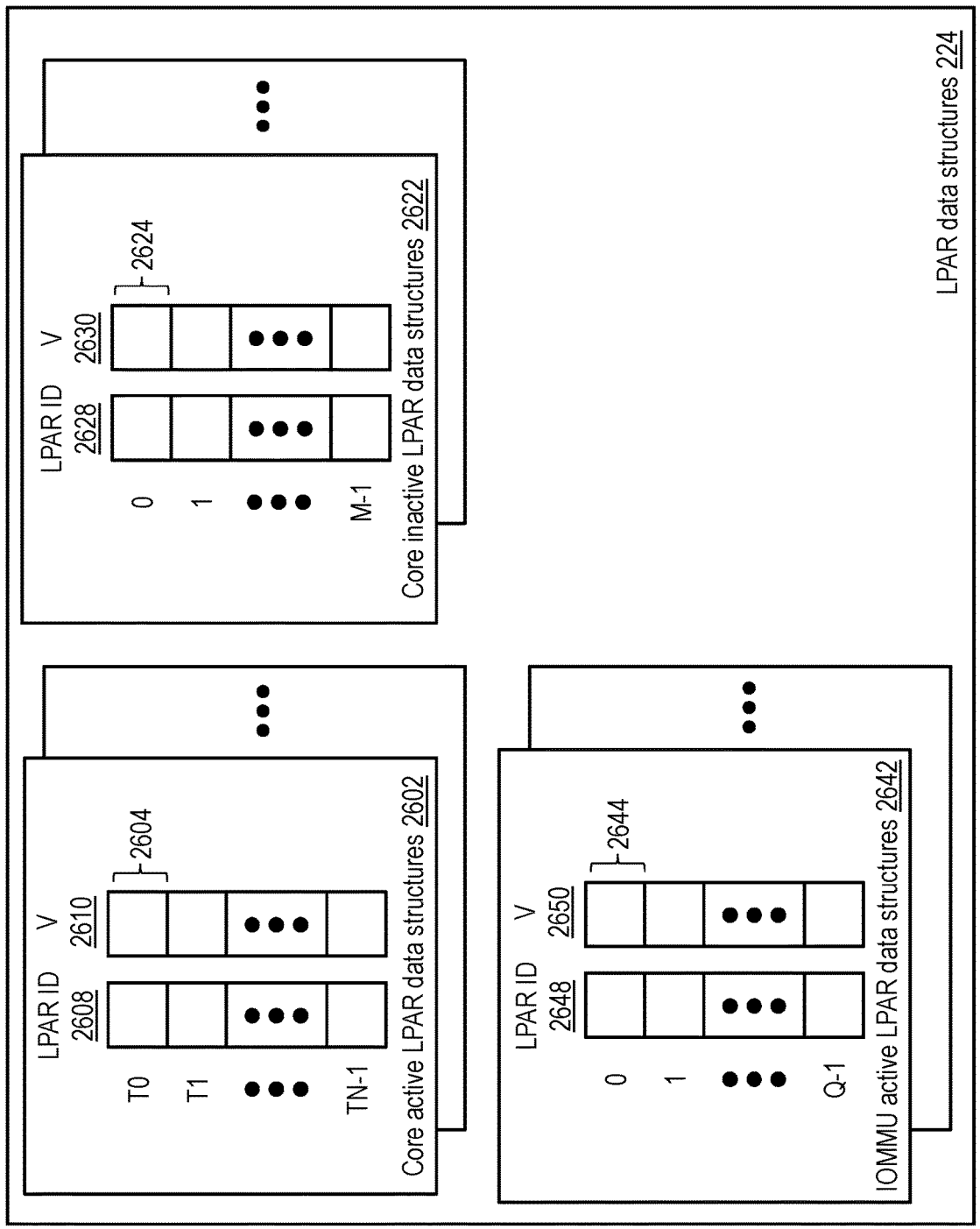
FIG. 26 is a block diagram of exemplary in-memory LPAR data structures in accordance with one embodiment.

Referring now to FIG. 26, there is depicted an exemplary embodiment of the in-memory LPAR data structures 224 of FIG. 2 in accordance with one embodiment. In the depicted embodiment, LPAR data structures 224 include a respective core active LPAR data structure 2602 for each processor core 200 in data processing system 100. Each core active LPAR data structure 2602 tracks, for a respective processor core 200, the processing nodes 104 to be included in the broadcast scopes of TLBIE_C and TLBIE_CIO requests for active LPARs executing on the hardware threads of the respective processor core 200. In the depicted example, each core active LPAR data structure 2602 includes N rows or entries 2604, each associated with one of the N simultaneous hardware threads in the associated processor core 200. Each of the N rows 2604 includes a LPAR ID field 2608 specifying the LPID of the LPAR, if any, executing on the associated hardware thread and a valid field 2610 indicating whether or not the content of its row 2604 is valid.

LPAR data structures 224 also include a respective core inactive LPAR data structure 2622 for each processor core 200 in data processing system 100. Each core inactive LPAR data structure 2622 tracks, for a respective processor core 200, the processing nodes 104 included within the broadcast scopes of TLBIE_C and TLBIE_CIO requests of previously executed LPARs that may have remaining entries in translation structure(s) 310 of processor cores 200. In the depicted example, each core inactive LPAR data structures 2622 includes M rows or entries 2624, each including a LPAR ID field 2628 for specifying the LPID of a LPAR not currently executing on the associated processor core 200 and a valid field 2630 indicating whether or not the content of its row 2624 is valid. M, the number of entries 2624 in core inactive LPAR data structures 2622, is independent of, and in many implementations much greater than, N, which is the number of entries 2604 in core active LPAR data structures 2602. Core inactive LPAR data structures 2622 enable a given LPAR context that was recently active on a hardware thread within a given processor core 200 to be quickly restored to active execution on the given processor core 200. For example, it is often the case that an LPAR running a particular hardware thread is briefly preempted by an operating system or hypervisor thread and then restored to execution on the particular hardware thread. Without core inactive LPAR data structures 2622, the translation entries within translation structure(s) 310 would have to be evicted in response to preemption of the LPAR and then slowly reloaded into translation structure(s) 310 by accesses to the relevant LPAR PFT 220 following restoration of the LPAR on the hardware thread. Implementing core inactive LPAR data structures 2622 allows the translation entries of the LPAR to remain in translation structure(s) 310 for some period of time following preemption in case the LPAR is restored to execution.

LPAR data structures 224 additionally includes a plurality of IOMMU active LPAR data structures 2642, where each such data structure is associated with a respective one of the IOMMUs 210 in data processing system 100. For ease of explanation, it is hereafter assumed that each processing node 104 contains a single respective IOMMU 210. In this example, each IOMMU active LPAR data structure 2642 includes Q entries 2644, each corresponding to a respective one of Q hardware threads that may execute a LPAR authorized to utilize the address translation services of the associated IOMMU 210. Q, the number of entries 2644 in IOMMU active LPAR data structures 2644, is independent of, and in many implementations much greater than M and N (i.e., the sizes of core active LPAR data structures 2602 and core inactive LPAR data structures 2622) because a large number of LPARs may share the IO devices supported by a given IOMMU 210. Each entry 2644 includes a LPAR ID field 2648 for specifying the LPID of a LPAR and a valid field 2650 indicating whether or not the content of its row 2644 is valid. Those skilled in the art will appreciate that while the allocation of I/O devices supported by IOMMUs 210 to the various LPARs can change, the rate at which such changes are made is typically significantly slower than the rate at which LPAR assignments to core hardware threads change. Consequently, while LPAR data structures 224 could include an additional data structure to track IOMMU assignments of inactive LPARs, such a data structure is not typically necessary or useful.

Figure 27A:
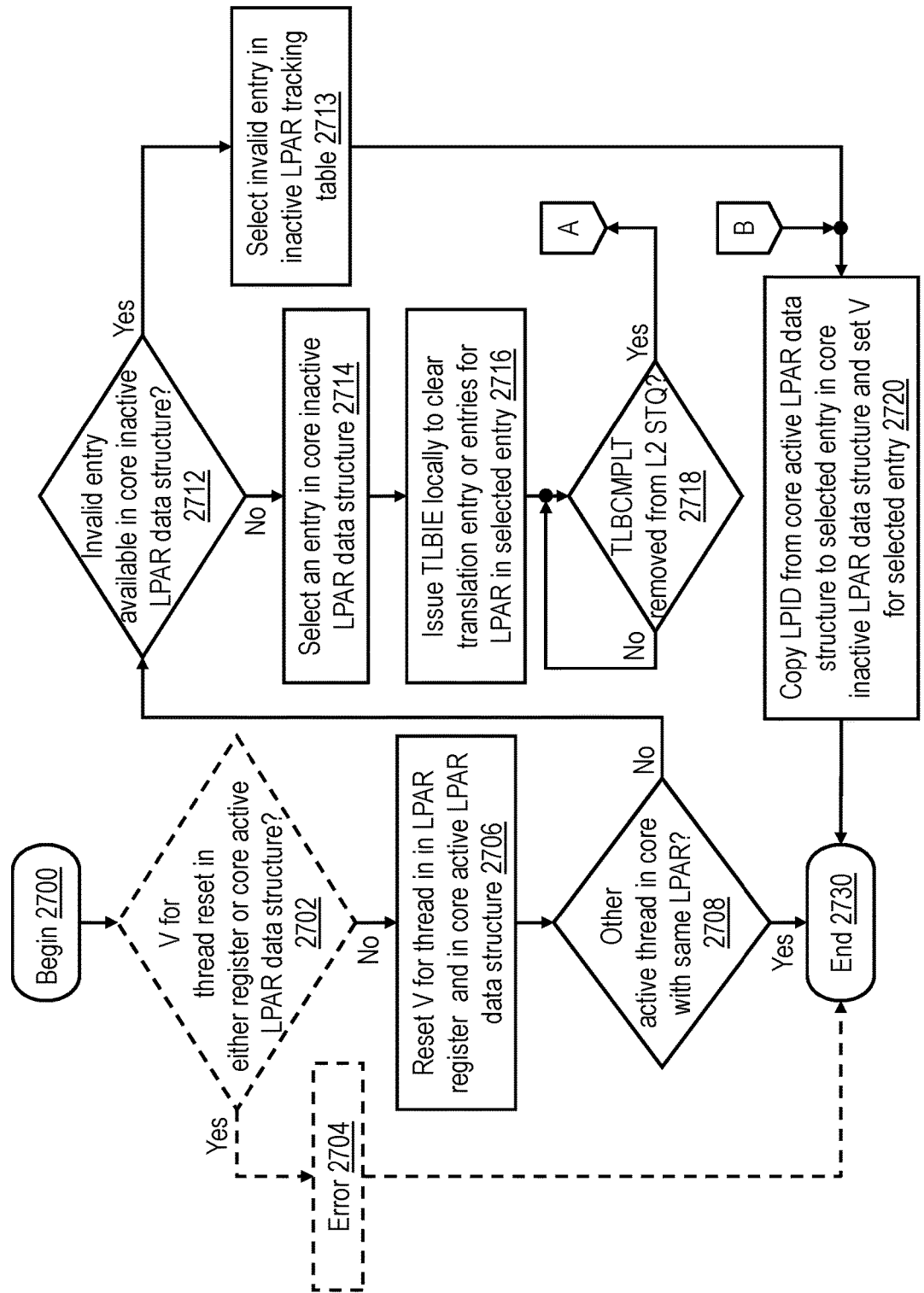
FIGS. 27A-27B together form a high-level logical flowchart of an exemplary method by which a processor core disables execution of a LPAR on a hardware thread in accordance with one embodiment.
Figure 27B:
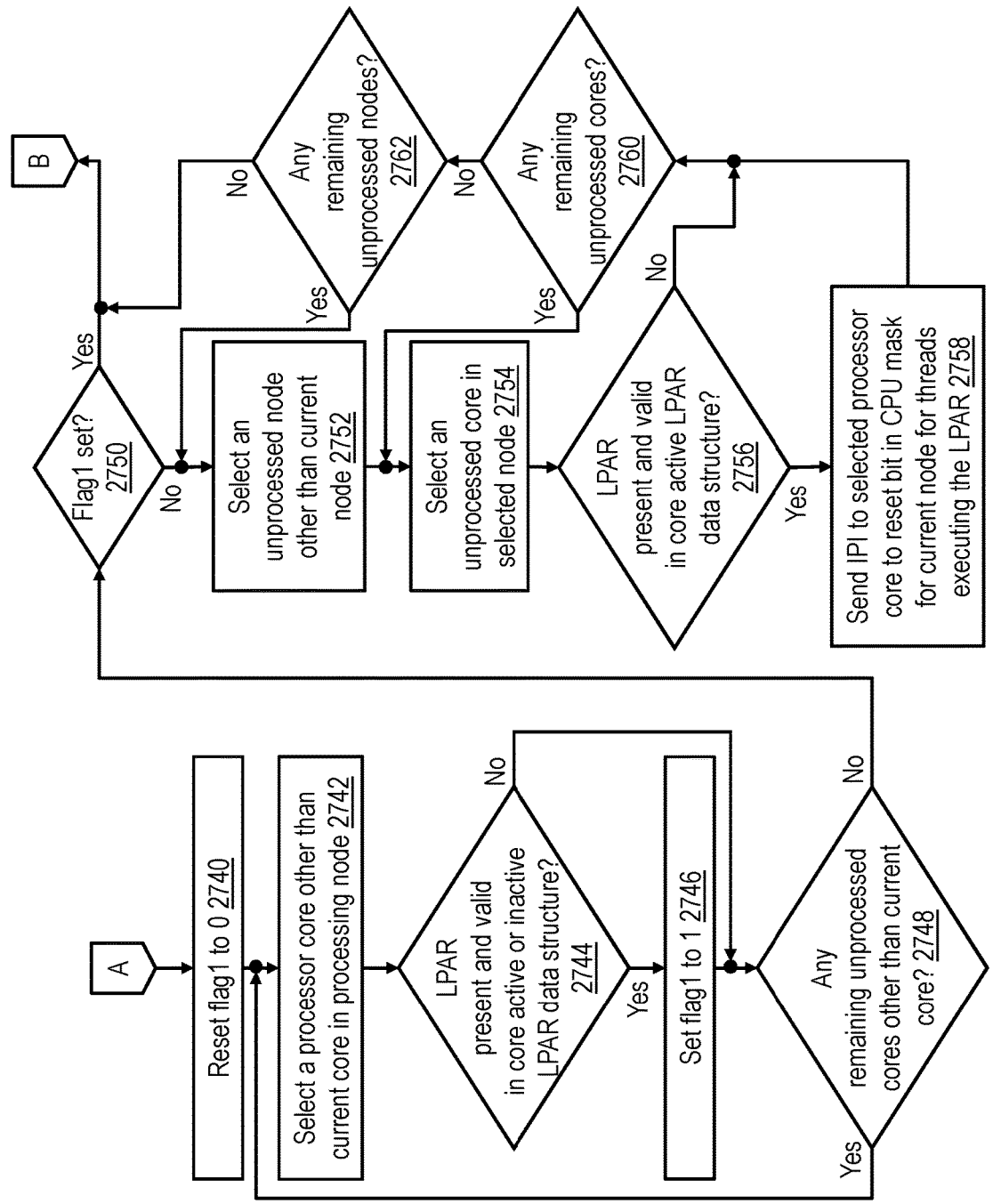

With reference now to FIGS. 27A-27B, there is illustrated a high-level logical flowchart of an exemplary method by which a processor core 200 disables execution of a LPAR on a hardware thread, for example, in response to a TTrack_Disable( ) function call, in accordance with one embodiment The process begins at block 2700 of FIG. 27A and then proceeds to block 2702, which illustrates the initiating hardware thread of a processor core 200 optionally determining whether or not the valid field 2508 of the LPAR register 2500 or the valid field 2610 of the relevant core active LPAR data structure 2602 for the initiating hardware thread is reset, indicating that tracking of broadcast scope is already disabled for the initiating hardware thread. In response to an affirmative determination at block 2702, the initiating hardware thread signals an error (block 2704), and the process ends at block 2730. In response to a negative determination at optional block 2702 or if optional block 2702 is omitted, the initiating hardware thread resets the valid field 2508 in the LPAR register 2500 and the valid field 2610 in core active LPAR data structure 2602 for the relevant processor core 200 and thread (block 2706). The initiating hardware thread additionally determines by reference to LPAR register set 360 whether or not another hardware thread of the same processor core 200 is executing the same LPAR as the initiating hardware thread (block 2708). In response to an affirmative determination at block 2708, then no update to core inactive LPAR data structure 2622 is made based on disabling of the specified LPAR, and process ends at block 2730. Thus, if a determination is made that another hardware thread of the same processor core 200 is executing the same LPAR, it is known that the processing node 104 containing the processor core 200 is already being tracked by other processing nodes 104, and no update to LPAR data structures 224 is required. If, however, the initiating hardware thread determines at block 2708 that no other hardware thread of the initiating processor core 200 is currently executing the same LPAR as the initiating hardware thread, the process proceeds to block 2712.

Block 2712 depicts the initiating hardware thread determining whether or not any of the M entries 2624 in the core inactive LPAR data structure 2622 for the relevant processor core 200 is marked (in valid field 2630) as invalid and thus available for allocation. In response to an affirmative determination at block 2712, the initiating hardware thread selects an invalid entry 2624 in the relevant core inactive LPAR data structure 2622 (block 2713), and the process proceeds to block 2720, which is described below. If, however, the initiating hardware thread determines at block 2712 that the relevant core inactive LPAR data structure 2622 does not contain any invalid entry 2624, the initiating hardware thread selects a valid entry 2624 in inactive LPAR tracking table 2620 for eviction and reuse, for example, based on recency of use (block 2714). In addition, the initiating hardware thread issues a local-only TLBIE request to cause the invalidation, within its processor core 200, of any translation entries in translation structure(s) 310 for the LPAR tracked by the entry 2624 selected for eviction and reuse (block 2716). The processing of the TLBIE request within the associated processor core 200 is described above with reference to FIG. 9. When the processor core 200 completes processing of the TLBIE request, the processor core issues a TLBCMPLT request back to its associated L2 cache 230 (see, e.g., FIG. 9, block 910), and the L2 cache 230 processes the TLBCMPLT request as described with reference to FIG. 10. It should be noted that the determination made at block 1008 of FIG. 10 for the TLBCMPLT request associated with LPAR-wide TLBIE requests is always negative, meaning that following issuance of the TLBCMPLT_ACK at block 1006, the TLBCMPLT request is removed from L2 STQ 320 at block 1014. The hardware thread handling the TTrack_Disable( ) function call monitors for the removal of the TLBCMPLT request from L2 STQ 320 at block 2718 of FIG. 27A. In response to detecting the removal of the TLBCMPLT request from L2 STQ 320, the process of FIG. 27A proceeds through page connector A to block 2740 of FIG. 27B, which is described below.

Block 2720 illustrates the initiating hardware thread copying the LPID from the entry 2604 for the initiating hardware thread in core active LPAR data structure 2602 into LPAR ID field 2628 of the entry 2624 selected at block 2713 or 2714 in the relevant core inactive LPAR data structure 2622 and setting the associated valid field 2630 to a valid state. Following block 2720, the process of FIG. 27A ends at block 2730.

Referring now to block 2740 of FIG. 27B, the initiating hardware thread initializes a temporary variable "flag1" to 0. The process then enters a loop including blocks 2742-2748 in which the initiating processing thread performs processing for each other processor core 200 in its processing node 104. In particular, at block 2742, the initiating hardware thread selects an unprocessed processor core 200 other than its own processor core 200 within its processing node 104. The initiating hardware thread then determines whether or not the LPID of the LPAR tracked in the entry of core inactive LPAR data structure 2622 selected at block 2714 has a matching valid entry in either core active LPAR data structure 2602 or core inactive LPAR data structure 2622 for the selected processor core 200 (block 2744). In response to a negative determination at block 2744, no update to flag1 is made, and the process passes to block 2748. If, however, an affirmative determination is made at block 2744, the initiating hardware thread sets flag1 (block 2746). At block 2748, the initiating hardware thread determines whether or not any processor core 200 of its processing node 104 other than its own processor core 200 remains to be processed. In response to an affirmative determination at block 2748, the process returns to block 2742, which has been described. In response to a negative determination at block 2748, the process proceeds to block 2750.

Block 2750 depicts the initiating hardware thread determining whether or not flag1 is set. An affirmative determination at block 2750 that flag1 is set means that another processor core 200 in the same processing node 104 as the initiating hardware thread is tracking the processing nodes 104 that may buffer address translations for the LPAR identified in the selected entry to be removed from the core inactive LPAR data structure 2622. As such, in response to an affirmative determination at block 2750, the process passes through page connector B to block 2720 of FIG. 27A. However, in response to a negative determination at block 2750, the process proceeds to block 2752.

At block 2752, the initiating hardware thread selects an unprocessed processing node 104 other than the processing node 104 containing the processor core 200 of the initiating hardware thread, and at block 2754 the initiating hardware thread selects an unprocessed processor core 200 of the selected processing node 104. The initiating hardware thread then determines whether or not the LPID of the LPAR tracked in the entry of core inactive LPAR data structure 2622 selected at block 2714 (referred to as the "tracked LPAR") has a valid entry in the core active LPAR data structure 2602 for the selected processor core 200 (block 2756). In response to a negative determination at block 2756, the process passes to block 2760, which is described below. If, however, an affirmative determination is made at block 2756, the initiating hardware thread issues an inter-processor interrupt (IPI) to the selected processor core 200 on the system fabric to cause the selected processor core 200 to reset, within any LPAR register 2500 specifying the LPID of the tracked LPAR, the bit of the CPU mask 2504 for the processing node 104 of the initiating hardware thread (block 2758). The initiating hardware thread then determines at block 2760 whether or not any processor core 200 of the currently selected processing node 104 remains to be processed. In response to an affirmative determination at block 2760, the process returns to block 2754, which has been described. In response to a negative determination at block 2760, the initiating hardware thread additionally determines at block 2762 whether or not any processing nodes 104 of data processing system 100 remain to be processed. If so, the process returns to block 2752 and following blocks, which have been described; if not, the process passes through page connector B to block 2720 of FIG. 27A.

Figure 28A:
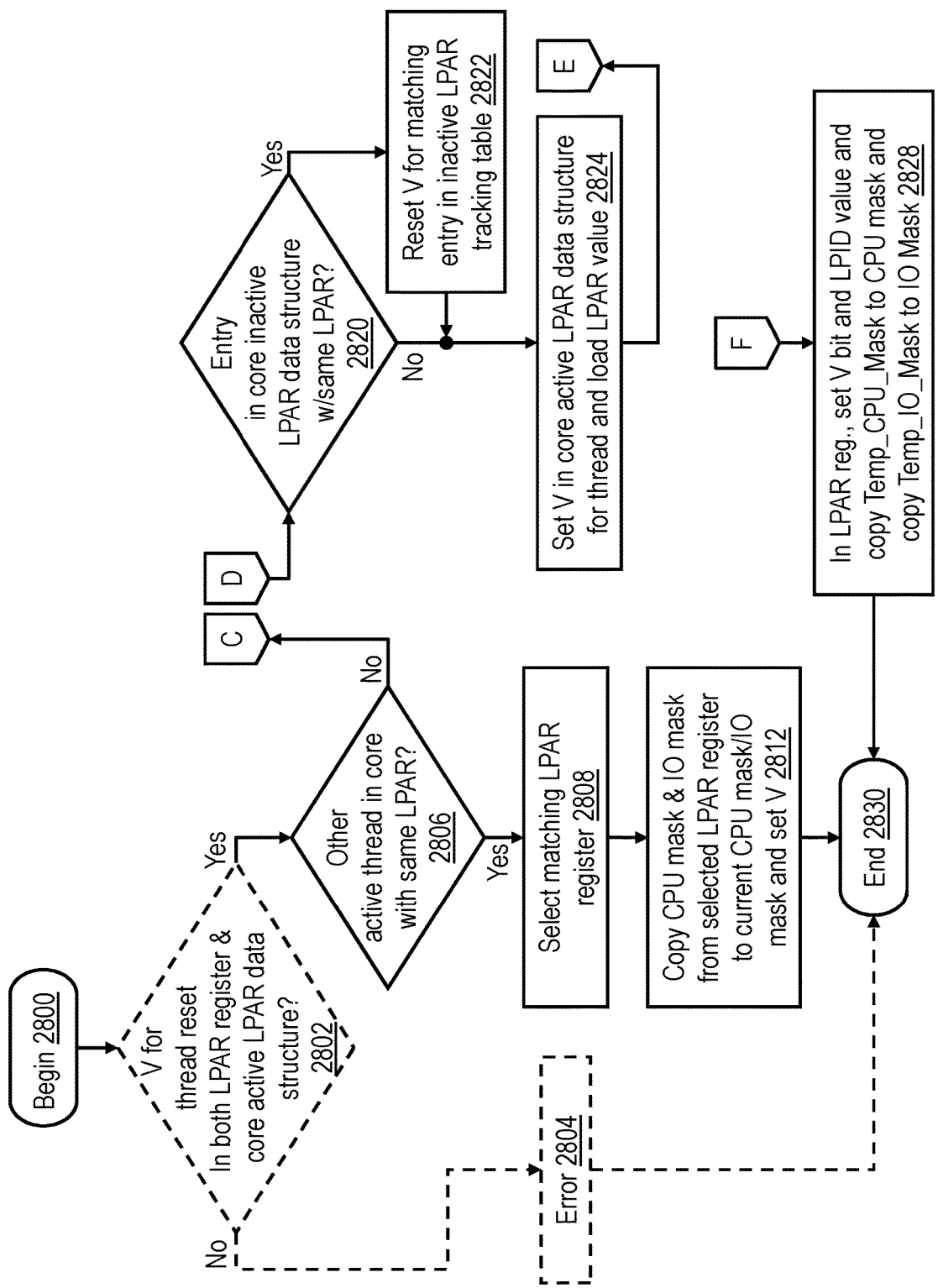
FIGS. 28A-28C together form a high-level logical flowchart of an exemplary method by which a processor core enables execution of a LPAR on a hardware thread in accordance with one embodiment.
Figure 28B:
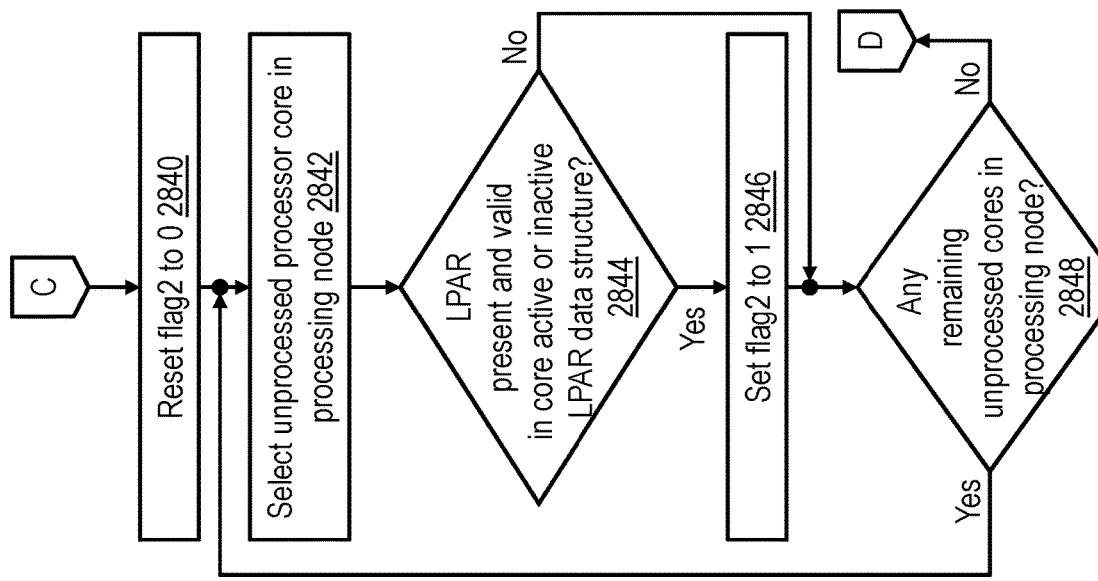

Referring now to FIGS. 28A-28B, there is depicted a high-level logical flowchart of an exemplary method a processor core enables execution of a LPAR on a hardware thread, for example, in response to a TTrack_Enable(lpid) function call, in accordance with one embodiment. The process begins at block 2800 of FIG. 28A and then proceeds to block 2802, which illustrates the initiating hardware thread of a processor core 200 optionally determining whether or not both the valid field 2508 of the LPAR register 2500 and the valid field 2610 of the relevant core active LPAR data structure 2602 for the initiating hardware thread are reset, indicating that tracking of broadcast scope is disabled for the initiating hardware thread. In response to a negative determination at block 2802, the initiating hardware thread signals an error (block 2804), and the process ends at block 2830. In response to an affirmative determination at optional block 2802 or if optional block 2802 is omitted, the initiating hardware thread determines by reference to LPAR register set 360 whether or not another hardware thread of the same processor core 200 is executing the same LPAR as the initiating hardware thread (block 2806). In response to a negative determination at block 2806, the process proceeds through page connector C to block 2840 of FIG. 28B, which is described below. If, however, the initiating hardware thread determines at block 2806 that another hardware thread of the processor core 200 of the initiating hardware thread is currently executing the same LPAR as the initiating hardware thread, the process proceeds to block 2808, which illustrates the initiating hardware thread selecting a LPAR register 2500 in LPAR register set 360 of another hardware thread executing the same LPAR.

The process proceeds from block 2808 to block 2812, which illustrates the initiating hardware thread copying the CPU mask and IO mask from the LPAR register 2500 selected at block 2808 into the CPU mask field 2604 and IO mask field 2502, respectively, of the LPAR register 2500 of the initiating hardware thread (block 2812). In addition, at block 2812, the initiating hardware thread sets the valid field 2508 of the LPAR register 2500 of the initiating hardware thread. The process then ends at block 2830.

Referring now to block 2840 of FIG. 28B, the initiating hardware thread initializing a temporary variable "flag2" to 0. The process then enters a loop including blocks 2842-2848 in which the initiating processing thread performs processing for each other processor core 200 in its processing node 104. In particular, at block 2842, the initiating hardware thread selects an unprocessed processor core 200 other than its own processor core 200 within its processing node 104. The initiating hardware thread then determines whether or not the LPID of the LPAR to be enabled has a valid entry in either core active LPAR data structure 2602 or core inactive LPAR data structure 2622 for the selected processor core 200 (block 2844). In response to a negative determination at block 2844, no update to flag2 is made, and the process passes to block 2848. If, however, an affirmative determination is made at block 2844, the initiating hardware thread sets flag2 (block 2846). At block 2848, the initiating hardware thread determines whether or not any processor core 200 of its processing node 104 other than its own processor core 200 remains to be processed. In response to an affirmative determination at block 2848, the process returns to block 2842, which has been described. In response to a negative determination at block 2848, the process proceeds through page connector D to block 2820 of FIG. 28A.

Block 2820 depicts the initiating hardware thread determining whether or not any valid entry 2624 in the core inactive LPAR data structure 2622 of the processor core 200 of the initiating hardware thread is tracking the broadcast scope of the LPAR to be enabled. In response to a negative determination at block 2820, the process passes to block 2824, which is described below. In response to an affirmative determination at block 2820, the initiating hardware thread resets the valid field 2630 of the entry 2624 of core inactive LPAR data structure 2622 identified at block 2820 (block 2822), and the process passes to block 2824. Block 2824 illustrates the initiating hardware thread setting the valid field 2610 for its entry 2604 within the core active LPAR data structure 2602 of its processor core 200. The process then passes through page connector E to block 2850 of FIG. 28C.

Figure 28C:
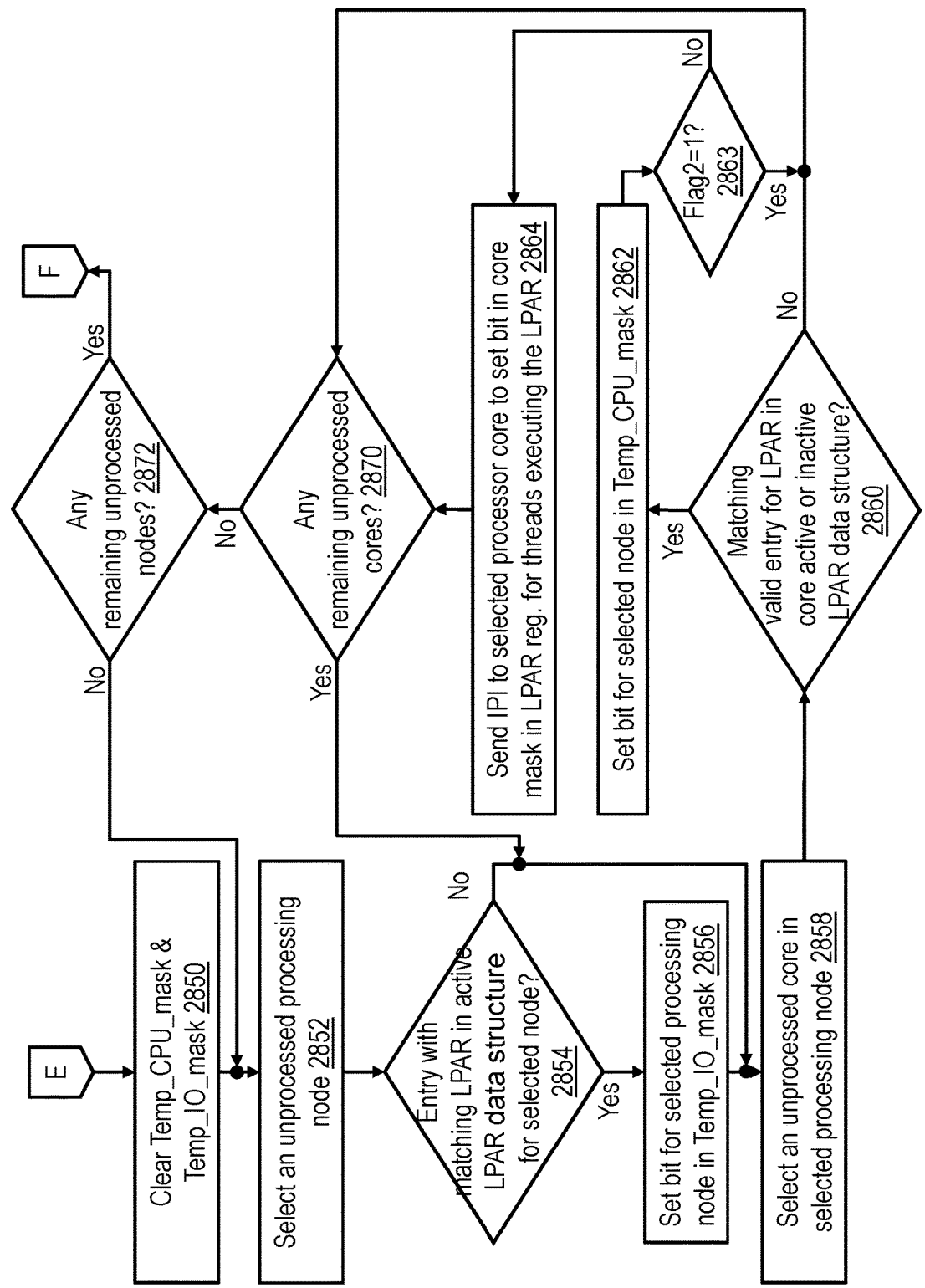

FIG. 28C depicts the initiating hardware thread building up the CPU mask field 2504 and IO mask field 2502 for its LPAR register 2500. At block 2850, the initiating hardware thread clears in-memory variables Temp_CPU_mask and Temp_IO_mask, which are utilized to accumulate the values for CPU mask field 2504 and IO mask field 2502, respectively. The initiating hardware thread then enters nested processing loops in which each processor core and each processing node of data processing system 100 is processed. This processing begins at block 2852, which illustrates the initiating hardware thread selecting an unprocessed processing node 104 of data processing system 100. The initiating hardware thread determines at block 2854 whether or not any entry 2644 in the IOMMU active LPAR data structure 2642 for the selected processing node 104 specifies, within LPAR ID field 2648, the LPID of the LPAR to be enabled. If not, the process passes to block 2858, which is described below. If, however, the initiating hardware thread makes an affirmative determination at block 2854, the initiating hardware thread sets the bit corresponding to the selected processing node in Temp_IO_mask (block 2856).

The initiating hardware thread then selects an unprocessed processor core 200 within the selected processing node 104 (block 2858) and determines whether or not any valid entry 2604 of the core active LPAR data structure 2602 or core inactive LPAR data structure 2622 for the selected processor core 200 specifies, within LPAR ID field 2608 or 2628, the LPID of the LPAR to be enabled. In response to a negative determination at block 2860, the process passes to block 2970, which is described below. In response to an affirmative determination at block 2860, the initiating hardware thread sets the bit corresponding to the selected processing node in Temp_CPU_mask (block 2862). At block 2863, the initiating hardware thread determines whether or not flag2 is set, as discussed above with reference to block 2846 of FIG. 28B. In response to an affirmative determination at block 2863, which indicates that the broadcast scope for the LPAR to be enabled is being tracked by the selected processor core 200, the process passes to block 2870, which is described below. In response to a negative determination at block 2863, the initiating hardware thread issues an inter-processor interrupt (IPI) to the selected processor core 200 on the system fabric to cause the selected processor core 200 to set, within any LPAR register 2500 specifying the LPID of the LPAR to be enabled, the bit of the CPU mask 2504 for the processing node 104 of the initiating hardware thread (block 2864). The initiating hardware thread then determines at block 2870 whether or not any processor core 200 of the currently selected processing node 104 remains to be processed. In response to an affirmative determination at block 2870, the process returns to block 2858, which has been described. In response to a negative determination at block 2870, the initiating hardware thread additionally determines at block 2872 whether or not any processing node 104 of data processing system 100 remains to be processed. If so, the process returns to block 2852 and following blocks, which have been described; if not, the process passes through page connector F to block 2828 of FIG. 28A.

Block 2828 depicts the initiating hardware thread setting the valid field 2508 and LPAR ID field 2506 of the LPAR register 2500 for the initiating hardware thread. In addition, the initiating hardware thread copies the Temp_CPU_mask and Temp_IO_mask into the CPU mask field 2504 and IO mask field 2502, respectively, of the LPAR register 2500 for the initiating hardware thread. Thereafter, the process of FIG. 28A ends at block 2830.

Figure 29:
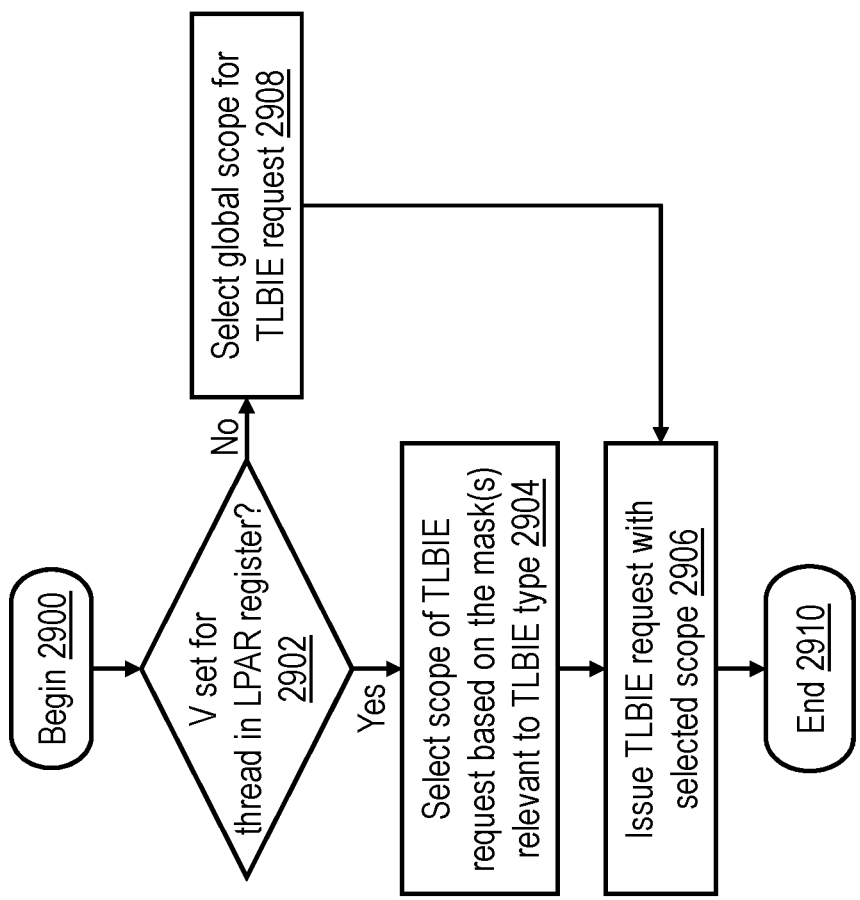
FIG. 29 is a high-level logical flowchart of an exemplary method by which a processor core selects a broadcast scope of a TLBIE request in accordance with one embodiment.

With reference now to FIG. 29, there is illustrated a high-level logical flowchart of an exemplary method by which a hardware thread of a processor core 200 selects a broadcast scope of a TLBIE request (e.g., TLBIE_C, TLBIE_CIO, or TLBIE_IOMMU request) in accordance with one embodiment. The process of FIG. 29 begins at block 2900 and then proceeds to block 2902, which illustrates the initiating hardware thread that is executing a TLBIE request determining whether or not the valid field 2508 of the LPAR register 2500 for the initiating hardware thread is set. If not, the initiating hardware thread selects global scope 2301 of broadcast for the TLBIE request (block 2908). Thereafter, the process passes to block 2906, which is described below.

If, however, the initiating hardware thread makes an affirmative determination at block 2902, the initiating hardware thread selects the scope of the TLBIE request based on the CPU mask 2504 and/or IO mask 2502 relevant to the type of the TLBIE request (block 2904). For example, if the TLBIE request is a TLBIE_C request, the initiating hardware thread selects the broadcast scope to include the processing node(s) 104 specified in CPU mask 2504, but not IO mask 2502. If the TLBIE request is a TLBIE_CIO request, the initiating hardware thread selects the broadcast scope to include the all the processing node(s) 104 having corresponding bits set in one or both of CPU mask 2504 and IO mask 2502. If the TLBIE request is a TLBIE_IOMMU request, the initiating hardware thread selects the single processing node 104 containing the specified IOMMU 210. At block 2906, the initiating hardware thread issues the TLBIE request on the system fabric of data processing system 100 with the scope selected at either 2906 or 2908. Thereafter, the process of FIG. 29 ends at block 2910.

Figures 30, 31:
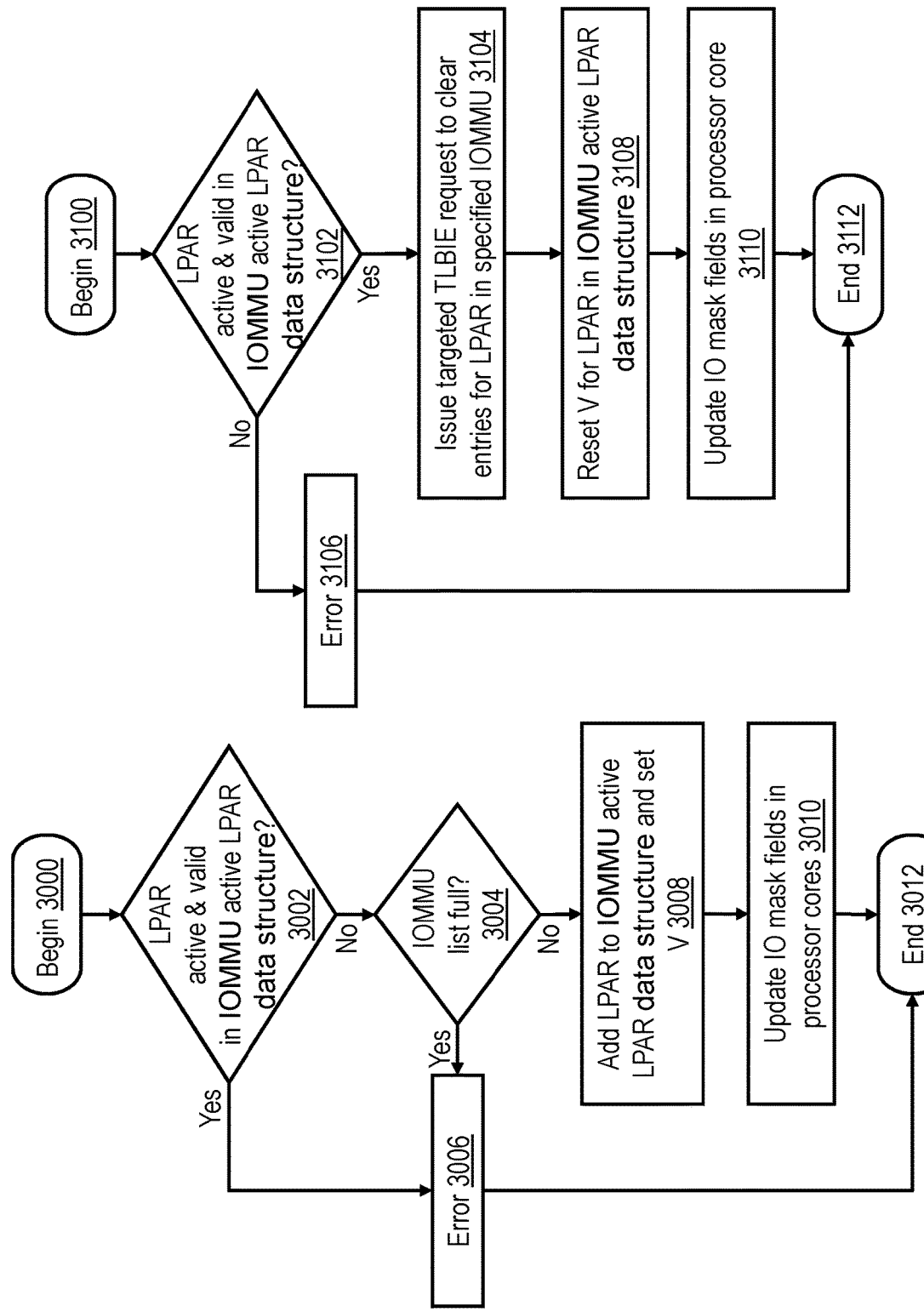
FIG. 30 is a high-level logical flowchart of an exemplary method for assigning a LPAR to an IO memory management unit (IOMMU) in accordance with one embodiment.
FIG. 31 is a high-level logical flowchart of an exemplary method for removing assignment of a LPAR to an IOMMU in accordance with one embodiment.

Referring now to FIG. 30, there is depicted a high-level logical flowchart of an exemplary method for assigning a LPAR to an IOMMU 210 in accordance with one embodiment. This process can be performed, for example, through execution on a processor core 200 of a hypervisor or virtual machine manager (VMM).

The process of FIG. 30 begins at block 3000, for example, in response to execution of an assign_LPAR_IOMMU(lpid, iommu_id) function call, which may have as parameters a LPID of a LPAR to be assigned to an IOMMU 210 and an IOMMU identifier of the IOMMU 210 to which the LPAR is to be assigned. In response to execution of the function call, the executing processor core 200 determines at block 3002 whether or not the specified LPAR is active and has a valid entry 2644 in the IOMMU active LPAR data structure 2642 for the specified IOMMU 210. In response to an affirmative determination at block 3002, the processor core 200 signals an error (block 3006), and the process ends at block 3012.

In response to a negative determination at block 3002, the processor core 200 additionally determines at block 3004 whether or not the IOMMU active LPAR data structure 2640 for the specified IOMMU 210 is full. In response to an affirmative determination at block 3004, the processor core 200 signals an error (block 3006), and the process ends at block 3012. In response, however, to a negative determination at block 3004, the processor core 200 adds the specified LPAR to the LPAR ID field 2648 of an available entry 2644 in the IOMMU active LPAR data structure 2642 for the specified IOMMU and sets the associated valid field 2650 (block 3008). In addition, the processor core 200 appropriately updates the IO mask field(s) 2502 to reflect the assignment of the specified LPAR to the specified IOMMU 210 (block 3010). An exemplary process for performing this update is described below with reference to FIG. 32. The process of FIG. 30 thereafter ends at block 3012.

With reference now to FIG. 31 is a high-level logical flowchart of an exemplary method for removing assignment of a LPAR to an IOMMU 210 in accordance with one embodiment. This process can be performed, for example, through execution on a processor core 200 of a hypervisor or virtual machine manager (VMM).

The process of FIG. 31 begins at block 3100, for example, in response to execution of a remove_LPAR_IOMMU(lpid, iommu_id) function call, which may have as parameters a LPID of a LPAR for which an IOMMU assignment is to be removed and an IOMMU identifier of the IOMMU 210 from the assignment is to be removed. In response to execution of the function call, the executing processor core 200 determines at block 3102 whether or not the specified LPAR is active and has a valid entry 2644 in the IOMMU active LPAR data structure 2642 for the specified IOMMU 210. In response to a negative determination at block 3102, the processor core 200 signals an error (block 3106), and the process ends at block 3112.

In response to an affirmative determination at block 3102, the processor core 200 issues a targeted TLBIE_IOMMU request to clear entries for the specified LPAR in translation structure(s) 212 of the specified IOMMU 210 (block 3104). In addition, the processor core 200 resets the valid field 2650 in the entry 2644 for the LPAR in the IOMMU active LPAR data structure 2642 of the specified IOMMU 210 (block 3108). The processor core 200 also appropriately updates the IO mask field(s) 2502 to reflect the removal of the assignment of the specified LPAR to the specified IOMMU 210 (block 3110), as described further below with reference to FIG. 32. The process of FIG. 31 thereafter ends at block 3112.

Figure 32:
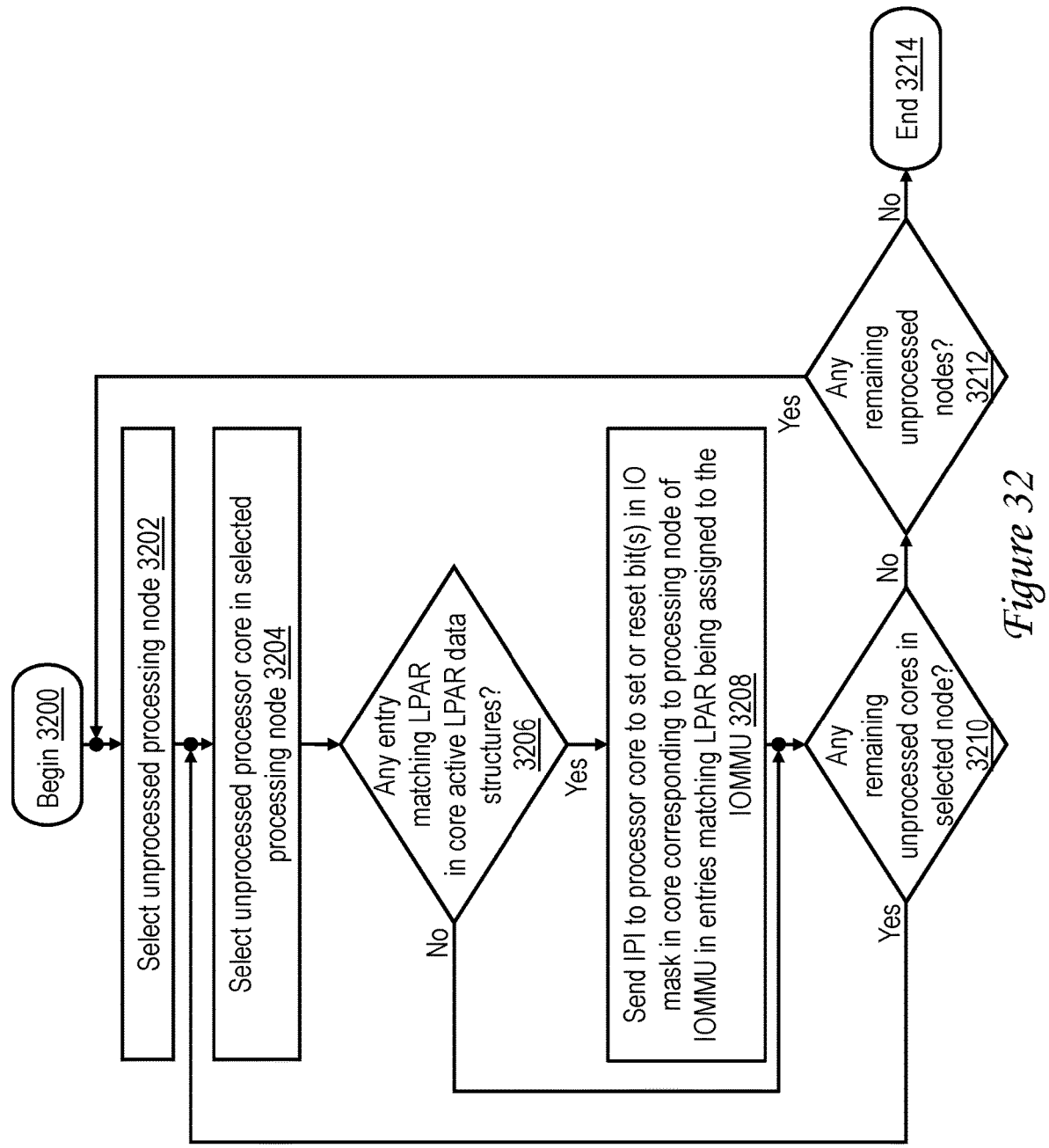
FIG. 32 is a more detailed flowchart of an exemplary method for updating LPAR registers in processor cores to reflect the assignment of a LPAR to an IOMMU or removal of assignment of a LPAR to an IOMMU in accordance with one embodiment.

Referring now to FIG. 32, there is depicted a more detailed flowchart of an exemplary method for updating LPAR registers 360 in processor cores 200 to reflect the assignment of a LPAR to an IOMMU 210 or removal of assignment of a LPAR to an IOMMU 210 in accordance with one embodiment. Those skilled in the art will appreciate that other software known in the art can be utilized to quiesce IO traffic to IOMMUs 210 so that the updates to LPARs 360 can be made without error.

The process of FIG. 32 begins at block 3200, for example, when invoked at block 3010 of FIG. 30 or block 3110 of FIG. 31. The process proceeds from block 3200 to blocks 3202 and 3204, which respectively illustrate the initiating processor core 200 selecting an unprocessed processing node 104 in data processing system 100 and an unprocessed processor core 200 in the selected processing node 104. At block 3206, the initiating processor core 200 determines by reference to the core active LPAR data structure 2602 for the selected processor core 200 whether the LPAR ID field 2608 of any entry 2604 specifies the LPID for the LPAR to be assigned to or removed from assignment to the specified IOMMU 210. In response to a negative determination at block 3206, the process passes to block 3210, which is described below. In response to an affirmative determination at block 3206, the process proceeds to block 3208.

Block 3208 depicts the initiating processor core 200 issuing an inter-processor interrupt (IPI) to the selected processor core 200 on the system fabric to cause the selected processor core 200 to set (if called by the process of FIG. 30) or reset (if called by the process of FIG. 31) the appropriate bit(s) in its LPAR registers 360 to reflect the assignment or removal, respectively, of the assignment of the LPAR to the IOMMU 210. In particular, in any LPAR register 2500 specifying the LPID of the specified LPAR to be assigned/removed from assignment, the selected processor core 200 changes in IO mask 2502 the state of the bit that corresponds to the processing node 104 containing the specified IOMMU 210. The process of FIG. 32 then proceeds to block 3210, which illustrates the initiating processor core 200 determining whether or not any unprocessed processor cores 200 remain in the selected processing node. If so, the process returns to block 3204, which has been described. If, however, the initiating processor core 200 determines at block 3210 that all processor cores 200 in the selected processing node 104 have been processed in the loop including blocks 3204-3210, the processor core 200 additionally determines at block 3212 whether or not any processing nodes 104 of data processing system 100 remain to be processed in the processing loop including blocks 3202-3212. If so, the process returns to block 3202, which has been described. If, on the other hand, the initiating processor core 200 determines at block 3212 that all processing nodes 104 of data processing system 100 have been processed in the loop including blocks 3202-3212, the process of FIG. 32 ends at block 3214.

Figure 33:
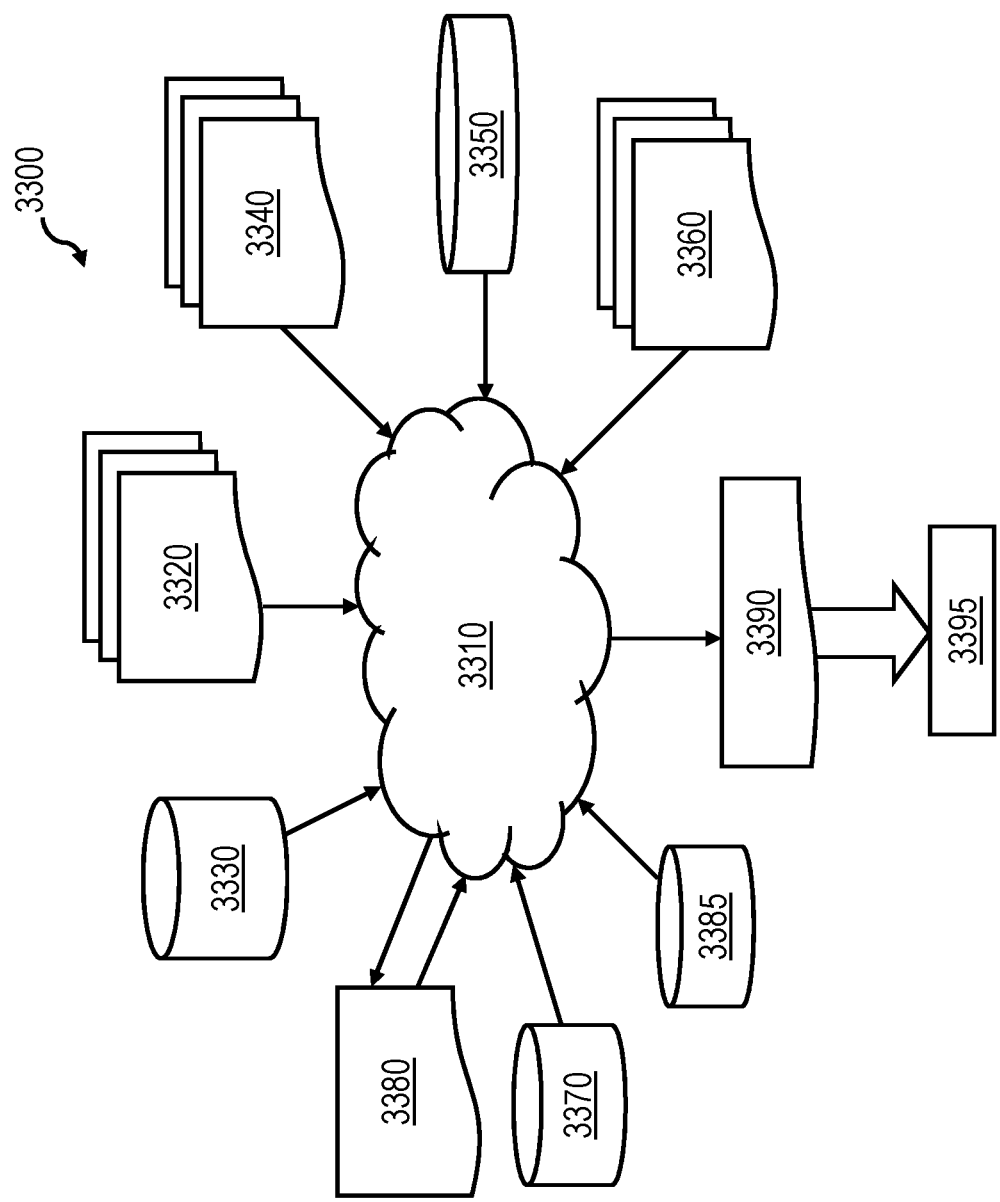
FIG. 33 is a data flow diagram illustrating a design process.

With reference now to FIG. 33, there is depicted a block diagram of an exemplary design flow 3300 used for example, in semiconductor IC logic design, simulation, test, layout, and manufacture. Design flow 3300 includes processes, machines and/or mechanisms for processing design structures or devices to generate logically or otherwise functionally equivalent representations of the design structures and/or devices described above. The design structures processed and/or generated by design flow 3300 may be encoded on machine-readable transmission or storage media to include data and/or instructions that when executed or otherwise processed on a data processing system generate a logically, structurally, mechanically, or otherwise functionally equivalent representation of hardware components, circuits, devices, or systems. Machines include, but are not limited to, any machine used in an IC design process, such as designing, manufacturing, or simulating a circuit, component, device, or system. For example, machines may include: lithography machines, machines and/or equipment for generating masks (e.g. e-beam writers), computers or equipment for simulating design structures, any apparatus used in the manufacturing or test process, or any machines for programming functionally equivalent representations of the design structures into any medium (e.g. a machine for programming a programmable gate array).

Design flow 3300 may vary depending on the type of representation being designed. For example, a design flow 3300 for building an application specific IC (ASIC) may differ from a design flow 3300 for designing a standard component or from a design flow 3300 for instantiating the design into a programmable array, for example a programmable gate array (PGA) or a field programmable gate array (FPGA) offered by Altera® Inc. or Xilinx® Inc.

FIG. 33 illustrates multiple such design structures including an input design structure 3320 that is preferably processed by a design process 3310. Design structure 3320 may be a logical simulation design structure generated and processed by design process 3310 to produce a logically equivalent functional representation of a hardware device. Design structure 3320 may also or alternatively comprise data and/or program instructions that when processed by design process 3310, generate a functional representation of the physical structure of a hardware device. Whether representing functional and/or structural design features, design structure 3320 may be generated using electronic computer-aided design (ECAD) such as implemented by a core developer/designer. When encoded on a machine-readable data transmission, gate array, or storage medium, design structure 3320 may be accessed and processed by one or more hardware and/or software modules within design process 3310 to simulate or otherwise functionally represent an electronic component, circuit, electronic or logic module, apparatus, device, or system such as those shown herein. As such, design structure 3320 may comprise files or other data structures including human and/or machine-readable source code, compiled structures, and computer-executable code structures that when processed by a design or simulation data processing system, functionally simulate or otherwise represent circuits or other levels of hardware logic design. Such data structures may include hardware-description language (HDL) design entities or other data structures conforming to and/or compatible with lower-level HDL design languages such as Verilog and VHDL, and/or higher level design languages such as C or C++.

Design process 3310 preferably employs and incorporates hardware and/or software modules for synthesizing, translating, or otherwise processing a design/simulation functional equivalent of the components, circuits, devices, or logic structures shown herein to generate a netlist 3380 which may contain design structures such as design structure 3320. Netlist 3380 may comprise, for example, compiled or otherwise processed data structures representing a list of wires, discrete components, logic gates, control circuits, I/O devices, models, etc. that describes the connections to other elements and circuits in an integrated circuit design. Netlist 3380 may be synthesized using an iterative process in which netlist 3380 is resynthesized one or more times depending on design specifications and parameters for the device. As with other design structure types described herein, netlist 3380 may be recorded on a machine-readable storage medium or programmed into a programmable gate array. The medium may be a non-volatile storage medium such as a magnetic or optical disk drive, a programmable gate array, a compact flash, or other flash memory. Additionally, or in the alternative, the medium may be a system or cache memory, or buffer space.

Design process 3310 may include hardware and software modules for processing a variety of input data structure types including netlist 3380. Such data structure types may reside, for example, within library elements 3330 and include a set of commonly used elements, circuits, and devices, including models, layouts, and symbolic representations, for a given manufacturing technology (e.g., different technology nodes, 10 nm, 20 nm, 30 nm, etc.). The data structure types may further include design specifications 3340, characterization data 3350, verification data 3360, design rules 3370, and test data files 3385 which may include input test patterns, output test results, and other testing information. Design process 3310 may further include, for example, standard mechanical design processes such as stress analysis, thermal analysis, mechanical event simulation, process simulation for operations such as casting, molding, and die press forming, etc. One of ordinary skill in the art of mechanical design can appreciate the extent of possible mechanical design tools and applications used in design process 3310 without deviating from the scope and spirit of the invention. Design process 3310 may also include modules for performing standard circuit design processes such as timing analysis, verification, design rule checking, place and route operations, etc.

Design process 3310 employs and incorporates logic and physical design tools such as HDL compilers and simulation model build tools to process design structure 3320 together with some or all of the depicted supporting data structures along with any additional mechanical design or data (if applicable), to generate a second design structure 3390. Design structure 3390 resides on a storage medium or programmable gate array in a data format used for the exchange of data of mechanical devices and structures (e.g., information stored in a IGES, DXF, Parasolid XT, JT, DRG, or any other suitable format for storing or rendering such mechanical design structures). Similar to design structure 3320, design structure 3390 preferably comprises one or more files, data structures, or other computer-encoded data or instructions that reside on transmission or data storage media and that when processed by an ECAD system generate a logically or otherwise functionally equivalent form of one or more of the embodiments of the invention shown herein. In one embodiment, design structure 3390 may comprise a compiled, executable HDL simulation model that functionally simulates one or more of the devices shown herein.

Design structure 3390 may also employ a data format used for the exchange of layout data of integrated circuits and/or symbolic data format (e.g., information stored in a GDSII (GDS2), GL1, OASIS, map files, or any other suitable format for storing such design data structures). Design structure 3390 may comprise information such as, for example, symbolic data, map files, test data files, design content files, manufacturing data, layout parameters, wires, levels of metal, vias, shapes, data for routing through the manufacturing line, and any other data required by a manufacturer or other designer/developer to produce a device or structure as described above and shown herein. Design structure 3390 may then proceed to a stage 3395 where, for example, design structure 3390: proceeds to tape-out, is released to manufacturing, is released to a mask house, is sent to another design house, is sent back to the customer, etc.

As has been described, in at least one embodiment, a data processing system includes a plurality of processing nodes communicatively coupled to a system fabric. Each of the processing nodes includes a respective plurality of processor cores. Logical partition (LPAR) information for each of a plurality of LPARs is maintained in a register set in each of the processor cores, where the LPAR information indicates, for each of the LPARs, which of the processing nodes may hold an address translation entry for each LPAR. Based on the LPAR information, a first processor core selects a broadcast scope for a multicast request on the system fabric that includes fewer than all of the plurality of processing nodes and issues the multicast request with the selected broadcast scope. The first processor core updates the LPAR information in the register set of a second processor core in another of the plurality of processing nodes via an inter-processor interrupt.

While various embodiments have been particularly shown and described, it will be understood by those skilled in the art that various changes in form and detail may be made therein without departing from the spirit and scope of the appended claims and these alternate implementations all fall within the scope of the appended claims. For example, although aspects have been described with respect to a computer system executing program code that directs the functions of the present invention, it should be understood that present invention may alternatively be implemented as a program product including a computer-readable storage device storing program code that can be processed by a processor of a data processing system to cause the data processing system to perform the described functions. The computer-readable storage device can include volatile or non-volatile memory, an optical or magnetic disk, or the like, but excludes non-statutory subject matter, such as propagating signals per se, transmission media per se, and forms of energy per se.

As an example, the program product may include data and/or instructions that when executed or otherwise processed on a data processing system generate a logically, structurally, or otherwise functionally equivalent representation (including a simulation model) of hardware components, circuits, devices, or systems disclosed herein. Such data and/or instructions may include hardware-description language (HDL) design entities or other data structures conforming to and/or compatible with lower-level HDL design languages such as Verilog and VHDL, and/or higher level design languages such as C or C++. Furthermore, the data and/or instructions may also employ a data format used for the exchange of layout data of integrated circuits and/or symbolic data format (e.g. information stored in a GDSII (GDS2), GL1, OASIS, map files, or any other suitable format for storing such design data structures).

What is claimed is:

1. A method of multicast communication in a data processing system including a plurality of processing nodes communicatively coupled to a system fabric for communicating requests, wherein each of the plurality of processing nodes includes a respective plurality of processor cores, the method comprising:
   maintaining, in a register set in each of the plurality of processor cores, logical partition (LPAR) information for each of a plurality of LPARs, wherein the LPAR information indicates, for each of the plurality of LPARs, which of the plurality of processing nodes may hold an address translation entry for said each LPAR;
   based on the LPAR information, a first processor core among the plurality of processor cores selecting a broadcast scope for a multicast request on the system fabric and issuing the multicast request on the system fabric with the selected broadcast scope, wherein the selected broadcast scope includes fewer than all of the plurality of processing nodes; and
   the first processor core updating the LPAR information in the register set of a second processor core in another of the plurality of processing nodes via an inter-processor interrupt.

2. The method of claim 1, wherein the multicast request comprises a translation entry invalidation request.

3. The method of claim 1, wherein:
   the maintaining includes maintaining LPAR information indicating which of the plurality of processing nodes holds input/output (I/O) address translation entries for the plurality of LPARs.

4. The method of claim 1, wherein:
   the data processing system includes a system memory communicatively coupled to the system fabric; and
   the maintaining includes maintaining in the system memory LPAR information for at least one inactive LPAR not executing in the data processing system.

5. The method of claim 1, wherein the updating includes the first processor core establishing an entry for a particular LPAR in the LPAR information in at least a second processor core in response to execution of an enable routine.

6. The method of claim 1, wherein the updating includes the first processor core invalidating an entry for a particular LPAR in the LPAR information in at least a second processor core in response to execution of a disable routine.

7. A processing node for a data processing system including a plurality of processing nodes communicatively coupled to a system fabric, the processing unit comprising:
   a plurality of processor cores, wherein:
      each of the plurality of processor cores includes a register set configured to buffer logical partition (LPAR) information for each of a plurality of LPARs, wherein the LPAR information indicates, for each of the plurality of LPARs, which of the plurality of processing nodes may hold an address translation entry for said each LPAR;

the plurality of processor cores includes a first processor core configured to select, based on the LPAR information in the register set, a broadcast scope for a multicast request on the system fabric and to issue the multicast request on the system fabric with the selected broadcast scope, wherein the selected broadcast scope includes fewer than all of the plurality of processing nodes; and the first processor core is configured to update the LPAR information in the register set of a second processor core in another of the plurality of processing nodes via an inter-processor interrupt.

8. The processing node of claim 7, wherein the multicast request comprises a translation entry invalidation request.

9. The processing node of claim 7, wherein the LPAR information indicates which of the plurality of processing nodes holds input/output (I/O) address translation entries for the plurality of LPARs.

10. The processing node of claim 7, wherein:
the data processing system includes a system memory communicatively coupled to the system fabric; and
the processing node is further configured to maintain in the system memory LPAR information for at least one inactive LPAR not executing in the data processing system.

11. The processing node of claim 7, wherein the first processor core is configured to update the LPAR information in the register set of the second processor core by establishing an entry for a particular LPAR in response to execution of an enable routine.

12. The processing node of claim 7, wherein the first processor core is configured to update the LPAR information in the register set of the second processor core by invalidating an entry for a particular LPAR in response to execution of a disable routine.

13. A data processing system, comprising:
the plurality of processing nodes including the processing node of claim 7; and
the system fabric coupling the plurality of processing nodes.

14. A design structure tangibly embodied in a machine-readable storage device for designing, manufacturing, or testing an integrated circuit, the design structure comprising:

a processing node for a data processing system including a plurality of processing nodes communicatively coupled to a system fabric, the processing unit including:
a plurality of processor cores, wherein:
each of the plurality of processor cores includes a register set configured to buffer logical partition (LPAR) information for each of a plurality of LPARs, wherein the LPAR information indicates, for each of the plurality of LPARs, which of the plurality of processing nodes may hold an address translation entry for said each LPAR;

the plurality of processor cores includes a first processor core configured to select, based on the LPAR information in the register set, a broadcast scope for a multicast request on the system fabric and to issue the multicast request on the system fabric with the selected broadcast scope, wherein the selected broadcast scope includes fewer than all of the plurality of processing nodes; and the first processor core is configured to update the LPAR information in the register set of a second processor core in another of the plurality of processing nodes via an inter-processor interrupt.

15. The design structure of claim 14, wherein the multicast request comprises a translation entry invalidation request.

16. The design structure of claim 14, wherein the LPAR information indicates which of the plurality of processing nodes holds input/output (I/O) address translation entries for the plurality of LPARs.

17. The design structure of claim 14, wherein:
the data processing system includes a system memory communicatively coupled to the system fabric; and
the processing node is further configured to maintain in the system memory LPAR information for at least one inactive LPAR not executing in the data processing system.

18. The design structure of claim 14, wherein the first processor core is configured to update the LPAR information in the register set of the second processor core by establishing an entry for a particular LPAR in response to execution of an enable routine.

19. The design structure of claim 14, wherein the first processor core is configured to update the LPAR information in the register set of the second processor core by invalidating an entry for a particular LPAR in response to execution of a disable routine.

* * * * *